US012726842B2

(12) United States Patent
Rao et al.

(10) Patent No.: US 12,726,842 B2
(45) Date of Patent: Sep. 1, 2026

(54) METHODS AND APPARATUS FOR SUPPORTING COLLABORATIVE POSITIONING

(71) Applicant: INTERDIGITAL PATENT HOLDINGS, INC., Wilmington, DE (US)

(72) Inventors: Jaya Rao, Montreal (CA); Fumihiro Hasegawa, Westmount (CA); Faris Alfarhan, Montreal (CA); Tuong Hoang, Montreal (CA); Aata El Hamss, Laval (CA); Tejaswinee Lutchoomun, Montreal (CA); Senay Negusse, Montreal (CA); Moon Il Lee, Melville, NY (US); Paul Marinier, Brossard (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 290 days.

(21) Appl. No.: 18/294,028

(22) PCT Filed: Aug. 3, 2022

(86) PCT No.: PCT/US2022/039280
§ 371 (c)(1),
(2) Date: Jan. 31, 2024

(87) PCT Pub. No.: WO2023/014795
PCT Pub. Date: Feb. 9, 2023

(65) Prior Publication Data

US 2025/0088883 A1 Mar. 13, 2025

Related U.S. Application Data

(60) Provisional application No. 63/308,254, filed on Feb. 9, 2022, provisional application No. 63/228,935, filed on Aug. 3, 2021.

(51) Int. Cl.
*H04W 24/10* (2009.01)
*G01S 5/00* (2006.01)
(Continued)

(52) U.S. Cl.
CPC ........... *H04W 24/10* (2013.01); *G01S 5/0072* (2013.01); *G01S 5/0289* (2013.01); *H04W 64/00* (2013.01)

(58) Field of Classification Search
CPC ..... H04W 64/00; H04W 24/10; H04W 92/18; H04W 76/14; H04W 64/003;
(Continued)

(56) References Cited

U.S. PATENT DOCUMENTS 11,689,951 B2 * 6/2023 Bao ...................... H04L 5/0053 370/329
2016/0100355 A1 4/2016 Chen et al.
(Continued)

FOREIGN PATENT DOCUMENTS

EP 3 198 897 8/2017
WO 2021/030583 2/2021
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

(Continued)

*Primary Examiner* — Matthew C Sams
(74) *Attorney, Agent, or Firm* — Volpe Koenig

(57) ABSTRACT

Systems, methods, and devices for collaborative positioning. A wireless transmit/receive unit (WTRU) is configured to
(Continued)

perform and report positioning measurements including SL collaborative measurements. The WTRU serving as an anchor WTRU may select a set of member WTRUs for distributing the PRS measurement configurations based on the inter-WTRU distance measured over a SL. The selected subset of member WTRUs each provide measurement report to the anchor WTRU. The anchor WTRU reports to the LMF the measurements received from the member WTRUs and the associated SL distance measurements.

15 Claims, 11 Drawing Sheets

(51) Int. Cl.
*G01S 5/02* (2010.01)
*H04W 64/00* (2009.01)

(58) Field of Classification Search
CPC ... H04W 64/006; H04W 72/25; H04W 72/51; H04W 8/24; H04W 24/08; H04W 4/02; H04W 4/026; H04W 4/029; H04W 4/40; H04W 4/46; H04W 48/14; H04W 48/16; H04W 52/0209; H04W 72/1215; H04W 72/542; H04W 76/20; H04W 76/23; H04W 76/28; H04W 8/005; H04W 8/22; H04W 88/06; H04W 88/10; H04W 92/10; G01S 5/0205; G01S 5/0072; G01S 5/0236; G01S 1/042; G01S 11/02; G01S 5/0036; G01S 5/009; G01S 5/0268; G01S 5/0284; G01S 5/0289; G01S 5/08
See application file for complete search history.

(56) References Cited

U.S. PATENT DOCUMENTS

| | | | | |
|---|---|---|---|---|
| 2019/0037525 | A1 | 1/2019 | Liu et al. | |
| 2019/0230619 | A1* | 7/2019 | Cui | H04W 64/00 |
| 2021/0377906 | A1* | 12/2021 | Bao | G01S 5/0205 |
| 2022/0271888 | A1 | 8/2022 | Cha et al. | |
| 2022/0361137 | A1 | 11/2022 | Baek et al. | |
| 2023/0065413 | A1* | 3/2023 | Li | H04L 5/0092 |
| 2024/0080870 | A1* | 3/2024 | He | H04W 4/46 |
| 2024/0107487 | A1* | 3/2024 | Manolakos | H04W 24/10 |

FOREIGN PATENT DOCUMENTS

| | | | |
|---|---|---|---|
| WO | 2022/212126 | 10/2022 | |
| WO | 2022/212272 | 10/2022 | |
| WO | WO-2023148424 A1 * | 8/2023 | H04W 24/08 |
| WO | WO-2024030463 A1 * | 2/2024 | H04W 24/08 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Third Generation Partnership Project, "Technical Specification Group Radio Access Network; LTE Positioning Protocol (LPP) (Release 16)," 3GPP TS 37.355 V16.5.0 (Jun. 2021).

Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.1.0 (Jul. 2020).

Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.5.0 (Jun. 2021).

Third Generation Partnership Project, "Technical Specification Group Radio Access Network; NG Radio Access Network (NG-RAN); Stage 2 functional specification of User Equipment (UE) positioning in NG-RAN (Release 16)," 3GPP TS 38.305 V16.7.0 (Dec. 2021).

Third Generation Partnership Project, "Technical Specification Group Radio Access Network; NG Radio Access Network (NG-RAN); Stage 2 functional specification of User Equipment (UE) positioning in NG-RAN (Release 17)," 3GPP TS 38.305 V17.1.0 (Jun. 2022).

Third Generation Partnership Project, "Technical Specification Group Radio Access Network; NR; Radio Resource Control (RRC) protocol specification (Release 16)," 3GPP TS 38.331 V16.1.0 (Jul. 2020).

Third Generation Partnership Project, "Technical Specification Group Radio Access Network; NR; Radio Resource Control (RRC) protocol specification (Release 16)," 3GPP TS 38.331 V16.5.0 (Jun. 2021).

Third Generation Partnership Project, "Technical Specification Group Radio Access Network; NR; Radio Resource Control (RRC) protocol specification (Release 17)," 3GPP TS 38.331 V17.1.0 (Jun. 2022).

Third Generation Partnership Project, "Technical Specification Group Radio Access Network; NR; Radio Resource Control (RRC) protocol specification (Release 16)," 3GPP TS 38.331 V16.9.0 (Jun. 2022).

Third Generation Partnership Project, "Technical Specification Group Radio Access Network; NR; Physical layer procedures for data (Release 17)," 3GPP TS 38.214 V16.6.0 (Jun. 2021).

Third Generation Partnership Project, "Technical Specification Group Radio Access Network; NR; Physical layer procedures for data (Release 17)," 3GPP TS 38.214 V16.10.0 (Jun. 2022).

Third Generation Partnership Project, "Technical Specification Group Radio Access Network; NR; Physical layer procedures for data (Release 17)," 3GPP TS 38.214 V17.2.0 (Jun. 2022).

Third Generation Partnership Project, "Technical Specification Group Radio Access Network; LTE Positioning Protocol (LPP) (Release 17)," 3GPP TS 37.355 V17.1.0 (Jun. 2022).

Third Generation Partnership Project, "Technical Specification Group Radio Access Network; LTE Positioning Protocol (LPP) (Release 16)," 3GPP TS 37.355 V16.8.0 (Mar. 2022).

* cited by examiner

Figure 1D:
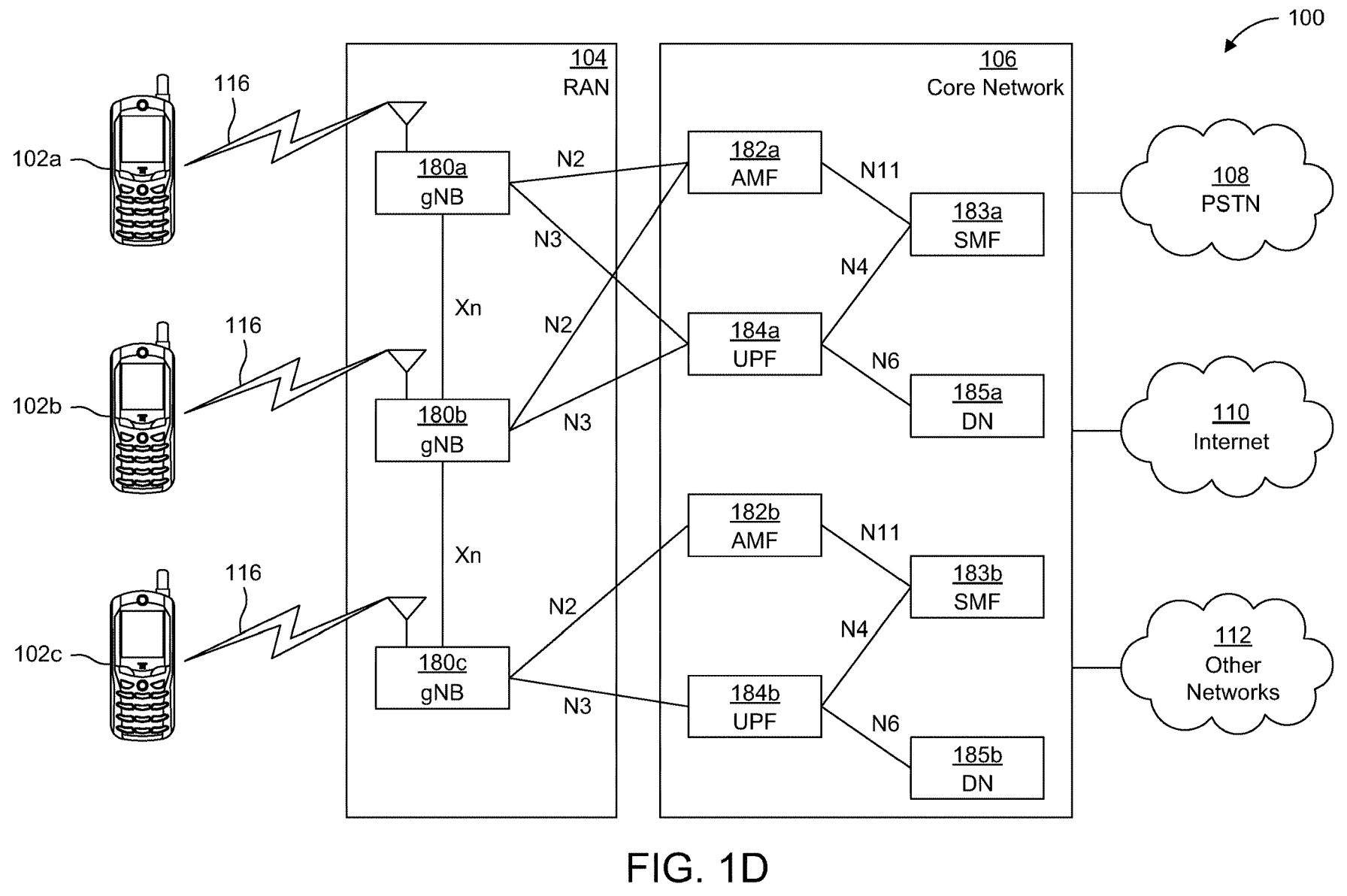

100

108 PSTN

110 Internet

112 Other Networks

106 Core Network

183a SMF

185a DN

183b SMF

185b DN

N11 N4 N6 N11 N4 N6

182a AMF

184a UPF

182b AMF

184b UPF

104 RAN

N2 N3 N2 N3 N2 N3

180a gNB

Xn 180b gNB

Xn 180c gNB 116 116 116

METHODS AND APPARATUS FOR SUPPORTING COLLABORATIVE POSITIONING

CROSS-REFERENCE TO RELATED APPLICATIONS

This application is the U.S. National Stage, under 35 U.S.C. § 371, of International Application No. PCT/US2022/039280 filed Aug. 3, 2022, which claims the benefit of U.S. Provisional Application No. 63/228,935, filed Aug. 3, 2021, and U.S. Provisional Application No. 63/308,254, filed Feb. 9, 2022 the contents of which are incorporated herein by reference.

BACKGROUND

In wireless communications it is important for wireless transmit receive units to be able to efficiently report position information. In legacy procedures, the entire positioning procedure (e.g. configuration, measurements, reporting) is applied on a per-device basis. This applies even when multiple devices are in proximity, and/or connected via SL (e.g. in XR, V2X). The legacy procedures in such scenarios can result in high overhead and power inefficiency. Furthermore, the presence of multiple devices is not leveraged for improving positioning accuracy. Accordingly, there is a need for procedures for supporting collaborative positioning.

SUMMARY

Systems, methods, and devices for collaborative positioning. A wireless transmit/receive unit (WTRU) is configured to perform and report positioning measurements including SL collaborative measurements. The WTRU serving as an anchor WTRU may select a set of member WTRUs for distributing the PRS measurement configurations based on the inter-WTRU distance measured over a SL. The selected subset of member WTRUs each provide measurement report to the anchor WTRU. The anchor WTRU reports to the LMF the measurements received from the member UEs and the associated SL distance measurements.

A method performed by a wireless transmit receive unit (WTRU) that is serving as an anchor UE is disclosed. In the method, the WTRU receives a set of PRS configuration information, performs measurements on a side link (SL) to determine a distance between the WTRU and at least one member WTRU, transmits an indication of PRS configurations from the set of PRS configuration information that are associated with the determined distance between WTRU and at least one member WTRU, performs PRS measurements using a PRS configuration of the set of PRS configuration information that is associated with the WTRU, receives from the at least one member WTRU, a measurement report containing PRS measurements made using the indicated PRS configuration; and transmits a measurement report that includes PRS measurements made by the WTRU, PRS measurements received from the at least one member WTRU. In an example, the received set of PRS configuration information includes, one or more distance threshold values, and association information that associates PRS configs and the one or more distance threshold values. In an example, the indication of PRS configurations from the set of PRS configuration information is selected based on the distance threshold values. In another example, the measurement report includes IDs of PRS configurations used by WTRU and the selected at least one member WTRU. In another example, the measurement report includes an indication of the determined distance between the selected at least one member WTRU and the WTRU. In another example, the at least one member WTRU is selected based on the determined distance. In another example, the WTRU selects the at least one member WTRU based on a comparison of the determined distance.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1D is a system diagram illustrating a further example RAN and a further example CN that may be used within the communications system illustrated in FIG. 1A according to an embodiment;

DETAILED DESCRIPTION

Figure 1A:
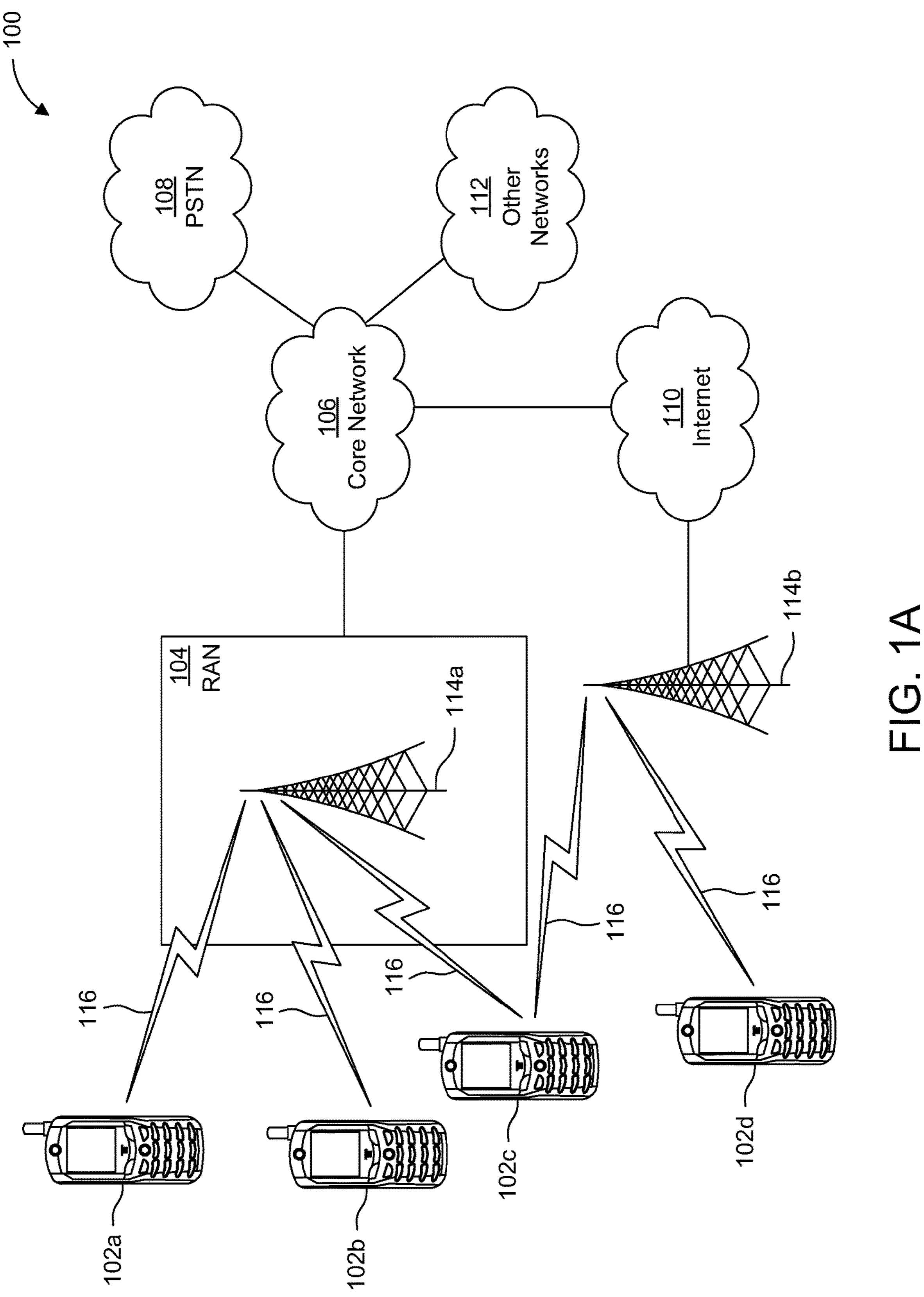
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
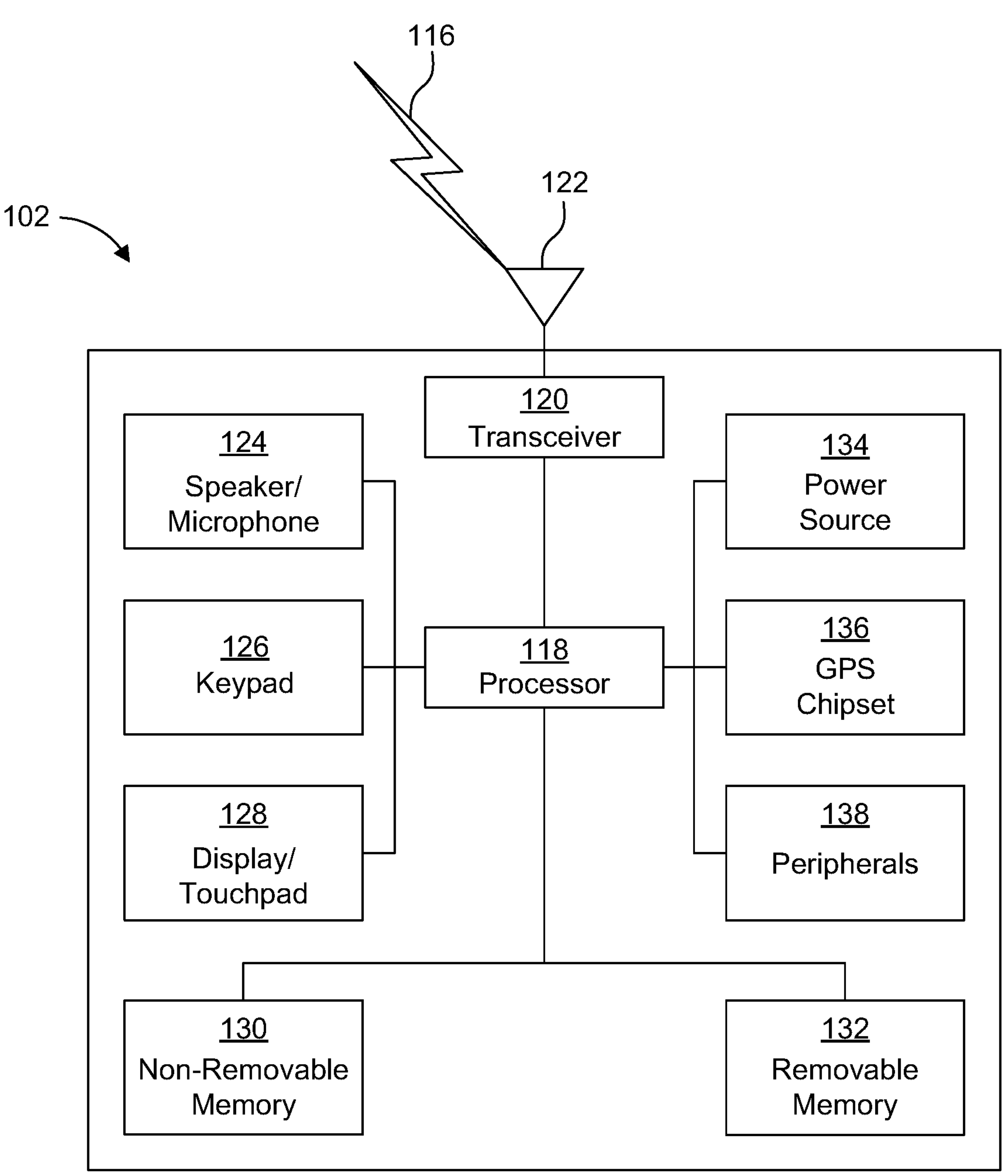
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
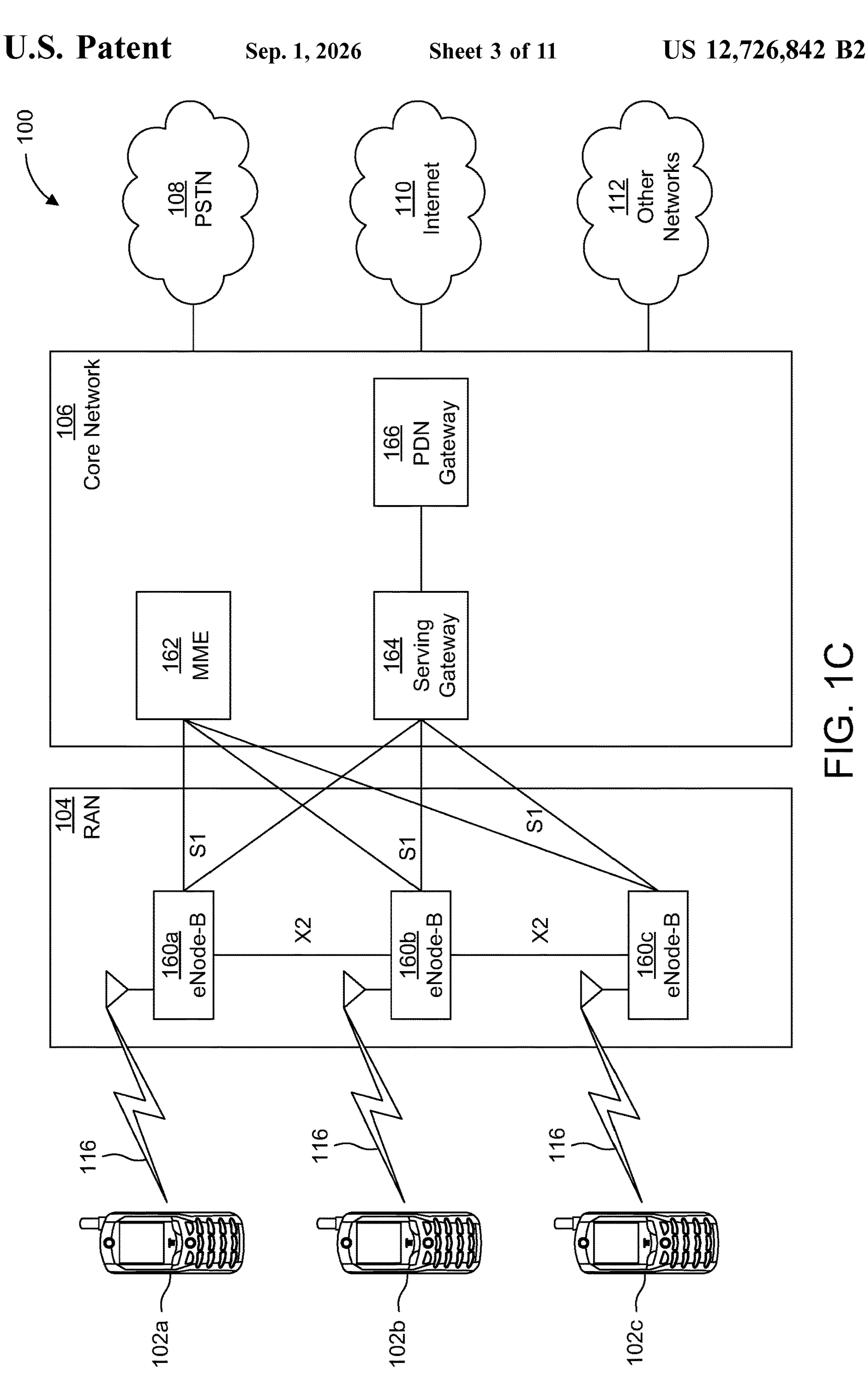
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components.

The one or more emulation devices may be test equipment. Direct RF coupling and/or wireless communications via RF circuitry (e.g., which may include one or more antennas) may be used by the emulation devices to transmit and/or receive data.

In some implementations, if multiple WTRUs are located close to each other (e.g., in extended reality (XR) or Industrial Internet of Things (IIoT)), the entire set of LTE positioning protocol (LPP) procedures may be applied individually for each WTRU. This may result in wastage of resources and power inefficiency. Even if some of the positioning reference signal (PRS) beams seen by the WTRU are blocked, signaling to provide a new configuration and/or to select another device for measurement may result in high latency; e.g., due to interaction between WTRU and Location Management Function (LMF).

Some implementations leverage different devices in proximity to determine the WTRU location with high accuracy. In some implementations, positioning measurements are distributed over multiple devices belonging to a collaborative WTRU group. A collaborative WTRU group may include at least one anchor WTRU and at least one collaborative or member WTRU, e.g., as defined herein). In some implementations, an anchor WTRU may collect the measurements over a sidelink (SL) and may report the combined measurements to LMF. In some implementations, the WTRUs (e.g., having a preexisting LPP session) may directly report measurements related to the location of the anchor WTRU to the LMF.

Some WTRU-assisted implementations may use a bundled and/or group LTE positioning protocol (LPP). For example, anchor and collaborative WTRUs may share an LPP session, since both measurement reports are intended for LMF to locate one or more of the collaborating WTRU s (e.g., the anchor WTRU). In some WTRU-based implementations, the collaborative WTRUs may send their measurements to the anchor WTRU so the anchor WTRU can use the location information to locate itself or another collaborating WTRU.

In some implementations, a WTRU (e.g., an anchor WTRU) determines a positioning reference signal (PRS) configuration for a collaborative WTRU in response to detecting a triggering event (e.g., detecting that an RSRP measurement of PRS from a TRP is below a threshold), the PRS configuration based on one or more PRS configurations intended for collaborative positioning, e.g., received from LMF.

First, the WTRU receives a discovery message from another WTRU (a collaborative WTRU) in its proximity (e.g., via SL), for performing collaborative positioning. During discovery and SL connection establishment, the WTRU may request and receive information regarding a positioning capability of the collaborative WTRU (e.g., its capability for supporting at least one positioning method and/or an ID of a preexisting LPP session). The WTRU may determine the initial relative positioning of the collaborative WTRU, e.g., including distance and direction, e.g., based on a SL ranging approach.

Next, the WTRU sends information regarding the collaborative WTRU, including its positioning capability and position (e.g., relative position), to LMF (e.g., using a capability transfer message).

Next, the WTRU receives assistance information from network (e.g. LMF), which includes information regarding one or more PRS configurations for the WTRU, information regarding candidate PRS configurations intended for the collaborative WTRU, and information regarding one or more triggering events for initiating collaborative positioning.

If at least one of the triggering events (e.g., that RSRP measurement of PRS from a TRP is below a threshold) is detected by WTRU, the WTRU selects a PRS configuration from the candidate PRS configurations intended for the collaborative WTRU. In some implementations, the selection is made such that the selected PRS configuration includes at least the PRS that addresses the triggering event (e.g., a PRS configuration selected for collaborative WTRU includes a PRS from a TRP that is blocked at anchor WTRU). Next, the WTRU indicates the selected PRS configuration (e.g., ID of selected PRS config) to the collaborative WTRU (via SL). Next, the WTRU makes PRS measurements and sends to LMF the measurement report, including information on the selected PRS configuration for collaborated WTRU and other information to assist with location calculation (e.g., change in relative distance/direction associated with collaborative WTRU). If the collaborative WTRU does not have a preexisting LPP session, the WTRU collects the measurements made by the collaborative WTRU (via SL) and includes in the measurement report to LMF, the measurements made by collaborative WTRU and other information to assist with location calculation.

In some implementations, a WTRU (e.g., an anchor WTRU) determines a PRS configuration for a collaborative WTRU when detecting a triggering event (e.g., RSRP measurement of PRS from a TRP is below a threshold) based on one or more PRS configs and assistance information related to location of collaborative WTRU received from LMF for calculating the anchor WTRU location.

First, the WTRU performs discovery of another WTRU in proximity (e.g., via SL) for performing collaborative positioning. During discovery and SL connection establishment, the WTRU requests and receives positioning capability of collaborative WTRU (e.g., capability for supporting at least one positioning method). The WTRU may determine the initial relative positioning of collaborative WTRU, including distance and angle, e.g., via SL ranging.

Next, the WTRU sends information regarding the other collaborative WTRU, including positioning capability and relative positioning of collaborative WTRU, to LMF (e.g., in a capability transfer message).

Next, the WTRU receives assistance information which includes one or more PRS configs for the WTRU, information related to location of collaborative WTRU for assisting with calculation of WTRU location (e.g., distance/angle corrections to apply when using measurements from collaborative WTRU) and one or more triggering events for initiating collaborative positioning.

If at least one of the triggering events (e.g., PRS from a TRP is blocked) is detected by WTRU, the WTRU determines the PRS configuration for the collaborative WTRU, from the one or more PRS configs received from LMF, such that the determined PRS configuration addresses the triggering event (e.g., PRS configuration determined for collaborative WTRU contains PRS from a TRP that is blocked at anchor WTRU); Indicates to the collaborative WTRU (via SL) the determined PRS configuration; receives measurement report from collaborative WTRU (via SL) and performs own PRS measurements; and calculates the WTRU location based on own PRS measurements and PRS measurements received from collaborative WTRU and the assistance information related to location of collaborative WTRU received from LMF (e.g., correction information to apply during calculation).

The following abbreviations and acronyms appear in this document.

ACK Acknowledgement
AoA Angle of Arrival
AoD Angle of Departure
ARFCN Absolute Radio-Frequency Channel Number
AL Alert Level
BLER Block Error Rate BWP Bandwidth Part
CAP Channel Access Priority
CAPC Channel access priority class
CCA Clear Channel Assessment
CCE Control Channel Element
CE Control Element
CG Configured Grant or Cell Group
CORESET Control Resource Set
CP Cyclic Prefix
CP-OFDM Conventional OFDM (relying on cyclic prefix)
CQI Channel Quality Indicator
CRC Cyclic Redundancy Check
CSI Channel State Information
CW Contention Window
CWS Contention Window Size
CO Channel Occupancy
DAI Downlink Assignment Index
DCI Downlink Control Information
DFI Downlink feedback information
DG Dynamic grant
DL Downlink
DM-RS Demodulation Reference Signal
DRB Data Radio Bearer
DRX Discontinuous Reception
ECID Enhanced Cell ID
eLAA enhanced Licensed Assisted Access
eMBB enhanced Mobile Broadband
FeLAA Further enhanced Licensed Assisted Access
HARQ Hybrid Automatic Repeat Request
LAA License Assisted Access
LBT Listen Before Talk
LCH Logical Channel
LCP Logical Channel Priority
LBT Listen-Before-Talk
LMF Location Management Function
LPP LTE Positioning Protocol
LTE Long Term Evolution e.g., from 3GPP LTE R8 and up
MAC CE MAC Control Element
MAC Medium Access Control
MCS Modulation and Coding Scheme
MIMO Multiple Input Multiple Output
NACK Negative ACK
NAS Non-access stratum
NR New Radio
OFDM Orthogonal Frequency-Division Multiplexing
OTDOA Observed Time Difference of Arrival
PDCCH Physical Downlink Control Channel
PDSCH Physical Downlink Shared Channel
PDU Packet Data Unit
PHY Physical Layer
PID Process ID
PL Protection Limit
PO Paging Occasion
PRACH Physical Random Access Channel
PRS Positioning Reference Signal
PSS Primary Synchronization Signal
PTRS Phase Tracking Reference Signal
PUCCH Physical Uplink Control Channel
PUSCH Physical Uplink Shared Channel
RA Random Access (or procedure)
RACH Random Access Channel
RAR Random Access Response
RCU Radio access network Central Unit
RF Radio Front end
RLF Radio Link Failure
RLM Radio Link Monitoring
RNTI Radio Network Identifier
RNA RAN Notification Area
RO RACH occasion
RRC Radio Resource Control
RRM Radio Resource Management
RTT Round Trip Time
RP Reception Point
RS Reference Signal
RSRP Reference Signal Received Power
RSTD Reference Signal Time Difference
RSSI Received Signal Strength Indicator
RTOA Relative Time of Arrival
SDAP Service data adaptation protocol
SDU Service Data Unit
SRB Signaling Radio Bearer
SRS Sounding Reference Signal
SS Synchronization Signal
SSS Secondary Synchronization Signal
SWG Switching Gap (in a self-contained subframe)
SPS Semi-persistent scheduling
SUL Supplemental Uplink
TB Transport Block
TBS Transport Block Size
TDoA Time Difference of Arrival
TIP Target Integrity Risk
TRP Transmission-Reception Point
TSC Time-sensitive communications
TSN Time-sensitive networking
TTA Time-to-Alert
TTI Transmission Time Interval
UCI Uplink Control Information
UL Uplink
URLLC Ultra-Reliable and Low Latency Communications
WBWP Wide Bandwidth Part
WLAN Wireless Local Area Networks and related technologies (IEEE 802.xx domain)

In wireless communications downlink, uplink, and downlink and uplink positioning methods are used. In the downlink positioning methods, PRS may be sent from multiple TRPs to the WTRU. In some implementations, the WTRU may receive multiple reference signals and measure a time difference of arrival between a pair of PRS (e.g., as a RSTD). Thereafter, the WTRU may send the measured RSTD to an LMF. The WTRU can send measured RSRP for each PRS to the LMF. Based on the returned measurements of the measured RSRP, the LMF may determine the location of the WTRU. Alternatively, WTRU can send to the LMF the RSRP measured from the beams received from TRPs/gNBs when supporting DL angle-based positioning methods.

Throughout the application an LMF is intended to be a non-limiting example of a node or entity (e.g., a network node or entity) that may be used for positioning, or to support positioning. In some implementations, any other node or entity may be substituted for LMF and still be within the intent and scope of with this application.

In some implementations, in uplink positioning techniques, the WTRU sends an SRS for positioning, e.g., as configured by RRC signaling, to TRPs. In some implementations, e.g., for timing-based techniques, a TRP may measure RTOA for a received SRS and may report the measured value to the LMF. In some implementations, the WTRU may report RSRP for SRS. In some implementations, e.g., angle-based uplink positioning methods, TRP will measure angles of arrival and report the measured angles to LMF.

In some implementations, in uplink and downlink positioning techniques, the WTRU may measure a Rx-Tx time difference between received PRS and transmitted SRS. The Rx-Tx time difference may be reported to the LMF from the WTRU. In some implementations, the WTRU may also report measured RSRP for PRS. In some implementations, a Rx-Tx difference between received SRS and transmitted PRS is computed at the TRP.

DL positioning techniques, UL positioning techniques, and DL & UL positioning techniques are discussed herein. A DL positioning technique may refer to any positioning method that uses downlink reference signals, such as PRS for positioning. For example, in some implementations the WTRU may receive multiple reference signals from a TP and measure DL RSTD and/or RSRP. Examples of DL positioning methods are DL-AoD or DL-TDOA positioning. An UL positioning technique may refer to any positioning method that uses uplink reference signals, such as SRS for positioning. For example, in some implementations the WTRU transmits SRS to multiple RPs and the RPs measure the UL RTOA and/or RSRP. Examples of UL positioning methods are UL-TDOA or UL-AoA positioning.

A DL and UL positioning technique may refer to any positioning method that uses both uplink and downlink reference signals for positioning. For example, in some implementations the WTRU may transmit an SRS to multiple TRPs and a gNB may measure the Rx-Tx time difference. In some implementations, the gNB may measure RSRP for the received SRS. In some implementations, the WTRU may measure Rx-Tx time difference for PRS transmitted from multiple TRPs. In some implementations, the WTRU may measure RSRP for the received PRS. The Rx-TX difference (and in some implementations, the RSRP) measured at WTRU and gNB may be used to compute round trip time. Here, the Rx and Tx difference refers to the difference between arrival time of the reference signal transmitted by the TRP and transmission time of the reference signal transmitted from the WTRU. An example of DL & UL positioning method is multi-RTT positioning.

As used herein, a network may include or refer to an AMF, LMF or gNB in NG-RAN, for example. In some positioning procedures for DL-PRS measurements in RRC CONNECTED mode may allow a limited level of intra-gNB mobility (within coverage areas of TRPs belonging to the same gNB) and inter-gNB mobility (for scenarios where the same PRS configuration is used by multiple gNBs). The reporting of measurements or location information to the LMF may be supported via the serving gNB/cell.

As used herein, collaborative positioning may refer to, but is not limited to, one or more of the following concepts and definitions: positioning techniques, positioning related actions, a collaborative group of WTRUs, an anchor WTRU, and one or more a collaborative WTRUs.

In some implementations, a positioning technique may include a technique where one or more WTRUs may perform at least one positioning related action resulting in determining the location information of at least one WTRU.

In some implementations, a positioning related action may include an action performed by a WTRU during collaborative positioning. Positioning related actions may include sending capability information to the network, receiving a positioning configuration, performing measurements, transmitting reference signals (RS), triggering a transmission and/or measurement of positioning RS, and/or sending a measurement report, and/or calculating location information of one or more WTRUs.

In some implementations, sending capability information to the network, e.g., including information indicating a capability for supporting one or more positioning methods, or indicating a capability to coordinate and/or interact with other WTRUs in proximity (e.g., via NR sidelink interface), for example. In some implementations, receiving a positioning configuration may include receiving a PRS configuration including one or more PRS resources and/or receiving SRSp, a configuration including one or more SRSp resources, for example. In some implementations, performing measurements may include measuring one or more of DL-PRS, sidelink PRS, GNSS signals, RAT-independent positioning signals including signals transmitted using unlicensed carriers, ultra-wideband signals, LIDAR signals, visual signals, etc., for example.

In some implementations, transmitting reference signals (RS) may include transmitting SRSp and sidelink PRS, for example. Sidelink PRS may refer to the RS, including any positioning RS and non-positioning RS (e.g., SL CSI-RS), transmitted/received over the sidelink interface. In some implementations, triggering a transmission and/or measurement of positioning RS may include triggering a transmission and/or measurement of positioning RS in another one or, several other WTRUs (e.g., via Uu link and/or sidelink), for example. In some implementations, sending a measurement report may include sending a measurement report to the network (e.g., LMF and/or gNB) including measurements made of DL-PRS and/or sending a measurement report to another WTRU of measurements made of sidelink PRS, for example. In some implementations, calculating location information of one or more WTRUs may include calculating information regarding the location of one or more WTRUs, e.g., based on own positioning related measurements or measurements provided by other WTRUs.

A collaborative group of WTRUs may include two or more WTRUs, where a first WTRU may be designated as an anchor WTRU and a second WTRU (and possibly other WTRUs) may be designated as a collaborative WTRU.

An anchor WTRU, in the context of collaborative positioning, may refer to a WTRU involved in performing one or more of the following: hosting of the LCS client/application from which a request for location information is received; receiving the request for location information from an external LCS client via LMF; establishing LPP session by sending/receiving request for LPP session establishment and operates as the primary anchor point for communicating with LMF via LPP, including sending and/or receiving any of LPP messages (e.g., capability transfer, assistance information transfer, location request transfer, provide location information); supporting a connection to the network, e.g., via the interface between anchor WTRU and the network (e.g., gNB) which may be referred to as a primary Uu link; and/or initiating a discovery procedure for determining other WTRUs/devices/nodes in proximity for performing collaborative positioning.

A collaborative WTRU or member WTRU, in the context of collaborative positioning, may be used interchangeably to refer to a WTRU involved in performing one or more of the following: initiating a discovery procedure and/or receiving request for making the WTRU discoverable (e.g., via a sidelink or via the network) for performing collaborative positioning; supporting a connection to the network, where the interface between collaborative WTRU and network (e.g., a gNB) may be referred to as secondary Uu link; sending assistance information, e.g., including information related to relative/absolute location (e.g., distance from anchor WTRU, direction/orientation based on azimuth/zenith angle with respect to anchor WTRU and/or TRP/gNB) directly to anchor WTRU or indirectly to the network (e.g., a gNB or LMF), for assisting with location calculation; receiving positioning related configuration (e.g., PRS, SRSp, sidelink PRS) and accordingly performing measurements and/or transmission of RS (e.g., SRSp, sidelink PRS) which may be used for determining the location of one of more WTRUs, possibly including an anchor WTRU and/or collaborative WTRU; sending a measurement report and/or location estimates to the anchor WTRU and/or network, including measurements and/or location estimates made based on RS received from network and/or received from another WTRU over a sidelink; and/or transferring positioning related information, including the positioning configuration, measurements and/or location estimates, where the transferring may be performed directly via collaborative WTRU's own LPP session or indirectly via LPP session associated with an anchor WTRU.

A collaborative or member WTRU may be associated with, or a member of, different collaborative WTRU groups and anchor WTRUs, where each of the associations may be identified with one or more identifiers/IDs (e.g., LPP group ID, per-group anchor WTRU ID, per-group collaborative WTRU ID).

A collaborating WTRU or member WTRU, in the context of collaborative positioning, may refer to any WTRU, including an anchor WTRU or collaborative WTRU, which participates in any of the actions which results in determining the positioning information of one or more WTRUs. A collaborating WTRU, such as a reference WTRU, device, and/or node, may be involved in collaborative positioning regardless of whether the WTRU is associated with a collaborating WTRU group for positioning or other purposes.

As used herein, the terms anchor WTRU, member WTRU, and collaborative WTRU are non-limiting. Other terminologies that may be used when referring to an anchor WTRU may include 'central WTRU', 'primary WTRU', etc. Other terminologies that may be used when referring to a collaborative WTRU may include 'assisting WTRU', 'supporting WTRU', 'secondary WTRU', etc.

WTRU-based and LMF-based (i.e. WTRU-assisted) positioning for RAT-dependent positioning may be supported. The WTRU behavior and the procedures for supporting collaborative positioning, including one or more steps in any given positioning procedures, not limited to configuration, measurements and reporting, may be supported by multiple WTRUs collaboratively with low latency and high accuracy are unknown.

In some positioning methods, the location of a WTRU may be determined on a per-WTRU basis. This may be done using an LPP session where the LPP protocol is established between the WTRU and LMF for providing a positioning configuration (i.e., PRS resources) and reporting of the positioning measurement results. Using LPP procedures for determining the positioning information of one or more WTRUs collaboratively is unknown.

In current DL based positioning techniques, if multiple WTRUs are located close to each other (e.g., in XR or IIoT use cases), for example within a certain threshold distance, the entire positioning procedure is applied individually for each WTRU. Each WTRU, regardless of the proximity, is configured with one or more PRS configurations, performs measurements of the PRS and sends measurement reports to LMF. This can result in wastage of resources and power inefficiency. Even when some of the PRS beams seen by the WTRU are blocked, the signaling to provide new configuration information and/or to select another device for measurement can result in high latency due to interaction between WTRU and LMF.

In current UL-based positioning techniques, the WTRUs are individually configured with SRS for positioning (SRSp) resources via RRC signaling. The transmission of the SRSp by the individual WTRUs is then received by different TRPs/gNBs in the network for performing positioning measurements and reporting of the measurements to the LMF for positioning calculation. When the WTRUs are in close proximity, the procedures for performing UL-based positioning individually may result in wastage in WTRU power and resource inefficiency without realizing a significant gain in positioning accuracy.

In current DL&UL based positioning techniques (e.g., multi-RTT positioning techniques), each WTRU is individually configured with DL-PRS configuration and UL-SRSp configurations. Each WTRU, regardless of the proximity, performs measurement of the DL-PRS, transmits the SRSp and reports to LMF the time difference between reception of DL-PRS and transmission of SRSp. Similar to other positioning methods, the different steps performed by the WTRUs can result in power inefficiency, increased latency and high resource utilization.

Accordingly, it may be desired to leverage different WTRUs in proximity for determining the location of one or more WTRUs with high accuracy, low latency and high resource utilization efficiency.

The term SRS for positioning (SRSp), as used herein, refers to an SRS signal/transmission used for positioning. Resources for SRS positioning may be defined (e.g., signalled) by RRC protocol signaling. An SRS resource set and SRS resource configured for positioning may be specified. SRSp or SRS may include one or more of the following: an SRS which is configured with SRS-PosResourceSet-r16 and SRS-PosResource-r16 information element (IE) messages; an SRS which is configured under SRS-ResourceSet and SRS-Resource; an SRS which is not configured under SRS-PosResourceSet-r16 and SRS-PosResource-r16 IE messages; an SRS which is not configured under SRS-ResourceSet and SRS-Resource; an SRS which is not associated with SRS-PosResourceSet-r16, SRS-PosResource-r16, SRS-ResourceSet or SRS-Resource uplink reference signal that is associated for positioning; a DM-RS for uplink; and/or a PTRS for uplink.

PRS or SRS used in this invention are not limited to RS used for positioning. The techniques, devices, and systems described herein can be applied to or used with any DL or UL reference signals.

Some implementations involve a positioning configuration. A positioning configuration may include a set of information related to positioning measurement and/or SRSp transmission. One or more of following information may be included in or indicated by a positioning configuration: one or more positioning methods used (e.g., DL-TDOA, UL-TDOA, DL-AoD, UL-AoA, Multi-RTT); a PRS configuration; an SRSp configuration; an uplink resource (e.g., PRACH, PUSCH, PUCCH) to report the positioning measurement; and/or one or more threshold values to determine the positioning measurement quality; and/or a positioning mode of operation (e.g., starting positioning mode of operation).

A PRS resource configuration may include or indicate one or more of the following: a PRS resource ID; a PRS sequence ID, or other IDs used to generate PRS sequence; a PRS resource element offset; a PRS resource slot offset; a PRS symbol offset; a PRS QCL information; a PRS resource set ID; a list of PRS resources in the resource set; a number of PRS symbols; a muting pattern for PRS, muting parameters such as repetition factor, muting options; a PRS resource power; a periodicity of PRS transmission; a spatial direction information of PRS transmission (e.g., beam information, angles of transmission); and/or a spatial direction information of UL RS reception (e.g., beam ID used to receive UL RS, angle of arrival).

An SRSp resources configuration may include or indicate one or more of the following: a resource ID; comb offset values; cyclic shift values; a start position in the frequency domain; a number of SRSp symbols; a shift in the frequency domain for SRSp; a frequency hopping pattern; a type of SRSp, e.g., aperiodic, semi-persistent or periodic; a sequence ID used to generate SRSp, or other IDs used to generate SRSp sequence; spatial relation information, indicating which reference signal the SRSp is related to spatially; a resource set ID; a list of SRSp resources in the resource set; a transmission power related information; a pathloss reference information which may contain index for SSB, CSI-RS or PRS; a periodicity of SRSp transmission; spatial direction information of SRSp transmission (e.g., beam information, angles of transmission); and/or spatial direction information of DL RS reception (e.g., beam ID used to receive DL RS, angle of arrival)

As the part of the configuration, the WTRU may receive information related to the cell ID, global cell ID or TRP ID which is associated with PRS. For example, in some implementations, the TRP which transmits PRS is identified by the TRP ID, which may belong to a cell identified by the cell ID. In some implementations, the WTRU may be configured with timing information such as SFN offset for PRS or SRSp transmission. In some implementations, the offset is introduced to prevent the WTRU from receiving overlapping PRS in the time domain.

Some implementations may include methods devices, and systems for supporting collaborative positioning. In some implementations, a WTRU may perform collaborative positioning based on distribution of positioning configuration and measurements. For example, in some implementations, a WTRU may initiate and/or perform collaborative positioning by sending a request to network (e.g., to LMF and/or gNB in RAN) for supporting collaborative positioning, e.g., if triggered by one or more configured conditions associated with collaborative positioning (e.g., as described further herein). Collaborative positioning may refer to any of one or more steps involved in a positioning procedure performed by multiple WTRUs in a collaborative group for determining the location information of at least one of the WTRUs in the group. In some implementations, collaborative positioning may involve an anchor WTRU and a collaborative WTRU, where the different WTRUs may perform measurements of one or more DL-PRS received from at least a subset of visible TRPs/gNBs (e.g., the RSRP of PRS received from a TRP/gNB is above a RSRP threshold value). Collaborative positioning may include reporting of the measurements and (e.g., along with) other information related to relative location of the WTRUs with respect to each other in a collaborative group, for example. After the measurements and/or other information related to relative location are reported, the location of at least the anchor WTRU may be determined (e.g., at LMF or anchor WTRU) based on the measurement reports and the relative location information sent by the WTRUs, for example.

Collaborative positioning may include interaction and transfer of information between WTRUs in a collaborative group and LMF, where one or more WTRUs may send positioning capability information, may receive the positioning configuration (e.g., in assistance information), and may report the positioning measurements to the LMF in the network.

In some implementations, the interaction between one or more collaborating WTRUs and the LMF, including transfer of assistance information and measurement reports, for example, may include and/or be supported via the LTE positioning protocol (LPP) protocol. The LPP protocol may be established at one or more of the collaborating WTRUs and LMF, e.g., when establishing an LPP session, to facilitate transfer of positioning related configuration and positioning information/measurements, for example.

Collaborative positioning for downlink (D)L-based positioning may refer to any positioning methods where the positioning measurements are distributed over multiple WTRUs belonging to a collaborative WTRU group. For example, in some implementations an anchor WTRU may collect the measurements (e.g., over a sidelink interface between the WTRUs) and may report the collected measurements (and may report its own measurements) to LMF. In some implementations, the collaborating WTRUs may directly report the measurements related to location of one or more WTRUs in the collaborative group to the LMF. Positioning methods that may be applicable for collaborative positioning may include WTRU-assisted collaborative positioning, or WTRU-based collaborative positioning.

In WTRU-assisted collaborative positioning, in some implementations, an anchor WTRU and one or more collaborative WTRUs may share a group LPP session and/or use their respective LPP sessions for receiving assistance information, making positioning measurements and sending measurement reports/location estimates to LMF to locate one or more WTRUs in a collaborative group.

In WTRU-based collaborative positioning, in some implementations, an anchor WTRU and one or more collaborative WTRUs may share a group LPP session and/or use their respective LPP sessions for receiving assistance information, making positioning measurement and sharing the measurements with each other for determining the location of one or more WTRUs in a collaborative group.

Some implementations include procedures for supporting collaborative positioning. Some example supporting procedures include discovery and establishment of collaborative WTRU group, determining assistance information for supporting collaborative positioning, and/or measurement and reporting for collaborative positioning.

In some implementations, discovery and establishment of collaborative WTRU group includes a WTRU discovering another WTRU in proximity (e.g. within a threshold distance) for participating in collaborative positioning, and the WTRU sending capability information (e.g. including information on WTRU in proximity) to the network (e.g. LMF and/or gNB) regarding support for collaborative positioning.

Figure 2:
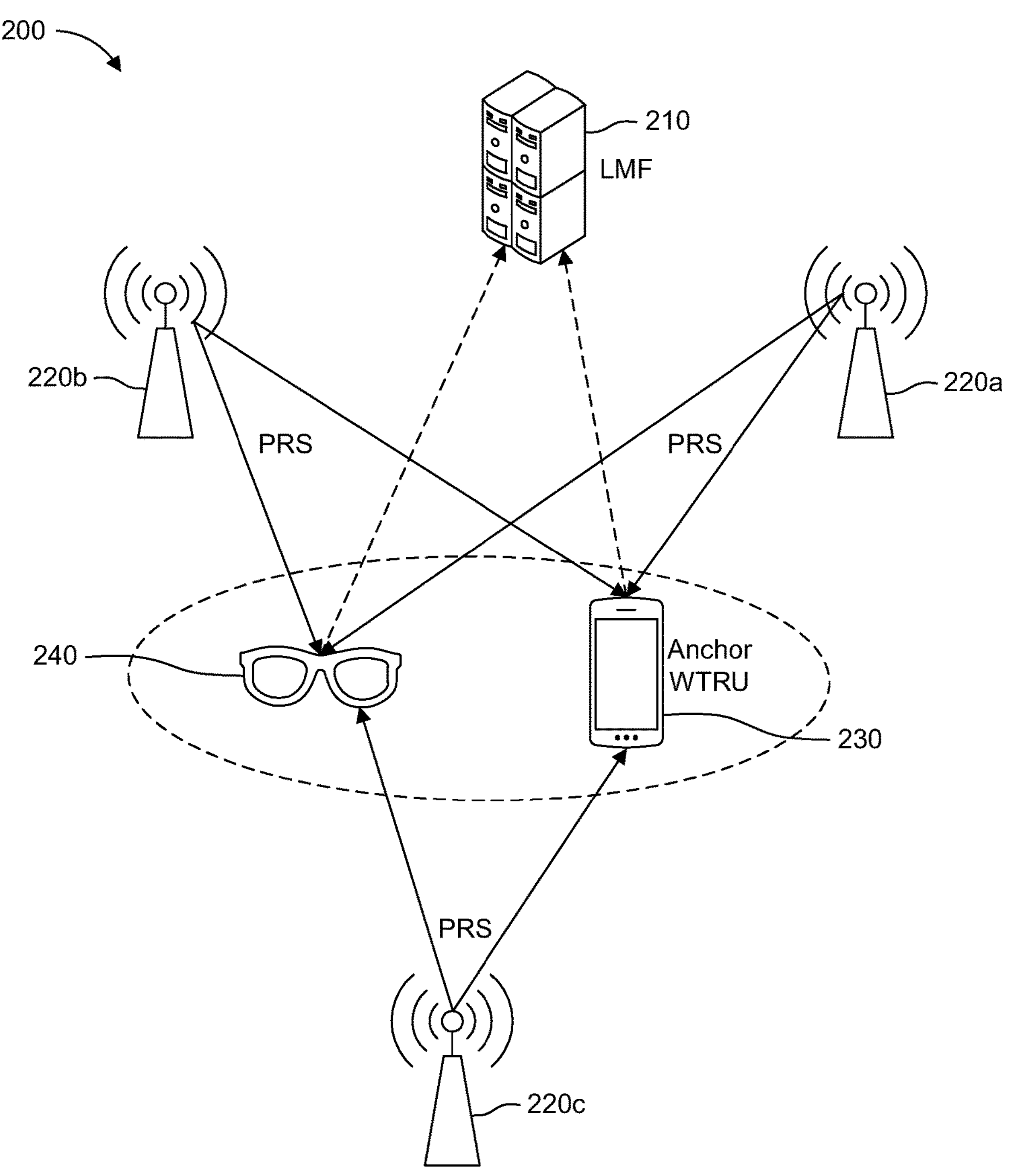
FIG. 2 is a system diagram illustrating signaling among a plurality of WTRUs for a positioning procedure.

In some implementations, determining assistance information for supporting collaborative positioning includes the WTRU determining a PRS configuration to use for collaborative positioning from assistance information, measuring and reporting of DL-PRS/sidelink-PRS for collaborative positioning, performing measurements intended for collaborative positioning based on configured triggering conditions, and/or sending positioning information (e.g., measurement reports and/or location estimates) after making measurements of DL-PRS/sidelink-PRS for collaborative positioning FIG. 2 is a system diagram illustrating a system 200 that includes an LMF 210, multiple TRPs 220*a*, 220*b*, 220*c*, and a WTRU 230 that is serving as an anchor WTRU 230. In the example of FIG. 2, each WTRU performs the full positioning procedure, including making measurements of PRS received from TRP1 220*a*, TRP2 220*b* and TRP3 200*c*, regardless of proximity with each other. WTRU 240 is represented as a pair of spectacles that may represent a new device form factor for a WTRU. For example the WTRU 240 may be any one of augmented reality (AR), virtual reality (VR), or mixed reality (MR) glasses, headset, wearable device and/or a head mounted display (HMD). WTRU 240 may also be any other device capable of transmitting and receiving wireless signals with the TRPs 220*a*, 220*b*, 220*c*.

Figure 3:
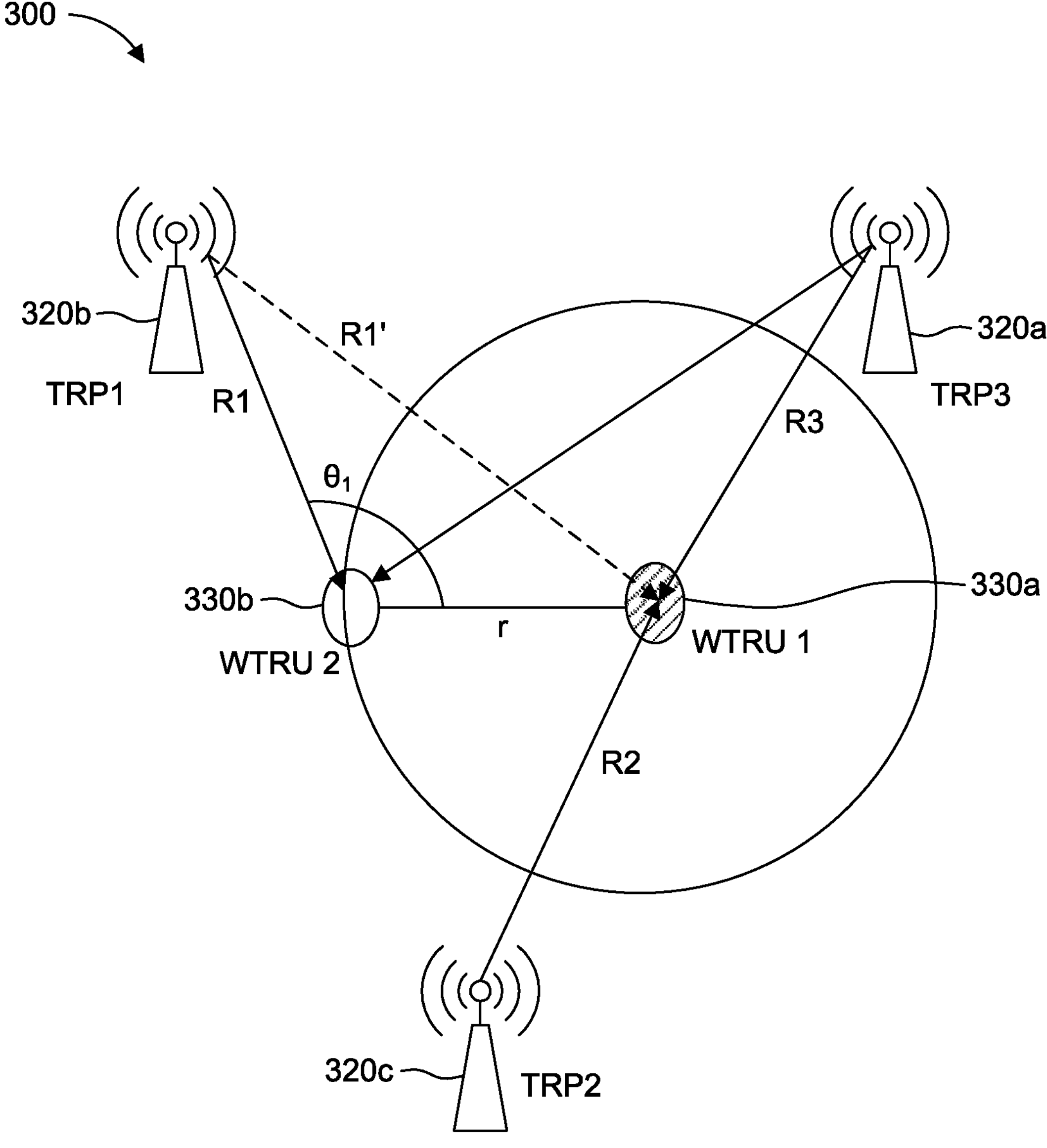
FIG. 3 is a system diagram illustrating signaling among a plurality of WTRUs for a positioning procedure.

FIG. 3 is a system diagram illustrating signaling among the system of FIG. 2. In FIG. 3, a plurality of WTRUs 330*a*, 330*b*, perform a positioning procedure according to some implementations, where a location of WTRU1 330*a* may be determined based on R2, R3 and R1' where R1' is function of r and θ1, and where a subset of measurements are made by WTRU1 and WTRU2. The full set of measurements would have resulted in making measurements of PRS received from TRP1 320*b*, TRP2 320*c*, and TRP3 320*a*. The subset of measurements made by WTRU1 330*a* includes measurements of PRS received from TRP2 320*c* and TRP3 320*a*. The subset of measurements made by WTRU2 330*b* includes measurements of PRS received from TRP1 320*b*.

In some implementations, a WTRU discovers other WTRUs in proximity (e.g. within a threshold distance) for collaborative positioning. Proximity may be determined for example using a distance threshold, direction/orientation threshold (e.g. other WTRUs are within a maximum angle width associated with the direction of the WTRU), RSRP threshold (e.g. RSRP measurement of a SL signal received from other WRTU is less than or equal to an RSRP threshold) or path loss threshold (e.g. path loss measurement of a SL signal or an indication received from other WRTU is less than or equal to a path loss threshold). For example, in some implementations, a WTRU establishes a group which includes one or more collaborating WTRUs based on configured conditions and/or criteria (e.g., as described further herein) for collaborative positioning. A group which includes at least an anchor WTRU and one or more collaborating WTRUs may be established for WTRU-assisted or WTRU-based collaborative positioning. In some implementations, an anchor WTRU may discover one or more other WTRUs over a sidelink, e.g., using a procedure that includes discovery for collaborative positioning and solicitation for collaborative positioning.

In some implementations, discovery for collaborative positioning includes the WTRU making itself visible and/or detectible to other WTRUs, e.g., by sending a discovery message over a sidelink interface (e.g., a sidelink broadcast channel), the discovery message indicating that the WTRU is capable of supporting collaborative positioning.

In some implementations, solicitation for collaborative positioning includes the WTRU inquiring of other WTRUs, e.g., by sending a solicitation message over a sidelink interface (e.g., a sidelink unicast and/or broadcast channel), the solicitation message requesting of other WTRUs in proximity information whether they support collaborative positioning.

The information that may be sent by the WTRU (e.g., the anchor WTRU) in discovery/solicitation message or messages to other WTRUs may include one or more of the following: service IDs; information regarding positioning capability; transmission of a sidelink PRS; a request for transmission of a sidelink PRS; information regarding absolute and/or relative positioning of the WTRU; and/or information regarding the TRPs and/or gNBs.

Regarding service IDs, for example, in some implementations the WTRU may send one or more service IDs (e.g., LPP positioning service IDs) which may correspond to performing positioning collaboratively. Regarding information regarding positioning capability, for example, in some implementations the WTRU may request information regarding the capability of the other WTRU or WTRUs to support one or more positioning methods (e.g., DL-based, UL-based, DL&UL-based). In some implementations, the anchor WTRU may include a list of one or more positioning methods supported by the anchor WTRU, possibly along with a preference value associated with the positioning method. In some such implementations, a collaborating WTRU may respond if its own preference value for supporting a positioning method matches with that indicated by the anchor WTRU, for example. Regarding transmission of a sidelink PRS, for example, in some implementations the WTRU may transmit an RS with a particular configured pattern, including sidelink PRS, which may be known/configured in the collaborating WTRUs, for determining the possibility for supporting collaborative positioning. Regarding a request for transmission of a sidelink PRS, for example, in some implementations the WTRU may request one or more of the other WTRU or WTRUs to trigger the transmission of sidelink PRS such that the anchor WTRU may perform measurements on the PRS sent by other WTRU or WTRUs which intend to join the collaborating group. In some implementations, the anchor WTRU may also include a configuration for sidelink resources (e.g., aperiodic, periodic, semi-persistent) in the request, that may be used by the other WTRUs for sending the sidelink PRS. Regarding information for absolute and/or relative positioning information of WTRU, for example, in some implementations the WTRU may send information related to its estimated location (e.g., coordinates determined via GNSS), estimated relative distance from other WTRUs/landmarks/anchor-points, orientation of device, etc. Regarding information on the TRPs/gNBs, for example, in some implementations the WTRU may send information related to the TRPs/gNBs that are detectable by and/or configured in the anchor WTRU, possibly for positioning. In some implementations, the information sent by the WTRU may include the TRP/gNB/cell IDs and/or measurements (e.g., RSRP) made on the RS/beams received from the corresponding TRPs/gNBs. In some implementations, the anchor WTRU may request the other WTRUs to make initial measurements of the indicated TRP/gNBs and report the measurements to determine whether the other WTRUs are able to receive the RS/beams from the TRPs/gNBs with better radio channel conditions compared to anchor WTRU (e.g., RSRP measured by other WTRU is higher than the RSRP measured by anchor WTRU).

In some implementations, if a collaborative WTRU in proximity with a WTRU meets one or more conditions in certain configured criteria for supporting collaborative positioning, the WTRU may send a response indication message (e.g., directly via sidelink to an anchor WTRU and/or to the network) for joining the collaborative group. If the collaborative WTRU does not meet the one or more conditions in the criteria, the WTRU may either not send any response indication to the anchor WTRU or may send a response indication indicating a rejection for participating in collaborative positioning, possibly including an indication of a rejection cause (e.g., an indication of a reason for rejecting the request message from the anchor WTRU). The configured conditions and/or criteria (e.g., configured by network via RRC and/or LPP) used by a collaborating WTRU or WTRUs for determining whether to send response indication message (e.g., to anchor WTRU) may include one or more of the following: information matching higher layer and/or service IDs; information indicating a positioning capability; information indicating SL channel and/or load conditions; information indicating positioning criteria; and/or information indicating measurements of TRPs and/or gNBs.

In some implementations, information matching higher layer and/or service IDs includes, for example, where the collaborating WTRU may send an indication when detecting a service ID (e.g., a sidelink L2 source ID) in the discovery and/or solicitation message received from an anchor WTRU. In some implementations, the service ID is also configured, preconfigured, and/or available in the collaborating WTRU. In some implementations, the service ID may indicate a service corresponding to supporting collaborative positioning.

In some implementations, information indicating an information positioning capability includes, for example, an indication sent by the collaborating WTRU when determining that the one or more positioning methods currently supported or is within the WTRU's capability to support match with those indicated by the anchor WTRU in the discovery and/or solicitation message. For example, in some implementations, when the positioning methods are compatible and/or match, the collaborating WTRU may include information regarding its existing LPP session (e.g., LPP session ID), information regarding an existing Uu link configuration (e.g., WTRU ID, C-RNTI, CG resource config), an RRC state of the collaborating WTRU (e.g., CONNECTED, INACTIVE, IDLE), when sending the response indication.

In some implementations, information indicating SL channel and/or load conditions includes, for example, where the collaborating WTRU may send an indication when the quality and/or loading of the SL channel used by the anchor WTRU meets certain measurement criteria such as the SL channel RSRP/RSRQ and/or CBR is above/below a threshold and remains above/below a threshold for a certain duration.

In some implementations, information indicating positioning criteria includes, for example, where the collaborating WTRU may send an indication when the relative/absolute location of the collaborating WTRU (possibly determined based on measurements of the sidelink PRS sent by the anchor WTRU and/or reported by the anchor WTRU, e.g., based on receiving the sidelink PRS sent by collaborating WTRU, and/or by the network) meets certain positioning criteria. In some implementations, the positioning criteria used by the collaborating WTRU for deciding whether to send an indication to the anchor WTRU may include that the distance from the anchor WTRU is below certain distance and/or within a certain distance range (e.g., within upper/lower bound distance range) and/or that an angle or angles formed by the link and/or a line between the anchor WTRU and a collaborating WTRU and the link and/or a line between one or more TRPs/gNBs (e.g., indicated by anchor WTRU) and a collaborating WTRU is above or below an angle threshold or thresholds.

In some implementations, information indicating measurements of TRPs and/or gNBs includes, for example, where the collaborating WTRUs may include, in the response indication, information regarding the initial measurements made on the RS and/or beams received from TRPs and/or gNBs, where the request for initial measurements may be indicated by the anchor WTRU and/or be directly detectable at the collaborating WTRUs. In some implementations, the collaborating WTRU may report the one or more TRPs/gNBs which may meet a filtering criterion, where the filtering criterion may indicate reporting the measurements made on the RS/beams received from one or more TRPs/gNBs which are above certain RSRP/RSRQ/RSSI threshold. In some such implementations, the collaborating WTRU may include, in the response message to anchor WTRU, the information regarding TRP and/or gNB IDs and/or the associated measurements, for example.

In response to reception of the response indication from one or more other WTRU, the anchor WTRU may select a collaborating WTRU or WTRUs which meet certain configured criteria. In some implementations, the criteria may be similar to the criteria for the collaborating WTRUs for sending a response indication, described above. In some implementations, the anchor WTRU may select the best N collaborating WTRUs from M collaborating WTRUs (e.g., where M>=N) which meet the criteria, for example. In an example, the N collaborating WTRUs selected may be the collaborating WTRUs located within a distance range (e.g., within an upper and/or lower bound distance, or with in a predetermined range) from the anchor WTRU.

After selecting the one or more collaborating WTRUs for positioning, the anchor WTRU may initiate a group formation procedure. In some implementations, the group formation procedure includes an authorization procedure (e.g., an anchor UE-initiated authorization or collaborative initiated authorization involving the exchange of identifiers including session/service IDs and/or WTRU IDs between anchor WTRU and collaborative WTRU, an exchange of security keys directly via SL or indirectly via NW, an exchange of challenge and response messages between anchor WTRU and collaborative WTRU directly via SL or indirectly via NW, and network-assisted authorization with anchor WTRU transmitting/receiving an indication indicating authorization of a collaborative WTRU), establishment of sidelink connectivity (e.g., configuration of PC5-RRC, sidelink radio bearers, and/or sidelink PRS configuration for positioning, etc.) and triggering of an LPP procedure for collaborative positioning (e.g., transfer of capability information to LMF, and/or reception of assistance information from LMF), for example.

In some implementations, a WTRU sends capability information to the network regarding its support for collaborative positioning. For example, in some implementations, the WTRU may send capability information to the network for supporting collaborative positioning with one or more collaborative WTRUs located in proximity. In an example, an anchor WTRU may initially trigger the discovery procedure over sidelink for determining which if any collaborating WTRU meets certain configured criteria for participating in collaborative positioning. After determining the information related to the relative location of the collaborating WTRUs (e.g., distance, direction), the anchor WTRU may trigger the LPP procedures by sending the capability information to network (e.g., LMF and/or gNB), including information on the collaborating WTRUs. In this case, the capability information may be sent using the LPP capability transfer procedure/signalling, for example.

In some implementations, capability information indicating the support for collaborative positioning by the anchor WTRU may be sent in both WTRU-assisted and WTRU-based collaborative positioning. In the case of WTRU-assisted positioning, the capability information sent to the network may indicate the capability of the WTRUs to perform independent and distributed measurements. The calculation of the location information of one or more collaborating WTRUs may be performed at the network based on the combined and/or collected measurement report or reports sent by at least a one WTRU in the collaborating group. In the case of WTRU-based positioning, the capability information sent to the network may indicate the capability of the WTRUs to perform independent and/or distributed measurements. The calculation of the location information of one or more collaborating WTRUs may be performed by one or more of the WTRUs (e.g., by the anchor WTRU) based on the measurement report or reports sent by the WTRUs in the collaborating group.

In some implementations, the capability information for collaborative positioning may be sent by the anchor WTRU either before or after determining the capability of other collaborating WTRUs in proximity (e.g., after receiving the response indication from other WTRUs over sidelink). For example, an anchor WTRU which may have a pre-existing LPP session, may send the capability information for supporting collaborative positioning with another one or more collaborating WTRUs by including, in the LPP capability information message, the information on the collaborating WTRUs (e.g., IDs of collaborating WTRUs, IDs of pre-existing LPP sessions of collaborating WTRU, relative location of collaborating WTRUs).

In some implementations, the capability information for collaborative positioning may be sent by a collaborating WTRU, possibly directly to the network (e.g., gNB or LMF) via its own Uu interface. In some such implementations, the capability information may be sent either before or after sending a response indication to one or more anchor WTRUs for supporting collaborative positioning, for example. In some implementations, a collaborating WTRU which may have a pre-existing LPP session may send the capability information for supporting collaborative positioning with another anchor WTRU by including, in the LPP capability information message, the information on the anchor WTRU (e.g., an ID of the anchor WTRU, ID of the LPP session of the anchor WTRU, and/or the relative location of the anchor WTRU).

Triggering conditions monitored by a collaborating WTRU (e.g., an anchor or collaborative WTRU) for sending information regarding the capability for collaborative positioning may include, for example, reception of an LCS request from higher layers and/or an application; detection of collaborating WTRUs, devices, and/or nodes, and/or a change in radio conditions.

In some implementations, reception of an LCS request from higher layers and/or an application includes, for example, where the WTRU may send the capability information when triggered by the LCS client/application in the WTRU or in external network. In some such examples, the anchor WTRU may indicate the capability for performing collaborative positioning, possibly when the higher layer indication may contain a trigger and/or information (e.g., information such as IDs and/or initial location on other WTRUs/devices/nodes in proximity) for supporting collaborative positioning, for example.

In some implementations, detection of collaborating WTRUs includes, for example, where the WTRU may send the capability information when determining the presence of one or more WTRUs and/or devices in proximity (e.g., via discovery and/or solicitation over sidelink). In some implementations, the WTRU may send the capability information after determining the capability and/or selecting the other WTRUs and/or devices for supporting collaborative positioning when meeting certain conditions and/or criteria (e.g., as described above).

Regarding a change in radio conditions, in some implementations, the WTRU may send capability information when triggered by a change in the radio conditions detectable at the WTRU. In an example, a WTRU configured to perform positioning measurements on DL-PRS may trigger a discovery/solicitation procedure for selecting collaborating WTRUs and. The WTRU may send capability information containing information on the selected collaborating WTRU when determining the existing positioning measurements made are unable to meet a positioning accuracy requirement (e.g., RSRP of DL-PRS measured by WTRU is below a threshold), for example.

In some implementations, the capability information sent by WTRU to the network (e.g., LMF and/or gNB) for supporting collaborative positioning may include information regarding an anchor WTRU capability; information indication or regarding WTRUs in a collaborating group; information regarding positioning methods supported by the anchor WTRU and/or collaborating WTRUs; information regarding the location (e.g., an initial location) of collaborating WTRUs; and/or information regarding the mobility of collaborating WTRUs.

Regarding the anchor WTRU capability, in some implementations, the WTRU may send information regarding a capability for supporting collaborative DL-based positioning, including capability performing own measurements, distributing the measurement configuration, combining measurements made by other collaborating WTRUs and reporting the measurements made by different WTRUs. For UL-based positioning, the WTRU may send information for performing SRSp transmission and coordinating with other collaborating WTRUs for transmitting SRSp, for example.

Regarding the information indicating WTRUs in a collaborating group, in some implementations, the WTRU may send the IDs of the WTRUs in a group, a number of WTRUs, and/or LPP session IDs (e.g., for one or more WTRUs with pre-existing LPP sessions). In some implementations, the WTRU may include information on the bandwidth configured in the other collaborating WTRUs for measurements, for example. In some implementations, the WTRU may also include information on the antenna configuration of the collaborating WTRUs, e.g., including the number of antenna panels, orientation of the panels, etc.

Regarding the positioning methods supported by anchor WTRU and/or collaborating WTRUs, in some implementations, the WTRU may send information regarding the positioning methods (e.g., timing based, angle based, DL-based, UL-based, WTRU-based, WTRU-assisted) supported by the collaborating WTRUs. In some implementations, the WTRU may send information regarding whether the collaborating WTRUs support the same or different positioning methods as supported by the anchor WTRU.

Regarding the information indicating or including the location (e.g., an initial location) of collaborating WTRUs, in some implementations, the WTRU may send information regarding relative and/or absolute distance and/or direction of one or more collaborating WTRUs in a group (e.g., as determined via sidelink positioning). In some implementations, the WTRU may indicate or include the absolute location of the collaborating WTRUs and/or devices, possibly known a-priori (e.g., for reference devices or nodes). The WTRU may send information regarding clustering and/or grouping information of other WTRUs, such as the distance of the collaborating WTRUs from anchor WTRU and/or a distance range corresponding to minimum and/or maximum distance of the collaborating WTRUs from anchor WTRU, for example. In some implementations, the WTRU may send information regarding measurements and/or location estimates made by one of more selected collaborating WTRUs, possibly the measurements made by the collaborating WTRU or WTRUs on existing PRS configurations, sidelink PRS, CSI-RS, and/or beams.

Regarding the information indicating or including the mobility of collaborating WTRUs, in some implementations, the WTRU may send information regarding the relative movement and/or mobility of one or more collaborating WTRUs with respect to the anchor WTRU. In some implementations, the WTRU may indicate whether the collaborating WTRUs are moving together or along with the anchor WTRU, e.g., in a particular direction or speed. In some implementations, the WTRU may indicate whether the collaborating WTRUs are moving independent of the anchor WTRU, possibly along with the mobility information of the WTRUs (e.g., absolute and/or relative speed and/or direction).

Some implementations include WTRU assistance in managing group LPP context for collaborative positioning. In some implementations, a WTRU may assist the network (e.g., LMF) in supporting group context based on establishment of LPP session for collaborative positioning, including one or more collaborating WTRUs. In some implementations, the established LPP session, e.g., after the WTRU sends the capability info, may be managed as a group LPP session, e.g., including multiple WTRUs in a collaborating WTRU group.

For example, in some implementations the LPP messages intended for all or a subset of WTRUs in a collaborating group may be received by an anchor WTRU of the collaborating group, which may host the group LPP session by maintaining the group LPP protocol layer for receiving and/or relaying and/or sending any LPP messages associated with the group. In some implementations, the LPP messages intended for one or more WTRUs in a collaborating group may be associated with and/or include a group LPP session ID. In some implementations, after establishment of group context, the LMF maintains and/or manages the information regarding the one or more collaborating WTRUs which are associated in the group. The information related to different WTRUs, managed in the group context (i.e., associated with a group LPP ID) may include the WTRU IDs, dedicated LPP session IDs of the individual WTRUs (e.g., when established and/or available), location information of WTRUs (e.g., positioning measurements and/or location estimates received from a WTRU and/or behalf of a WTRU), etc., for example.

In some implementations, the group context may be maintained/managed at the LMF and/or anchor WTRU. In some such implementations, the LMF may send any LPP messages intended for one or more of the collaborating WTRUs (regardless of whether the collaborating WTRUs have a Uu link and/or LPP session with the network) to an anchor WTRU by including the destination WTRU ID and/or destination LPP session ID and correspondingly, the anchor WTRU may forward or relay the LPP messages to or from the collaborating WTRUs, for example.

In some implementations, the different WTRUs in a collaborating WTRU group may use their individual LPP session for sending and/or receiving LPP messages, including information received from or intended for other collaborating WTRUs. In some such implementations, the WTRUs sending and/or receiving LPP messages of other collaborating WTRUs may be encapsulated and/or include the WTRU ID or the LPP session ID of the other intended WTRU.

In some implementations, an LPP session may be established between an anchor WTRU and one or more collaborative WTRUs over the respective sidelink interfaces. In some such implementations, the anchor WTRU may provide the assistance information (e.g., PRS configurations) to the collaborative WTRU or WTRUs in either unicast, groupcast or broadcast transmissions over sidelink. In some implementations, the anchor WTRU may also send the LPP messages (e.g., LPP request location information) for triggering to initiate measurements at the collaborative WTRU or WTRUs and for requesting the measurement report/location estimates, for example. In some implementations, the collaborative WTRU or WTRUs may make measurements using the assistance information (e.g., PRS configuration or configurations) received from the anchor WTRU and may send the LPP messages containing the measurement reports and/or location estimates to the anchor WTRU, for example.

Some implementations may include support for collaborative DL-based positioning For example, in some implementations, a WTRU determines a PRS configuration to use for collaborative positioning based on assistance information. In some implementations, a WTRU determines the PRS configuration or configurations to use for collaborative DL-based positioning, including a PRS configuration or configurations applicable for the anchor WTRU and/or for one or more collaborating WTRUs, based on the assistance information received from network. In some implementations, the procedures associated with sending a request for assistance information, delivery of assistance information from network to one or more WTRUs, and determining the PRS configuration or configurations to use for collaborative positioning may be applicable for both WTRU-assisted and WTRU-based collaborative positioning.

In some implementations, a collaborating WTRU (e.g., an anchor or collaborative WTRU) may receive the assistance information containing the one or more PRS configurations for collaborative positioning, e.g., after sending a request for assistance information to the network (e.g., LMF or gNB) and/or the anchor WTRU. The request for assistance information may be intended for requesting one or more new PRS configurations or updating existing PRS configurations, for example. The triggering conditions for sending a request for assistance information for collaborative positioning may include a higher layer indication; an LPP message transmission; a positioning information transmission; the WTRU radio environment; validity conditions; and/or a collaborative WTRU request.

Regarding the higher layer indication triggering condition, in some implementations, the WTRU may send a request for assistance info, implicitly or explicitly when sending the indication from LCS client/application to network for positioning.

Regarding the LPP message transmission triggering condition, in some implementations, the WTRU may send a request for assistance info, e.g., via LPP procedure/signalling, implicitly or explicitly, when sending the LPP capability information message and/or LPP request for assistance information message. In some implementations, the WTRU may indicate support for collaborative positioning in the capability information and/or request for assistance information for receiving the corresponding assistance info.

Regarding the positioning information transmission triggering condition, in some implementations, the WTRU may send a request for assistance info, implicitly or explicitly, when sending positioning information that includes, e.g., a measurement report and/or location estimates, possibly determined based on measurements made on DL-PRS using an initial/first PRS configuration. In some such implementations, the WTRU may include, in the positioning information, a request for assistance information which includes a new and/or second and/or additional PRS configuration for collaborative positioning, for example.

Regarding the WTRU radio environment triggering condition, in some implementations, the WTRU sends a request for assistance information in response to detecting a change in the WTRU radio environment (e.g., blockage of PRS received from a TRP resulting in low RSRP, or presence of multipath), which may possibly render the existing PRS configuration at the WTRU unsuitable for making positioning measurements.

Regarding the validity conditions triggering condition, in some implementations, the WTRU may send a request for assistance information when one or more validity conditions (e.g., based on whether a time, timer, and/or area validity associated with an existing PRS configuration expire).

Regarding the collaborative WTRU request triggering condition, in some implementations, a collaborative WTRU may send a request for assistance information (e.g., to an anchor WTRU and/or network) for a new PRS configuration or for updating an existing PRS configuration, when determining the absence of any PRS configurations for collaborative positioning, the absence of information regarding relative positioning (e.g., distance, direction) with respect to an anchor WTRU, detection and/or discovery of an anchor WTRU, detection of a change in relative location of collaborative WTRU and/or anchor WTRU (e.g., due to movement), etc. for example. In some such implementations, an anchor WTRU which receives a request for assistance information from a collaborating WTRU and/or when the anchor WTRU is not able to respond with assistance information to a collaborating WTRU, may send or forward the request for assistance information to network, for example.

The WTRU may include, in the request for assistance information for collaborative positioning, one or more items of information (e.g., WTRU IDs, relative location of collaborating WTRUs, IDs of LPP sessions, etc.), similar to the information indicated when sending capability information, as described above. In some implementations, if the WTRU is configured with one or more PRS configurations for conventional non-collaborative positioning, the WTRU may send a request for assistance information to update the PRS configurations to support collaborative positioning. In some such implementations, the WTRU may include information and/or IDs for the existing PRS configurations to be updated; e.g., information regarding whether the existing PRS configuration may be updated for the use of one or more collaborating WTRUs, for example. In some implementations, the WTRU may send the request for assistance information (e.g., for new PRS configurations or updated PRS configurations) to the network (e.g., LMF or gNB) via the Uu link when the WTRU operates in RRC CONNECTED or RRC INACTIVE state, for example.

In some implementations, the WTRU may receive assistance information which includes one or more PRS configurations for collaborative positioning in a system information block (SIB) received from the gNB. In some such implementations, the WTRU may directly receive the PRS configuration to use for an anchor WTRU and/or a collaborating WTRU based on the assistance information for collaborative positioning accessible from the SIB (or a plurality of SIBs). Alternatively, in some implementations, if at least part of the assistance information (e.g., one or more PRS configurations) for collaborative positioning is unavailable via SIB, the WTRU may send a system information (SI) request (e.g., an on-demand SI request) to the network to request the additional assistance information and/or may use the dedicated assistance information received via LPP from the network (e.g., from the LMF or gNB), for example. In some implementations, the WTRU may receive the PRS configuration to be used by anchor WTRU via SIB and the WTRU may send an SI (e.g., an on-demand SI request) request to the gnB for receiving the PRS configuration to be used by the collaborating WTRU or WTRUs. In another example, the WTRU may receive the PRS configuration to be used by anchor WTRU via dedicated LPP message while the PRS configuration for collaborative WTRU may be received via SIB and/or on-demand SI.

The PRS configuration or configurations for collaborative positioning may be received by the WTRUs, including anchor WTRU and collaborative WTRU, via a NAS message; RRC signalling; system information; L2/L1 signaling on the Uu interface; SL signalling and/or data radio bearers; and/or L2/L1 signaling on the SL interface.

In implementations where the PRS configuration is received by the WTRU via a NAS message, for example, the LPP messages from LMF containing the one or more PRS configurations, which may be dedicated for different WTRUs or common to multiple WTRUs in a collaborative group, may be received in NAS message or messages via SRBs (e.g., SRB1, SRB2, SRB3) or DRBs.

In implementations where the PRS configuration is received by the WTRU via RRC signalling, for example, the one or more WTRUs in a collaborative group may receive the PRS configurations, possibly dedicated to the intended WTRU, via RRC signalling message or messages.

In implementations where the PRS configuration is received by the WTRU via system information, for example, the WTRUs may receive via SIB, the PRS configuration or configurations and possibly additional assistance information on using the PRS configurations in a collaborative group (e.g., criteria and/or rules for distributing the PRS configurations among anchor WTRU and collaborative WTRU).

In implementations where the PRS configuration is received by the WTRU via L2/L1 signaling on the Uu interface, for example, the WTRU may receive the PRS configuration or configurations and/or indication for activating/deactivating one or more PRS configurations, possibly preconfigured via LPP and/or RRC signalling, via L1/L2 signalling including MAC CE or DCI, for example.

In implementations where the PRS configuration is received by the WTRU via SL signalling/data radio bearers, for example, the collaborating WTRU or WTRUs may receive PRS configuration or configurations from the anchor WTRU via the sidelink interface/channels including via SL data radio bearers and/or sidelink signalling radio bearers (e.g., PC5 RRC), for example. In another example, the collaborating WTRU may receive the PRS configuration or configurations via sidelink LPP messages, possibly LPP messages from network relayed by the anchor WTRU and/or generated in a sidelink LPP session.

In implementations where the PRS configuration is received by the WTRU via L2/L1 signaling on the SL interface, for example, the collaborating WTRU or WTRUs may receive the PRS configuration or configurations and/or indication for activating/deactivating one or more PRS configurations, possibly preconfigured via LPP and/or RRC signalling on Uu interface and/or SL data/signalling interface (e.g., PC5-RRC), via sidelink L1/L2 signalling including SL MAC CE or SCI, for example.

In some implementations, a WTRU determines the PRS configuration for one or more collaborating WTRUs based on the assistance information received from the network. For example, the WTRU may determine the PRS configuration to use for collaborative positioning directly from assistance information, based on a split configuration, and/or by combining configurations.

In implementations where the WTRU determines the PRS configuration to use for collaborative positioning directly from assistance info, for example, the WTRU may receive in the assistance information, information indicating the one or more PRS configurations to be used by the anchor WTRU and/or one or more collaborating WTRUs. The WTRU may receive a mapping relation (e.g., along with the PRS configurations) which may indicate the mapping between the PRS configurations and the WTRUs (e.g., IDs) for which the PRS configurations are intended to or allowed, for example. In some implementations, an anchor WTRU which may receive the PRS configurations for the collaborating group may retain and use the PRS configuration intended for itself and/or send the PRS configurations intended to one or more other collaborating WTRUs via sidelink based on the received mapping between the PRS configurations and associated WTRU IDs, for example.

In some implementations, the mapping relation between the PRS configurations and intended/allowed WTRUs, which may be provided/configured in the WTRU via the assistance information, may be either 1-to-1 or 1-to-N or N-to-M. In the case where the 1-to-N or N-to-M mapping is configured, the WTRU may also receive the conditions/rules for using the one or more PRS configurations per WTRU. For example, the decision of selecting a PRS configuration for a collaborating WTRU from a set of candidate PRS configurations may be made by an anchor WTRU based on the configured criteria and/or rules. The criteria and/or rules for selecting a PRS configuration may include relative distance and/or direction of the collaborating WTRU or WTRUs, and/or measurement quality of the measurements made by the WTRU or WTRUs.

In implementations where the criteria and/or rules for selecting a PRS configuration include relative distance and/or direction of the collaborating WTRU or WTRUs, for example, a first PRS configuration may be used for two WTRUs in a collaborating group if the distance between the WTRUs is below or equal to a distance threshold value. In some implementations, a second PRS configuration may be used by the two WTRUs in the group if the distance between the WTRU is above the threshold value, for example. In this case, an anchor WTRU, may determine and select whether to use a first or a second PRS configuration to use along with a collaborative WTRU based on the determined distance between the two WTRUs, for example.

In implementations where the criteria and/or rules for selecting a PRS configuration include measurement quality of the measurements made by the WTRUs, for example, a collaborating WTRU configured to use a first PRS configuration may continue using the first PRS configuration so long as the RSRP measured on the DL-PRS is above a threshold. If the RSRP measured on the DL-PRS is below a threshold and remains below the threshold for a certain duration, the collaborating WTRU may use or may be indicated by the anchor WTRU to use a second PRS configuration, for example.

In implementations where the WTRU determines the PRS configuration to use for collaborative positioning based on a split configuration, for example, the WTRU may receive, in the assistance information, one or more PRS configurations to be used by the WTRUs in the collaborating group. In this case, the anchor WTRU, which may receive the PRS configurations, may split the PRS configurations and distribute the configurations to one or more collaborating WTRUs, for example. In some implementations, the anchor WTRU may split a PRS configuration into different sub-PRS configurations and may distribute the split configurations (e.g., over sidelink) such that different WTRUs in the collaborating group may perform measurements using the sub-PRS configurations. For example, a PRS configuration including one or more resources, resource sets and/or beams may be split into different sub-PRS configurations, where each split configuration may include a subset of the resources, resource sets and/or beams.

In some implementations, the anchor WTRU may split the PRS configuration by taking into account information associated with one or more collaborating WTRUs. In some implementations, to assist with the splitting of PRS configuration, the anchor WTRU may use additional criteria and/or rules, possibly received from network in assistance information and/or other configuration (e.g., RRC configuration). For example, the resources and/or beams associated with the PRS configurations may be split by the anchor WTRU by using certain criteria and/or rules, which may account for, e.g., relative distance and/or direction of the collaborating WTRU or WTRUs; measurement quality of the measurements made by the WTRUs; LOS/NLOS condition of the PRS received by the WTRUs; and/or RRC state and/or DRX configuration of the WTRUs:

In some implementations where the resources and/or beams associated with the PRS configurations are split by the anchor WTRU based on relative distance and/or direction of the collaborating WTRU or WTRUs, for example, the anchor WTRU may split the PRS configuration including different resource sets/beams and provide the split configurations to a collaborating WTRU located at a distance such that the diversity in the measurements made, and possibly the positioning accuracy achieved, is maximized. In some implementations, split PRS configurations which include different resource sets that are furthest apart in temporal and/or frequency domains (e.g., above a threshold number of time slots and/or frequency resources) may be provided to collaborating WTRUs whose relative distance may be below or above a distance threshold. In some implementations, split PRS configurations which include different resource sets that are nearest in temporal and/or frequency domains (e.g., below a threshold number of time slots and/or frequency resources) may be provided to collaborating WTRUs whose relative distance may be above or below a distance threshold.

In some implementations where the resources and/or beams associated with the PRS configurations are split by the anchor WTRU based on measurement quality of the measurements made by the WTRUs, for example, the anchor WTRU may provide the split the PRS configurations to the collaborating WTRUs based on the quality of measurement made by the WTRUs. In some implementations, the anchor WTRU may initially provide one and/or more of the split configurations to a collaborating WTRU and may request information regarding the measurements made on the different split configurations. In some implementations, the anchor WTRU may select a split configuration for the collaborating WTRU that indicates the best measurements (e.g., a maximum of the average RSRP measured on the different resources associated with different split configurations). In some implementations, the anchor WTRU may split the PRS configuration on the basis of the DL-PRS/beams receivable from a TRP/gNB. In some implementations, the anchor WTRU may then provide the split PRS configurations to the different collaborating WTRUs based on whether the collaborating WTRU is able to receive the DL-PRS/beam with a certain channel quality (e.g., RSRP of PRS/beam is above a threshold) from the TRP and/or gNB associated with the split PRS configuration, for example. In another example, the anchor WTRU may split PRS configurations based on boresight angle and/or AoD information associated with PRS configuration. Based on the knowledge of relative direction of the collaborating WTRU, the anchor WTRU may split PRS configurations based on the direction from which PRS is transmitted. The anchor WTRU may split PRS configurations based on TRP IDs with known coordinates and relative direction of the collaborating WTRUs.

In some implementations where the resources and/or beams associated with the PRS configurations are split by the anchor WTRU based on LOS/NLOS condition of the PRS received by the WTRUs, for example, the anchor WTRU may split and provide the split PRS configuration to a collaborating WTRU such that the probability of receiving PRS associated with the split PRS configuration at the collaborating WTRU via a LOS path is maximized and/or the probability of receiving via a NLOS path is minimized.

In some implementations where the resources and/or beams associated with the PRS configurations are split by the anchor WTRU based on RRC state and/or DRX configuration of the WTRUs, for example, the anchor WTRU may split and provide the split PRS configuration to a collaborating WTRU by considering the RRC state in which the collaborating WTRU may be operating. In some implementations, the anchor WTRU may provide to a collaborating WTRU in INACTIVE/IDLE state a split configuration that contains minimal PRS resources (e.g., below a resource threshold) such that the amount of measurements and reporting to be made by the collaborating WTRU may be minimal and/or corresponds to the low power RRC state. In some implementations, the anchor WTRU may split the PRS configuration by taking into account of the DRX configuration applied in the collaborating WTRU, possibly indicated to the anchor WTRU via sidelink. In some such implementations, the PRS configuration may be split such that the time/frequency resources in the split configuration aligns with the DRX configuration of the collaborating WTRU, for example.

In implementations where the WTRU determines the PRS configuration to use for collaborative positioning by combining configurations, for example, the WTRU may receive in the assistance information, one or more PRS configurations which may be combined when using the configurations in the collaborating group. The different PRS configurations may include different resources, resource sets and/or beams, which may be combined or augmented to realize a more comprehensive PRS configuration, possibly for realizing higher positioning accuracy, for example.

In some implementations, an anchor WTRU may receive the different PRS configurations for combining directly in the assistance information from the network, including in a dedicated LPP message and/or via SIB, for example. In some implementations, an anchor WTRU may receive the different PRS configurations for combining from one or more collaborating WTRUs, which may themselves received from the network in a dedicated LPP message, for example. In some implementations (e.g., in addition to the PRS configurations), the WTRU may also receive criteria and/or rules for combining the different PRS configurations to be used in the collaborative group. In some implementations, the criteria and/or rules for combining the PRS configurations (which may be received in assistance information) may include the relative distance and/or direction of the collaborating WTRU or WTRUs; and/or the measurement quality of the measurements made by the WTRUs.

In some implementations where the criteria and/or rules for combining the PRS configurations include a relative distance and/or direction of the collaborating WTRU or WTRUs, for example, the anchor WTRU may combine PRS configurations, where each configuration may include different resource sets/beams and provide the combined configuration to a collaborating WTRU such that the measurements made compensates for poor quality and/or unsuitable measurements at the anchor WTRU. In some implementations, a combined PRS configuration including higher number of resource sets/beams than another PRS configuration used by the anchor WTRU (e.g., the difference in the number of resources/beams between the first and second PRS configurations is above a threshold) may be provided to collaborating WTRUs whose relative distance may be above a distance threshold. Likewise, a combined PRS configuration including similar number of resource sets/beams than the another PRS configuration used by the anchor WTRU (e.g., the difference in the number of resources/beams in the first and second PRS configurations is below a threshold) may be provided to collaborating WTRUs whose relative distance may be below a distance threshold.

In some implementations where the criteria and/or rules for combining the PRS configurations include a measurement quality of the measurements made by the WTRUs, for example, the anchor WTRU may provide a combined PRS configuration to a collaborating WTRU based on the quality of measurement made by the WTRU. In some implementations, the anchor WTRU may initially provide a first PRSs configuration to a collaborating WTRU and/or request information on the measurements made on the first PRS configurations. In some implementations, the anchor WTRU may then combine/augment first PRS configuration with a second PRS configuration such that the combined/augmented PRS configuration may result in the collaborating WTRU making a higher number of measurements, which may possibly result in higher positioning accuracy, for example. In some implementations, the anchor WTRU may combine PRS configurations on the basis of the DL-PRS/beams receivable from one or more TRPs/gNBs. In some implementations, the anchor WTRU may then provide the combined PRS configurations to the different collaborating WTRUs based on whether the collaborating WTRU is able to receive the DL-PRS/beam with a certain channel quality (e.g., RSRP of PRS/beam is above a threshold) from a set of TRPs/gNBs associated with the combined PRS configuration, for example.

In some implementations, the anchor WTRU may relay PRS configuration information to the collaborating WTRU based on relative distance or direction of collaborating WTRUs. If the collaborating WTRUs are close enough to the anchor WTRU, the anchor WTRU may relay PRS configuration to collaborating WTRUs such that anchor WTRU and collaborating WTRUs can make measurements on the same set of PRS.

In some implementations where the anchor WTRU indicates the one or more PRS configurations to a collaborating WTRU, including the PRS configurations determined directly from the assistance information, split PRS configurations, and/or combined PRS configurations, the anchor WTRU may include PRS configuration information; information regarding the priority of the PRS configuration; and/or a reporting configuration.

In some implementations where the anchor WTRU includes PRS configuration information, the information may indicate or include one or more resources, resource sets, beams and/or TRPs/gNBs associated with the indicated PRS configuration; an ID of indicated PRS configuration/sub-PRS configuration; and/or a type of PRS configuration, including aperiodic, semi-persistent, periodic, along with timing information associated with the different indicated PRS configuration type such as start time/slot, periodicity and stop time/slot.

In some implementations where the anchor WTRU includes priority of PRS configuration, the one or more indicated PRS configurations may be assigned with a priority value. In some implementations, a standalone PRS configuration, where the anchor WTRU and a collaborative WTRU may use non-overlapping PRS configurations (i.e., resources/beams are different), may be assigned with a higher priority value. In contrast, in some implementations, a redundant PRS configuration, where both anchor and a collaborative WTRU may use a partially or fully overlapping PRS configuration, may be assigned with a lower priority value, for example. In this case, the priority value assigned to the different PRS configurations may depend on the degree of overlap, for example. In some implementations, the anchor WTRU may be configured by the LMF with a priority associated with each PRS configuration such that the anchor WTRU can make measurements using the priority associated with each PRS configuration. For example, the anchor WTRU may make measurements on the PRS with the highest priority first. After this, the anchor WTRU may make measurements on the PRS with the second highest priority.

In some implementations, the collaborating WTRU may use a PRS configuration for performing measurements and reporting according to the order priority, where the PRS configuration with the highest priority is used first for measurements when multiple PRS configurations are indicated/available. In some implementations, the collaborating WTRU may also report the measurements made based on the order of priority, for example. The collaborating WTRU may drop the measurements made using a PRS configuration with a lowest priority when insufficient resources are available and/or provisioned for sending the measurement report to the anchor WTRU and/or network, for example. In some implementations, the anchor WTRU may assign priority to PRS configurations which are shared or split with the collaborating WTRU. For example, the anchor WTRU may assign priority to PRS configurations used by the collaborating WTRU such that the collaborating WTRU can make measurements based on the priority associated with each PRS configuration. In some implementations, assignment of priority may be based on measurements associated with the PRS configuration. For example, the WTRU may assign priorities to the PRS configuration for the collaborating WTRU based on RSRP measurements made by the anchor WTRU for the PRS configurations, e.g., the PRS configuration from which the highest RSRP is obtained is associated with the highest priority and the PRS configuration with the lowest RSRP is associated with the lowest priority.

In some implementations where the anchor WTRU includes a reporting configuration, the collaborating WTRU may be indicated with a reporting configuration to apply when sending the information on measurements made using an indicated PRS configuration. For example, the reporting configuration may indicate or include the IDs to be used (e.g., LPP ID, LPP group ID, WTRU ID), whether the reporting should include individual/averaged values over the resources/beams configured in the indicated PRS configuration or configurations, and/or a routing path for sending the measurement report including which of the measurements are to be reported to anchor WTRU and/or directly to network (LMF and/or gNB), In some implementations, a WTRU may perform measurements intended for collaborative positioning based on triggering conditions. For example, in some implementations, the WTRU may perform measurements for collaborative positioning using the one or more PRS configurations, possibly intended for collaborative positioning, based on detection of triggering conditions and/or reception of positioning initiation indication for triggering/initiating the measurements. The procedures associated with detection of triggering conditions and/or receiving an indication for triggering measurements at the collaborating WTRUs may be similar and applicable for both WTRU-assisted and WTRU-based collaborative positioning.

In some implementations, after receiving the new PRS configuration from the network, the WTRU may perform the positioning measurements associated with collaborative positioning using a new PRS configuration based on one or more positioning initiation indications. In some implementations, the positioning initiation indications indicate when or whether to use a new PRS configuration for collaborative positioning and/or when or whether to stop using the existing PRS configuration (e.g., when previously configured), may be received by WTRU either from network (e.g., LMF and/or RAN) or via sidelink from another WTRU (e.g., anchor WTRU or collaborating WTRU). In this case, the positioning initiation indication may include the ID of the PRS configuration, possibly along with a flag indicating whether to start/stop using a PRS configuration for collaborative positioning, for example.

In some implementations, the collaborative WTRU initiates and/or triggers the taking of measurements on the DL-PRS, e.g., using the PRS configuration or configurations configured at the WTRU, based on (e.g., when) determining one or more of the following triggers and/or conditions: reception of a triggering indication from network; reception of a triggering indication from one or more collaborating WTRUs, an indication of a measurement gap configuration, one or more timers, a configured period of time, and/or conditions detectable at the collaborating WTRU.

In some implementations where the collaborative WTRU initiates and/or triggers the taking of measurements on the DL-PRS, e.g., using the PRS configuration or configurations configured at WTRU, based on receiving a triggering indication from the network, for example, a collaborating WTRU may initiate measurements after receiving an indication from network (LMF and/or gNBs), where the indication may be received in LPP message (e.g., LPP request location information), RRC message, L2/L1 signaling (e.g., MAC CE, DCI). For an anchor WTRU and/or a collaborating WTRU with an established Uu link and/or LPP session with LMF, the indication from network may include the identifier of the request type and/or LPP session ID (e.g., dedicated LPP session ID and/or group LPP session ID), for example.

Alternatively, in some implementations, the collaborating WTRU may initiate measurements based on receiving an indication from the anchor WTRU. For example, in some implementations, the anchor WTRU may send the collaborating WTRU an indication by sidelink. Based on receiving the indicator from the anchor WTRU, the collaborating WTRU may make measurements on the PRS configuration it has received from the LMF, gNB or anchor WTRU.

In some implementations where the collaborative WTRU initiates and/or triggers the taking of measurements on the DL-PRS, e.g., using the PRS configuration or configurations configured at WTRU, based on receiving a triggering indication from collaborating WTRU or WTRUs, for example, a collaborating WTRU may initiate measurements based on receiving an indication from anchor WTRU, where the indication may be received via sidelink in a forwarded LPP message (e.g LPP request location information), PC5-RRC message, and/or L2/L1 signaling (e.g., SL MAC CE, SCI), etc. In some implementations, the triggering indication may include the identifier of the request type and/or LPP session ID (e.g., dedicated LPP session ID and/or group LPP session ID), for example.

In some implementations where the collaborative WTRU initiates and/or triggers the taking of measurements on the DL-PRS, e.g., using the PRS configuration or configurations configured at WTRU, based on an indication of a measurement gap configuration, for example, a collaborating or member WTRU may initiate measurements based on receiving a measurement gap configuration indication from the gNB (e.g., via RRC) and/or anchor WTRU (e.g., via sidelink such as PC5-RRC). In some implementations where a collaborative WTRU may have an established Uu link, the WTRU may send a request for measurement gap configuration to network (e.g., via RRC signaling), based on receiving PRS configuration in assistance information from the network and/or anchor WTRU. In some implementations, a collaborative or member WTRU may send a request for a measurement gap configuration to the anchor WTRU and/or network, based on receiving the PRS configuration from network (e.g., SIB) and/or anchor WTRU. In both examples, in some implementations, the collaborative WTRU may initiate the measurements upon receiving the measurement gap configuration from the network and/or anchor WTRU.

In some implementations where the collaborative WTRU initiates and/or triggers the taking of measurements on the DL-PRS, e.g., using the PRS configuration or configurations configured at WTRU, based on one or more timers, for example, a collaborating WTRU may initiate measurements based on expiry of a configured timer. In some implementations, the collaborating WTRU may be configured to measure a time duration based on receiving the PRS configuration in assistance information from network and/or anchor WTRU. Based on expiry of the configured time duration, the collaborating WTRU may initiate the measurements, for example. The time duration may be measured using a timer, counter, clock or any other solution for measuring a duration of time.

In some implementations where the collaborative WTRU initiates and/or triggers the taking of measurements on the DL-PRS, e.g., using the PRS configuration or configurations configured at WTRU, based on conditions detectable at the collaborating WTRU, for example, a collaborating WTRU may initiate measurements based on detecting one or more conditions associated with change in radio conditions, based on a change in relative distance/direction with respect to another collaborating WTRU (e.g., anchor WTRU) and/or based on a change in mobility and/or movement of a collaborating WTRU. In some implementations, a collaborating WTRU may be configured with the one or more conditions, possibly in assistance information, when receiving the PRS configurations. The collaborating WTRU may also be configured, e.g., by network and/or anchor WTRU, with a mapping rule for mapping from a detected condition to one or more PRS configurations to apply when initiating the measurements. For example, when detecting certain radio conditions (e.g., an increase in number of paths by certain threshold due to multipath, RSRP of RS/beam received from a TRP/gNB falls/increases below/above a threshold), the collaborating WTRU may trigger measurements based on using a corresponding PRS configuration, possibly indicated in the mapping rule. For example, in some implementations, based on detecting a change in the relative distance from an anchor WTRU by a certain threshold (e.g., distance falls or increases below or above a certain distance threshold), the collaborative WTRU may trigger the measurements using an indicated PRS configuration.

Figure 4:
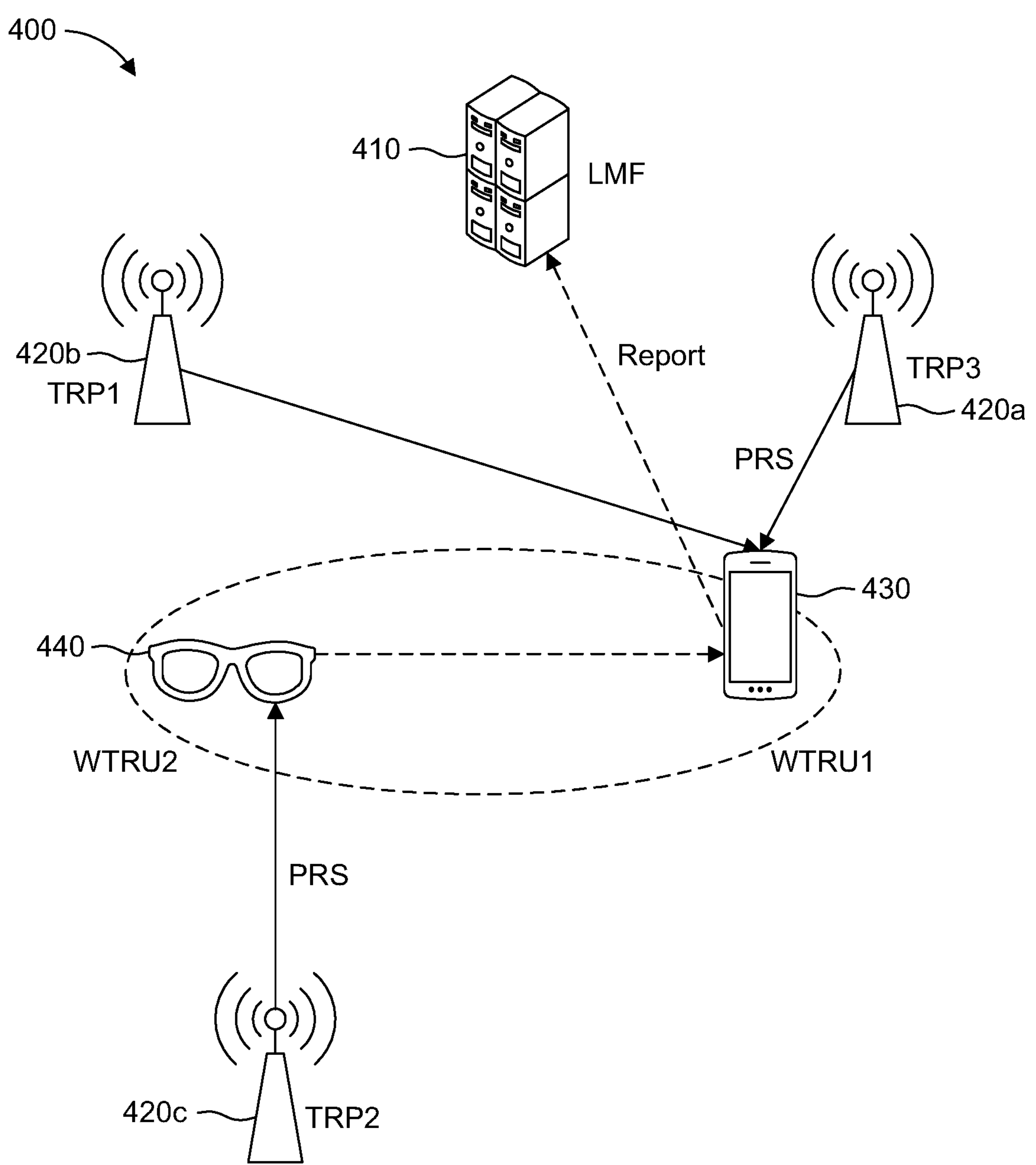
FIG. 4 is a system diagram illustrating signaling among a plurality of WTRUs for collaborative positioning.

FIG. 4 is system diagram illustrating a system 400 and signaling among a plurality of WTRUs for collaborative positioning involving WTRU1 430 and WTRU2 440. In FIG. 4, according to a collaborative positioning procedure, the anchor WTRU1 430 sends one or more PRS configurations to collaborative WTRU2 440. WTRU1 430 makes measurements of the PRS transmitted from a subset of TRPs (e.g., TRP1 420*b*, TRP3 420*a*) and WTRU2 440 makes measurements of PRS transmitted from another subset of TRPs (e.g., TRP2 420*c*). WTRU1 430 then sends a measurement report to the LMF 410.

Figure 5:
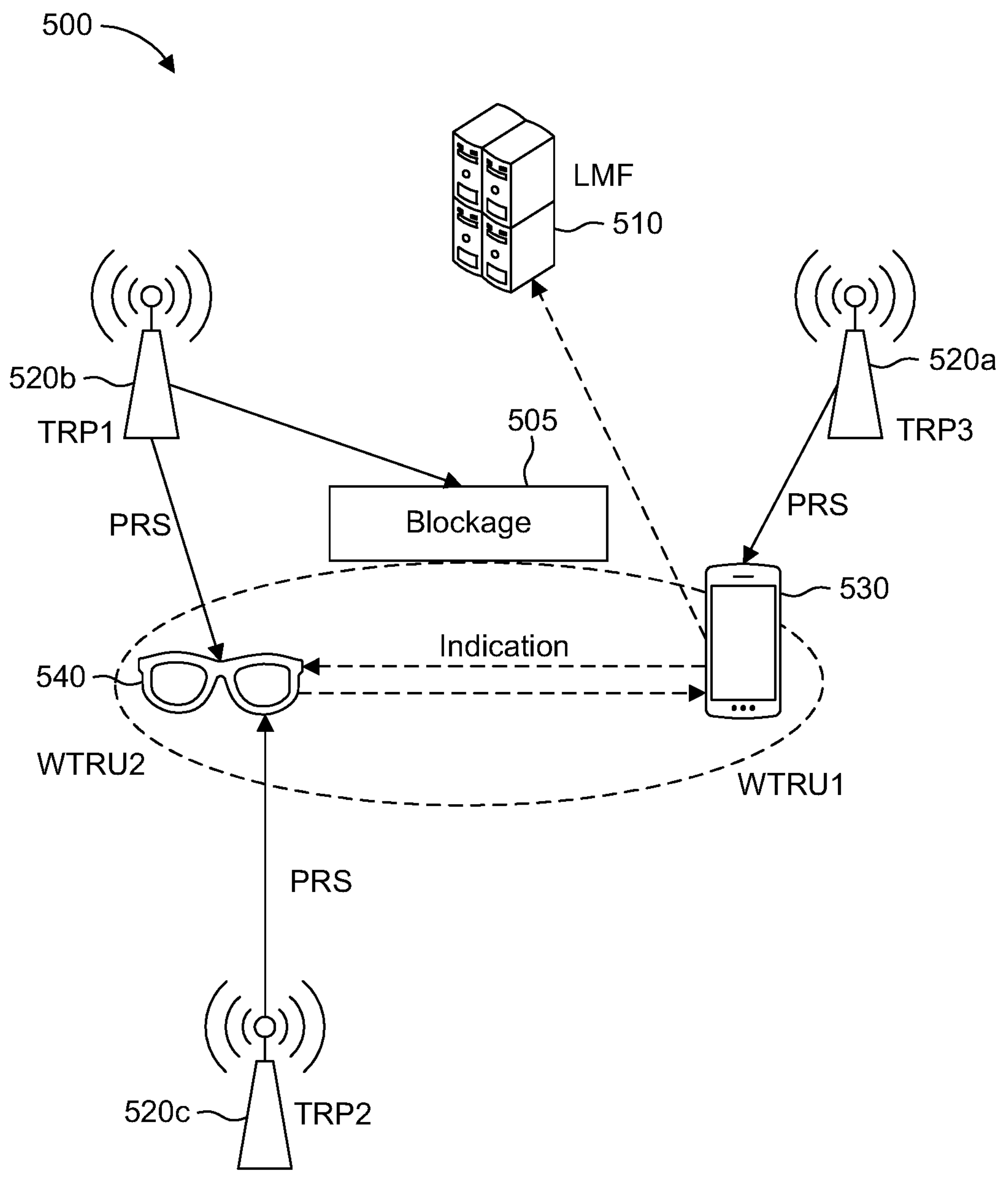
FIG. 5 is a system diagram illustrating signaling among a plurality of WTRUs for collaborative positioning.

FIG. 5 is system diagram illustrating a system 500 and signaling among a plurality of WTRUs for collaborative positioning involving WTRU1 530 and WTRU2 540. In FIG. 5, when measurements at WTRU1 530 are disrupted (e.g., due to blockage 505 from TRP1 520*b* where the RSRP of PRS from TRP1 520*b* drops below a threshold), WTRU1 530 triggers and sends an indication (via sidelink) to WTRU2 540 to request to use a different PRS configuration such that the PRS received from TRP1 520*b* can be measured and reported by WTRU2 540. In FIG. 5, TRP2 520*b* transmits PRS that is received and measured by WTRU2 540, and TRP3 520*a* transmits a PRS that is received and measured by WTRU1 530. WTRU1 530 aggregates the PRS measurements made by WTRU2 (received via sidelink) and WTRU1. The PRS measurements made by WTRU1 530 may contain measurements of PRS received from TRP3 520*a*, and the PRS measurements made by WTRU2 540 may contain measurements of PRS received from TRP1 520*b* and TRP2 520*c*.WTRU1 530 then sends a measurement report to the LMF 510. The measurement report transmitted by WTRU1 530 to LMF may contain the aggregated PRS measurements made by WTRU2 540 and WTRU1 530. The LMF 510 then calculates the location of WTRU1 530 and/or WTRU2 540 based on the aggregated measurement report.

In an example related to timing-based positioning methods (e.g. DL-TDoA) for collaborative positioning, the anchor WTRU may trigger measurements and/or local reconfiguration (e.g., providing updated PRS configuration). For example, the anchor WTRU may trigger measurements or local reconfiguration if the relative distance and/or direction with respect to a collaborative WTRU changes by certain amount and/or angle threshold. In some implementations, the local reconfiguration may be performed such that that the timing measurements (e.g., RSTD) made by the anchor WTRU and/or collaborative WTRU or WTRUs may properly take into account the relative distance and/or direction between the anchor WTRU and collaborative WTRU or WTRUs. In this case, the local reconfiguration may be performed by triggering transmission of sidelink PRS from the anchor WTRU and measurement at the collaborative WTRU; transmission of sidelink PRS from the collaborative WTRU and measurement at the anchor WTRU; and/or transmission of DL-PRS and measurement at the anchor WTRU and collaborative WTRU.

In some implementations where the local reconfiguration is performed by triggering transmission of sidelink PRS from the anchor WTRU and measurement at the collaborative WTRU, for example, the anchor WTRU may perform corrections to the timing measurements of the collaborative WTRU based on the measurement report sent by the collaborative WTRU, containing the timing measurements made on DL-PRS and the sidelink RS measurements for relative positioning.

In some implementations where the local reconfiguration is performed by triggering transmission of sidelink PRS from a collaborative WTRU and measurement at the anchor WTRU, for example, the anchor WTRU may perform corrections to the timing measurements of the collaborative WTRU based on the measurement report sent by the collaborative WTRU, containing the timing measurements made on DL-PRS, and/or measurements made by anchor WTRU for relative positioning based on the sidelink RS received from collaborative WTRU.

In some implementations where the local reconfiguration is performed by triggering transmission of DL-PRS and measurement at anchor WTRU and collaborative WTRU, for example, the anchor WTRU and collaborative WTRU may determine their location information (e.g., absolute location determined using WTRU-based positioning method). The anchor WTRU may then perform corrections to the timing measurements (e.g., RSTD) made by the collaborative WTRU based on the measurement report sent by the collaborative WTRU containing the timing measurements and the location information of the collaborative WTRU.

In some implementations related to angle-based positioning methods (e.g., DL-AoD) for collaborative positioning, the anchor WTRU may trigger measurements and/or local reconfiguration, in response to the relative distance and/or direction with respect to a collaborative WTRU changing by certain distance/angle threshold. In this case, similar to timing-based positioning, the anchor WTRU may perform corrections to the positioning information received from a collaborative WTRU based on the updated information on the distance and/or angle between the WTRUs and measured AoD of beams received from one or more TRPs/gNBs. When considering narrow beams in the angle-based positioning methods, the anchor WTRU may trigger local reconfiguration more frequently if there is any relative movement and/or change in the orientation in the collaborating WTRUs, for example. In this case, the distance, direction, and/or orientation thresholds configured and used for monitoring on whether to trigger local reconfiguration may be based on parameters associated with beams detachable and/or receivable by the anchor and/or collaborative WTRU or WTRUs from one or more TRPs and/or gNBs including number of Tx beams, size and/or width of Tx beams, size and/or width of Rx beams used by anchor and/or collaborative WTRU or WTRUs, etc., for example.

In some implementations, an anchor WTRU may send an on-demand request to a collaborative WTRU for making measurements on a PRS configuration and/or subset of resources/beams associated with a PRS configuration. For example, the anchor WTRU may send assistance information to a collaborative WTRU, the assistance information containing one or more PRS configurations. The different PRS configurations may be associated with a configuration ID, and/or identifiers identifying the different resources and/or resource sets and/or beams and/or TRPs and/or gNBs associated with the one or more PRS configurations. In some implementations, the anchor WTRU may determine the first and second PRS configurations to be used by the anchor WTRU and a collaborative WTRU. In this case, the first PRS configuration may include resources and/or beams received from a first TRP and the second PRS configuration may include resources and/or beams received from a second TRP, for example. In some implementations, the anchor WTRU may initially send both the first and second PRS configurations to the collaborative WTRU. In some implementations, the anchor WTRU may send a request, possibly along with the PRS configurations or in a separate message in sidelink, to the collaborative WTRU to trigger using the second PRS configuration for making measurements on the PRS resources/beams received from the second TRP, for example. In some implementations, the anchor WTRU may use the first PRS configuration for making measurements on the PRS resources/beams received from the first TRP, for example. When detecting one or more conditions at the anchor WTRU, which may possibly interrupt the measurements made on the PRS resources/beams received from the first TRP, the anchor WTRU may send an indication to the collaborative WTRU to use the first PRS configuration for making measurements.

The conditions detected by the anchor WTRU for sending the request to initiate measurements at collaborative WTRU may include the RSRP of the measurements made by anchor WTRU on the PRS resources and/or beams received from the first TRP is below a threshold value and/or remains below the threshold value for a configured time duration (e.g., due to presence of blockage/obstruction), for example.

Another condition detected by the anchor WTRU may include the RSTD of the measurements made by the anchor WTRU on the PRS received from the first TRP is higher than a threshold and/or remains above threshold for configured duration, for example. Another condition monitored by the anchor WTRU may include detection of multipath when receiving PRS from the first TRP, where the number of paths detected is higher than a threshold value, for example. Upon triggering the measurements at collaborative WTRU, the measurements made on the PRS resources/beams received from first TRP by the collaborative WTRU may compensate for the measurement interruption at anchor WTRU, for example.

In some implementations, the WTRU sends positioning information (e.g., measurement reports and/or location estimates) after making measurements for collaborative positioning. For example, a WTRU may send the positioning information, containing measurement report and/or location estimates, to the network and/or collaborating WTRUs. In some implementations, the WTRU may determine or assist by determining the positioning information of itself and/or other collaborating WTRU based on the measurements made using the PRS configuration associated with collaborative positioning. In some implementations, the WTRU may use one or more conventional PRS configuration or configurations which may not be directly intended for collaborative positioning for determining or assist to determine the positioning information of itself and/or other collaborating WTRU or WTRUs. In the case of WTRU-assisted collaborative positioning, the positioning information may be sent by one or more WTRUs to the network either directly (e.g., via own Uu links/LPP sessions) or indirectly via anchor WTRU (i.e., which may receive the measurement report and sends a combined measurement report to network). The location information of at least one WTRU in the collaborating group is calculated at the network (e.g., LMF). In the case of WTRU-based collaborative positioning, the positioning information (e.g., measurement reports) may be sent by one or more collaborative WTRUs to the anchor WTRU (e.g., via sidelink). The location information of at least one WTRU in the collaborating group, including anchor WTRU, is calculated at the anchor WTRU based on the measurements made by different WTRUs, for example.

In some implementations, the collaborating WTRUs may send uncertainty information associated with location estimates e.g., variance, standard deviation, range and/or integrity information associated with the location information. The anchor WTRU may combine location estimates of a collaborative WTRU and associated with uncertainty information and location estimates of the anchor WTRU. The anchor WTRU may include an indicator to the LMF that the location estimate of the anchor WTRU is derived based on location estimates of the collaborative WTRUs and/or associated uncertainty information.

In some implementations anchor WTRU may determine to send measurements or location estimates made by the collaborative WTRUs to the LMF based on uncertainties related to measurements or location estimates or quality of measurements or location estimates. For example, the standard deviation of the location estimate made by the collaborative WTRU is above the preconfigured threshold, the anchor WTRU may determine to not to use the location estimate to determine the location estimate of the anchor WTRU; and/or the anchor WTRU may determine to not send the location estimate or associated measurements of the collaborative WTRU to the LMF.

In some implementations the anchor WTRU may use at least one of the following conditions to determine whether to use/send the measurements made or location estimate determined by the collaborative WTRU to the LMF: variance, standard deviation, range related to the location estimate relative to a preconfigured threshold; measurements made by the collaborative WTRU (e.g., RSRP of PRS) relative to a preconfigured threshold; and/or variance, standard deviation, range (e.g., upper/lower limit of range) related to the measurements (e.g., AoD, AoA, TDOA, time of arrival, RSRP) relative to a preconfigured threshold.

When assisting other WTRUs (e.g., anchor WTRU and/or collaborative), possibly in a collaborative positioning group, the measurements made by a collaborating WTRU may be used for improving the positioning QoS (e.g., accuracy, latency, reliability, integrity) based on augmenting the measurements made by other collaborating WTRU or WTRUs (e.g., by providing more complete measurements, where measurements on certain PRS resources/beams received from one or more WTRUs may be used to increase the overall measurements available on a collaborating WTRU); or based on replacing the measurements by other collaborating WTRU or WTRUs (e.g., replacing poor quality measurements with improved measurements, where measurements of PRS resources/beams with low RSRP may be replaced with measurements with higher RSRP).

In some implementations, a collaborating WTRU may perform measurements using one or more PRS configurations. For example, a collaborating WTRU may perform measurements using a conventional PRS configurations and/or PRS configurations intended for collaborative positioning, when triggered by the network and/or anchor WTRU. In some implementations collaborating WTRU may then determine the positioning information to send to network and/or anchor WTRU, including either measurement report and/or location estimate, based on a reporting configuration, for example. In this case, the WTRU may send the positioning information based on one or more explicit triggers (e.g., upon receiving a request for location information from network and/or anchor WTRU, possibly in an LPP message) or implicit triggers (e.g., upon performing measurements on DL-PRS), for example.

In some implementations where the measurements are made by one or more collaborative WTRUs, the collaborative WTRUs may send the measurements to the anchor WTRU (via sidelink) and the anchor WTRU, possibly including the measurements made for determining the relative distance and/or direction with respect to anchor WTRU. The anchor WTRU may coordinate to collect its own measurements and the measurements (e.g., measurements of DL-PRS) from the different collaborating WTRUs and sends the collected measurement report to network (e.g., LMF), possibly in LPP message (e.g., LPP provide location information).

In some implementations the anchor WTRU may include one or more of the following in the collected measurement report: the collaborating WTRU IDs, LPP session IDs of the collaborating WTRUs, group LPP ID and/or the information on relative location of the WTRU (e.g., measurements made on sidelink PRS, distance, direction).

In some implementations, for coordinating the measurements and reporting at the different collaborative WTRUs, the anchor WTRU may provide the timing information to the collaborative WTRUs (via sidelink) for indicating when to perform measurements and when to send the measurement report to the anchor WTRU, for example. In some implementations, the different collaborative WTRUs may be indicated with different or the same timing information (e.g., start time slot, measurement duration, stop time slot) for making measurements on the PRS configurations provided in assistance information and/or different or the same timing information (e.g., reporting time slot, reporting periodicity) for sending the measurement report. For one or more of the collaborative WTRUs with direct connectivity with network (e.g., via Uu link and/or with a LPP session), the anchor WTRU may indicate to the collaborative WTRUs to send the measurements report directly to the network (e.g., LMF), including information to identify (e.g., with WTRU ID, LPP session ID) that the measurements are intended for collaborative positioning for one or more WTRUs in a collaborative group. In some implementations, the indication to the collaborative WTRU or member WTRUs on whether to send the measurement report to network or anchor WTRU may be sent in the reporting configuration (e.g., in assistance information) and/or dynamically over sidelink using sidelink L1/L2/L3 signalling (e.g., SL MAC CE, SCI, PC5-RRC). In the case where the collaborative WTRU may receive the assistance information from the network (LMF and/or gNB) for performing measurements associated with collaborative positioning, the collaborative WTRU may receive the indication on whether to send the measurement reports directly to network and/or to anchor WTRU (via sidelink) in the assistance information (e.g., LPP signalling/message) or via L2/L1 signalling from gNB (e.g., MAC CE, DCI), for example.

In some implementations, where the collaborative WTRU with a direct Uu link with the network and/or with a pre-established LPP session, may directly send the measurement report, including the measurements made for determining the positioning information of itself and/or a collaborating WTRU (e.g., anchor WTRU). The collaborative WTRU may include one or more of the following in the measurement report sent to network: the collaborative WTRU ID, LPP session ID of the collaborative WTRU, ID(s) of the WTRU or WTRUs for which the measurements may be intended to, ID(s) of the LPP sessions associated with the WTRU or WTRUs for which the measurements may be intended to, group LPP ID and/or measurements for determining the relative location of the WTRUs (e.g., measurements made on sidelink PRS, distance, direction).

In some implementations, the reporting configuration, indicating the configuration to apply when generating and sending the measurement report/location estimate, may be received by the collaborating WTRU from the network (e.g., LMF and/or gNB) and/or another collaborating WTRU (e.g., anchor WTRU). In some implementations, the WTRU may receive one or more reporting configurations intended for collaborative positioning, which may be different than the reporting configuration used for conventional positioning (e.g., reporting for determining own location). In this case, the different reporting configuration may be identified with different IDs. In some implementations, the WTRU may use the reporting configuration indicated/provided for conventional positioning to determine and/or derive the reporting configuration to apply for collaborative positioning. In this case, the WTRU may determine the reporting configuration by associating the received PRS configuration for collaborating positioning with the available reporting configuration for conventional positioning, for example.

In some implementations the reporting configuration may be received by the collaborating WTRU (e.g., anchor WTRU and/or collaborative WTRU) in the assistance information and/or in a separate message (e.g., LPP request for location information message), for example. In some implementations the reporting configuration received by the WTRU and the corresponding information included by the WTRU in the measurement report/location estimates sent to the network and/or collaborating WTRU may include one or more of positioning information type; positioning resource type; information on positioning of an intended WTRU; reporting parameters; quality of measurements; information regarding relative and/or absolute positioning of a collaborating WTRU; and/or WTRU mobility and/or movement information.

In some implementations where the reporting configuration received by the WTRU and the corresponding information included by the WTRU in the measurement report/location estimates sent to the network and/or collaborating WTRU include positioning information type, for example, the WTRU may receive an indication of the type of positioning information to report, including measurements and/or location estimates. If the WTRU is indicated to report the location estimate, the WTRU may perform calculation of the location of itself and/or other collaborating WTRU or WTRUs (e.g., possibly based on the ID of the collaborating WTRU may be indicated in the reporting configuration) based on the measurements made by the WTRU and/or assistance information received by WTRU, for example. In some implementations, the WTRU may use the assistance information containing the location of the TRPs/gNBs/reference-nodes and/or other WTRUs along with the measurements made by the WTRU using DL-PRS and/or sidelink-PRS for determining the location of itself and/or other WTRU or WTRUs, for example.

In some implementations, when sending the report, the WTRU may include in the report the measurements and/or location estimates. The WTRU may also send the information of the PRS configuration or configurations used for making the measurements, possibly including the IDs of the PRS configuration or configurations and/or IDs of the resources/beams/TRPs/gNBs, for example.

In some implementations where the reporting configuration received by the WTRU and the corresponding information included by the WTRU in the measurement report/location estimates sent to the network and/or collaborating WTRU include positioning resource type, for example, the WTRU may receive an indication of the resource type on which the measurements made are to be included in the report, including one or more resources, resource sets, beams and TRPs/gNBs.

In some implementations, the WTRU may include in the measurement report the measurements made on the resources/beams from a TRP when requested/indicated reporting configuration includes the IDs of the resources/beams/TRP. In some implementations, the WTRU may also include, in the measurement report, information on the cell IDs and/or sidelink resource pool IDs on which the PRS resources are accessed during measurements.

In some implementations, in the measurement report associated with collaborative positioning, the WTRU may include information on the measured RSRP/RSSQ/RSSI of the PRS resources/beams corresponding to the PRS configuration used by the WTRU. For timing-based positioning methods, the WTRU may include in the report information on the measured RSTD values.

In some implementations where the reporting configuration received by the WTRU and the corresponding information included by the WTRU in the measurement report/location estimates sent to the network and/or collaborating WTRU include positioning information on an intended WTRU, for example, the WTRU may receive an indication of identifiers referring to one or more intended collaborating WTRUs (e.g., WTRU ID, LPP session ID) for which the WTRU may report the positioning information, including measurement report and/or location estimates. Since the measurements made may be applicable for determining the location of multiple WTRUs, when reporting the WTRU may indicate in the measurement report, the mapping between the measurements made and the one or more intended WTRU identifiers, for example.

In some implementations where the reporting configuration received by the WTRU and the corresponding information included by the WTRU in the measurement report/location estimates sent to the network and/or collaborating WTRU include reporting parameters, for example, the WTRU may be indicated with parameters associated with the report type to use, corresponding to aperiodic, semi-persistent or periodic reporting. In some implementations, the parameters associated with the report type may include the start time/slot, periodicity and/or stop time/slot, for example. The parameters may also indicate whether the WTRU reports the measurement values (e.g., RSRP in each slot) and/or averaged values (e.g., average RPRP over a number of slots).

In some implementations, the report type may be related to the PRS configuration configured in the WTRU. In this case the WTRU may use the same/similar report type associated with the PRS configuration applied. In some implementations, if the PRS configuration configured in the WTRU is periodic, the WTRU may receive an indication to use the periodic report type, where the WTRU sends the measurement report periodically, possibly in interleaving slots, when making measurements on the PRS. In another example, the report type may not be related/associated with the PRS configuration configured in the WTRU. For example, when the PRS configuration configured in the WTRU is periodic, the WTRU may be indicated to use an aperiodic report type, where the WTRU sends the measurement report aperiodically when a configured measurement event is detected (e.g., RSRP of the measurements made on periodic PRS resources are above a threshold value).

In some implementations, when sending/reporting the measurements, the WTRU uses the parameters associated with the indicated/configured report type.

In some implementations where the reporting configuration received by the WTRU and the corresponding information included by the WTRU in the measurement report/location estimates sent to the network and/or collaborating WTRU include quality of measurements, for example, the WTRU may receive an indication of whether to include or exclude the measurements when reporting based on the quality of the measurements. In some implementations, a collaborative WTRU may decide to include/exclude the measurements, when reporting to the anchor WTRU, when the RSRP measurement on a DL-PRS resource/beam is above/below a threshold value and/or remains above/below a configured threshold value over certain duration. When excluding certain measurements due to low RSRP, a collaborative WTRU may send an indication/flag to the anchor WTRU and/or network indicating the exclusion of the measurements and/or the exclusion cause (e.g., due to low RSRP), for example. Likewise, an anchor WTRU which may send to network the measurements collected from collaborative WTRU, may determine whether to include/exclude the measurements from one or more collaborative WTRUs based on the quality of reported measurements (e.g., RSRP above/below a configured threshold), for example.

In an example where the one or more collaborative WTRUs may send the individual measurement reports to the anchor WTRU via sidelink, the anchor WTRU may determine whether to send the received measurements directly to network or perform combining of the measurements based on reporting configuration.

When combining the measurements, the anchor WTRU may remove redundant and/or poor quality measurements when multiple WTRUs send in the individual measurement reports containing similar measurements and/or combine the measurements; and/or include redundant measurements when multiple WTRUs send in the individual measurement reports containing similar measurements and/or combine the measurements.

In some implementations where the anchor WTRU removes redundant and/or poor-quality measurements when multiple WTRUs send in the individual measurement reports containing similar measurements and/or combining of the measurements may not result in improving accuracy. The anchor WTRU may determine to remove the redundant and/or poor-quality measurements (e.g., measurements with low RSRP) when the combined measurements may not result in positioning accuracy which may be greater than a configured accuracy threshold, for example. When removing the redundant/poor quality measurements the anchor WTRU may not send the dropped measurements or subset of measurements to network and/or indicate to network the dropping of measurements, possibly indicating the WTRU IDs/LPP IDs whose measurements have been dropped. In another example, the anchor WTRU may also drop certain redundant/poor quality measurements when unable to receive sufficient resources from gNB for sending the combined measurements to network. In another example the anchor WTRU may determine whether to drop redundant/poor quality measurements based on a priority value associated with a collaborative WTRU, where the priority may be assigned based on the capability, relative location and/or quality of measurements made by a collaborative WTRU (e.g., LOS measurements may be assigned with higher priority than NLOS). In this case, the anchor WTRU may use one or more conditions, including the possibility to improve positioning accuracy, resource availability, priority of collaborating WTRU and its associated measurements, and latency, for determining whether to drop certain redundant/poor quality measurements when sending combined measurements to network, for example.

In some implementations where the anchor WTRU includes redundant measurements when multiple WTRUs send in the individual measurement reports containing similar measurements and/or combining of the measurements may result in improving reliability/integrity. The anchor WTRU may determine to include the redundant measurements when the combined measurements may result increasing positioning reliability/integrity above a configured reliability/integrity threshold, for example.

In some implementations where the reporting configuration received by the WTRU and the corresponding information included by the WTRU in the measurement report/location estimates sent to the network and/or collaborating WTRU include relative and/or absolute positioning information of the collaborating WTRU, for example, the WTRU may receive an indication to report on the relative location and/or absolute location when sending the positioning information to network and/or anchor WTRU. In an example related to relative location, the collaborating WTRU may report on the measurements made on sidelink PRS transmitted by an anchor WTRU, possibly including the RSRP, angle of arrival, angle of departure, RSTD measurements made on the sidelink PRS resources/beams. The reported measurements may then be used to determine the distance, direction and/or orientation of the reporting collaborating WTRU with respect to the anchor WTRU, for example.

In another example related to absolute location, when indicated/requested in a reporting configuration, the collaborating WTRU may report on its absolute location, possibly determined based on one or more RAT-dependent positioning methods (e.g., DL-based, UL-based) and/or RTA-independent positioning methods (e.g., GNSS, WLAN, Bluetooth, UWB, visual positioning).

In another example, a collaborating WTRU may receive an indication or request to report on the positioning information of anchor WTRU, possibly by network and/or anchor WTRU. In this case, the collaborating WTRU may perform measurements on DL-PRS received from multiple TRPs/gNBs and/or on the sidelink PRS received from anchor WTRU and/or perform calculations to determine the measurements/location estimates with suitable offsets. In one possibility, when sending the measurement report related to measurements associated with the anchor WTRU, the WTRU may perform corrections on its own measurements of the DL-PRS by including the distance/direction offsets determined from the measurements of sidelink PRS such that the reported measurements correspond to as if the measurements were made by the anchor WTRU, for example. In another possibility, when reporting the location estimate of the anchor WTRU, the WTRU may perform corrections on its own measurements of the DL-PRS by including the distance/direction offsets determined from the measurements of sidelink PRS such that the determined location estimate corresponds to the location of the anchor WTRU, for example.

In another example, for ensuring the same level of positioning accuracy is achieved at the anchor WTRU as that of the collaborative WTRU, the anchor WTRU may combine the measurements (e.g., RSRP, RSTD) made on the DL-PRS received from one or more TRPs and reported by the collaborative WTRU with that of the relative location information of the collaborative WTRU. The relative location information may include distance between collaborative WTRU and anchor WTRU, direction/angle between collaborative WTRU and anchor WTRU, direction/angle between collaborative WTRU and TRP, for example.

In an example, where the collaborative WTRU may report the measurements/location estimates to network and/or anchor WTRU related to relative positioning (e.g., distance and/or direction) with respect to anchor WTRU, the collaborative WTRU may receive an indication to send or be configured to send the relative positioning information together with the other measurements on DL-PRS, separately from the other measurements on DL-PRS and/or on an on-demand basis (e.g., when sending an on-demand request for relative positioning information). In another example, the WTRU may receive an indication to send or be configured to send the relative positioning information to anchor WTRU and/or network on a periodic/semi-persistent basis (e.g., with certain configured periodicity, start/stop time) and/or on an event triggered aperiodic basis (e.g., first transmission includes the relative positioning information and the second transmission is made when the relative distance and/or direction increases/decreased by a certain configured distance/angle, for example.

In the case when a collaborating WTRU is performing measurements of DL-PRS and/or sidelink PRS corresponding to different anchor WTRUs, the collaborating WTRU may perform the calculation and indicate the measurements and/or location estimates along with the respective anchor WTRU ID when sending the measurement report.

In some implementations where the reporting configuration received by the WTRU and the corresponding information included by the WTRU in the measurement report and/or location estimates sent to the network and/or collaborating WTRU include WTRU mobility and/or movement information, the WTRU may receive an indication to report on the mobility/movement attributes, possibly absolute or relative mobility/movement with respect to an anchor WTRU. In this case, the WTRU may report on the WTRU mobility attributes (e.g., WTRU speed, direction, distance travelled in direct/straight path) and/or mobility path (e.g., list of one or more cell IDs traversed by WTRU and/or WTRU coordinates over a time duration).

The WTRU may be configured by the network and/or anchor WTRU with one or more triggering conditions, possibly along with reporting configuration, for sending the positioning information (measurement report/location estimates related to location of itself and/or one or more collaborating WTRUs) and/or relative positioning information (measurement report/location estimates related to relative distance/direction from one or more collaborating/anchor WTRUs). In an example, the triggering conditions for initiating/triggering to perform measurements may be the same or different with those for sending the positioning information. For example, the same request message (e.g., LPP message) received by a collaborative WTRU for performing measurements may be applicable to sending the measurement report/location estimates. Triggering conditions for sending the positioning information may include reception of a triggering indication from the network; reception of a triggering indication from a collaborating WTRU or WTRUs; a reporting configuration; and/or conditions detectable at a collaborating WTRU.

In some implementations where the triggering conditions for sending the positioning information include reception of a triggering indication from the network, for example, a collaborating WTRU may send positioning information upon receiving an indication from network (e.g., LMF and/or gNBs), where the indication may be received in an LPP message (e.g., LPP request location information), RRC message, L2/L1 signaling (e.g., MAC CE, DCI). The indication from network may include the identifier of the request type and/or LPP session ID (e.g., dedicated LPP session ID and/or group LPP session ID).

In some implementations where the triggering conditions for sending the positioning information include reception of a triggering indication from a collaborating WTRU or WTRUs, a collaborating WTRU may send positioning information upon receiving an indication from the anchor WTRU. The indication may be received, for example, via sidelink in an LPP message (e.g., LPP request location information), PC5-RRC message, L2/L1 signaling (e.g., SL MAC CE, SCI). The triggering indication may contain the identifier of the request type and/or LPP session ID (e.g., dedicated LPP session ID and/or group LPP session ID), for example.

In some implementations where the triggering conditions for sending the positioning information include a reporting configuration, for example, a collaborating WTRU may send measurements based on the timing information indicated in the reporting configuration, where the timing indication may include start time/slot, periodicity, stop time slot, for example. In some implementations, the collaborating WTRU may be configured to measure a configured time period begging upon receiving the request for initiating measurements from network and/or anchor WTRU. Upon expiry of the time period the collaborating WTRU may send the measurement report, for example.

In some implementations where the triggering conditions for sending the positioning information include conditions detectable at a collaborating WTRU, for example, a collaborating WTRU may send positioning information upon detecting one or more conditions associated with change in radio conditions, change in relative distance/direction with respect to another collaborating WTRU (e.g., anchor WTRU) and change in mobility/movement of collaborating WTRU. In some implementations, a collaborating WTRU may be configured with the one or more conditions, possibly in reporting configuration/assistance information. The collaborating WTRU may also be configured, by the network and/or the anchor WTRU, with a mapping rule for mapping from a detected condition to one or more reporting configurations to apply when sending/reporting positioning information.

In some implementations, when detecting certain radio conditions (e.g., an increase in number of paths by certain threshold due to multipath, RSRP of RS/beam received from a TRP/gNB decreases/increases below/above a threshold), the collaborating WTRU may report the measurements upon using corresponding reporting configuration, possibly indicated in the mapping rule. For example, when detecting a change in the relative distance from an anchor WTRU by a certain threshold (e.g., distance decreases/increases below/above certain distance threshold), the collaborative WTRU may report the measured amount of change in distance/direction or send an indication/flag to anchor WTRU indicating change in the distance/direction. In this example, when the collaborative WTRU indicates the change in distance/direction, the anchor WTRU may trigger local reconfiguration (e.g., over sidelink) to (re)estimate the relative distance/direction angle between the anchor WTRU and collaborative WTRU. In this case, the anchor WTRU may trigger local reconfiguration by transmitting sidelink PRS and/or request the collaborative WTRU to transmit sidelink RS for making measurements, for example.

In some implementations, when detecting certain conditions (e.g., a change in radio conditions, or change in relative distance/direction), the WTRU may be configured to increase the reporting periodicity when sending the positioning information (measurement report/location estimates) for providing more accurate positioning information to the anchor WTRU and/or network. In some implementations, the WTRU may change from a first reporting configuration (e.g., with a first reporting periodicity) to a second reporting configuration (e.g., with second reporting periodicity), where the second periodicity may be higher/lower than the first periodicity, when the WTRU detects a configured condition, for example.

In some implementations, the WTRU may send the positioning information (measurement report/location estimates) to network and/or anchor WTRU in a NAS message; RRC signalling; L2/L1 signaling on Uu interface; SL signalling/data radio bearers; and/or L2/L1 signaling on SL interface.

In some implementations where the WTRU sends the positioning information in a NAS message, for example, the anchor WTRU/collaborative WTRU with individual/group LPP session or sessions may send the positioning information to network (LMF and/or gNB) NAS message or messages via SRBs (e.g., SRB1, SRB2, SRB3) or DRBs In some implementations where the WTRU sends the positioning information in RRC signalling, for example, the anchor WTRU/collaborative WTRU with Uu link may send the positioning information via RRC signalling message or messages In some implementations where the WTRU sends the positioning information in L2/L1 signaling on a Uu interface, for example, the anchor WTRU/collaborative WTRU with Uu link may send positioning information via L1/L2 signalling including UL MAC CE or UCI, for example.

In some implementations where the WTRU sends the positioning information in SL signalling and/or data radio bearers, for example, a collaborative WTRU may send the positioning information to one or more anchor WTRU and/or other collaborative WTRUs via the sidelink interface/channels including via SL data radio bearers and/or sidelink signalling radio bearers (e.g., PC5 RRC), which may possibly carry sidelink LPP messages, for example.

In some implementations where the WTRU sends the positioning information in L2/L1 signaling on an SL interface, for example, a collaborative WTRU may send the positioning information to one or more anchor WTRU via sidelink L1/L2 signalling including SL MAC CE or SCI, for example.

When sending the positioning information to network, the collaborating WTRU (e.g., anchor WTRU and/or collaborative WTRU) may receive the resources from the serving gNB as a dynamic grant or configured grant based on the request for resources (e.g., SR/BSR or RRC assistance information) sent by the WTRU. In an example where the collaborating WTRU may be configured to operate in sidelink Mode 1, and where the collaborating WTRU may need resources for sending/forwarding any LPP messages and/or sending positioning information via sidelink to another WTRU, the WTRU may send a request to serving gNB to request for dynamic sidelink resources and/or sidelink configured grant. The WTRU may also indicate certain assistance information to gNB such that the allocated resources for UL or SL transmission may be aligned in time/frequency domain with the positioning reporting configuration (e.g., containing start/stop slot, periodicity), for example. In another example where the collaborating WTRU may operate in sidelink Mode 2, the WTRU may determine the sidelink resources from one or more sidelink resource pools, such that the resources determined autonomously via sensing/reservation are aligned in time/frequency domain with the positioning reporting configuration, for example.

Some implementations include determining an orientation of the WTRU. For example, in some implementations, the WTRU may receive an indication from the network (e.g., LMF, gNB) to maintain a spatial filter or filters for a Rx beam or beams. The WTRU may indicate which Rx beam is used to receive PRS to inform the network its orientation information.

In some implementations, the WTRU may receive configurations related to a time window during which the WTRU needs to maintain spatial filters for Rx beams. By maintaining the spatial filter for Rx beams, the WTRU can report the Rx beam used to receive PRS transmitted from TRPs, along with measurements made with the Rx beam (e.g., RSRP, AoA, time of arrival, TDOA) and the network (e.g., LMF or gNB) may determine the orientation of the WTRU. If spatial filters are not maintained, the network may not be able to determine the orientation of the WTRU.

In some implementations, the WTRU may be requested by the network to report to the network the maximum duration during which the WTRU can maintain spatial filters for Rx beams. In some implementations, the WTRU may send WTRU capability information related to maintenance of spatial filter maintenance to the network. In some implementations, if the WTRU is not capable of maintaining the spatial filters, the WTRU may report the preconfigured value to the network (e.g., duration of spatial filter maintenance is zero).

Similarly, In some implementations, the anchor WTRU may send an indication to the collaborative WTRUs to maintain spatial filters of their Rx beams during the configured time window. In some implementations, the collaborative WTRUs may include Rx beams used to receive PRS transmitted from TRPs. In some implementations, the collaborative WTRU may be requested by the anchor WTRU to report to the anchor WTRU the maximum duration during which the collaborative WTRU can maintain spatial filters for Rx beams. In some implementations, the collaborative WTRU may send WTRU capability information related to maintenance of spatial filter maintenance to the anchor WTRU. In some implementations, if the collaborative WTRU is not capable of maintaining the spatial filters, the collaborative WTRU may report the preconfigured value to the network (e.g., duration of spatial filter maintenance is zero).

Alternatively, In some implementations, the collaborative WTRU may send capability information, related to maintenance of spatial filters for Rx beams to the network and the anchor WTRU may obtain capability information of the collaborative WTRU from the network by sending a request to the network.

In some implementations, the time window during which the WTRU, anchor WTRU or collaborative WTRU may maintain a spatial filter may be defined by at least one of the following parameters: start time (e.g., slot number, system frame number, symbol number, time); end time (e.g., slot number, system frame number, symbol number, time); and/ or duration of the time window (e.g., number of slots, number of symbols, number of frames, time).

In some implementations, if the duration of the time window is not configured by the network, the WTRU may determine that the duration of the time window is equal to the maximum duration which was included in the WTRU capability information. The WTRU may receive the above parameters from the network (e.g., LMF or gNB) via LPP message or RRC.

In some implementations, the WTRU may receive an explicit indication from the LMF to initiate the time window. Alternatively the WTRU may receive an indication to initiate the time window by DCI/MAC-CE or RRC message. In some implementations, after the WTRU receives the indication, the WTRU may maintain spatial filters of Rx beams until the end of the time window. In some implementations, after the WTRU determines that the end of the time window is reached (e.g., a timer reaches the limit of the duration), the WTRU stops maintenance of spatial filters for Rx beams and WTRU may not report Tx beams used to receive PRS.

In an example embodiment, a WTRU receives a request from the network (e.g., LMF or gNB) to report the WTRU capability related to the maximum duration during which the WTRU can maintain spatial filters for Rx beams. The WTRU reports the requested capability to the network and receives PRS configurations from the network. The WTRU receives configuration information related to the time window during which the WTRU is expected to maintain spatial filters for Rx beams. The WTRU starts the timer for the time window and receives PRS and report Rx beam used to receive PRS and associated measurements (e.g., RSRP). After the timer for the time window reaches its time limitation, the WTRU stops maintenance of the spatial filters for Rx beams.

In an example the WTRU may determine the a measurement gap configuration for collaborative positioning as discussed herein. In one solution, where measurement gap configurations are applied for performing PRS measurements in one or more WTRUs in a collaborative group, the anchor WTRU and/or collaborative WTRU may send a request to the serving gNB to request for configuring a measurement gap associated with the PRS configurations used by the WTRUs in the group. In this case, the anchor WTRU may send a request for a measurement gap configuration for one or more collaborative WTRUs, possibly along with other assistance information such as WTRU IDs, start/stop time for triggering the measurement gap in anchor/collaborative WTRUs, etc., for example. The measurement gap configurations may be received by the collaborative WTRUs directly from network (e.g. via Uu link) or indirectly via an anchor WTRU (e.g. via SL interface).

The request for configuring the measurement gap or for triggering the activation/deactivation of preconfigured measurement gap in one or more WTRUs in the collaborative group may be sent in RRC signaling, MAC CE or UCI, upon receiving one or more PRS configurations and determining the size/length of the measurement gap configuration based on the PRS configurations, for example. In an example, the anchor WTRU may be preconfigured with one or more measurement gap configurations. The request for activating a measurement gap may be sent by the anchor WTRU after determining one or more suitable measurement gap configuration for the collaborative WTRUs based on the associated PRS configurations and/or selecting from a set of preconfigured measurement gap configurations. In this case, the request for activating a measurement gap configuration for one or more collaborative WTRU may contain the ID of the collaborative WTRU and the associated ID/index of the preconfigured measurement gap configuration, for example. The WTRUs may perform PRS measurements using the associated PRS configurations after receiving the respective measurement gap configurations and/or indications for activating the measurement gap configurations, for example. The measurement gap configurations and/or the indications for activating a preconfigured measurement gap configuration may be received by the WTRUs in RRC signalling, MAC CE or DCI, directly from the network or indirectly via anchor WTRU, for example.

In another example, the WTRU (e.g. anchor WTRU and/or collaborative WTRU) may be configured with processing/prioritization window and one or more priority rules for performing PRS measurements, possibly without having to configure and/or use measurement gap configuration. For example, the PRS configurations used in the collaborating WTRU group may be assigned with different priority values. When the WTRU is configured with a prioritization window, on a per-WTRU, per-CC, and/or per-BWP basis, then it may be possible for the WTRU to perform PRS measurements instead of receiving/transmitting data, control signaling or other RSs when the priority of the PRS is higher than that of the data/control/other RS over the duration/length of the prioritization window, for example. Alternatively, when the priority of data/control/other RS is higher than PRS, the WTRU may suspend or drop performing PRS measurements for the duration/length of the prioritization window. In an example, the one or more WTRUs in the collaborating group may be configured with different prioritization windows on per-WTRU, per-CC or per-BWP basis, possibly with different durations/lengths. The prioritization windows in the collaborative WTRUs may be configured by the network (e.g. serving gNB) based on the indication provided by anchor WTRU related to WTRU capability, PRS configurations available and priority of the PRS configurations, for example. The anchor WTRU and/or collaborative WTRUs may then perform PRS measurements, possibly without having to use measurement gap configuration, based on the priority of PRS measurements and the parameters of the respective prioritization window. When sending the measurement report or positioning information to network, the WTRU (anchor WTRU and/or collaborating WTRU) may include information on the prioritization window parameters, and timing of when PRS measurements were performed/not performed when configured with prioritization window, for example.

A WTRU serving as an anchor WTRU may select member WTRUs for performing PRS measurements based on the distance between each member WTRU, and based on configured distance threshold values. In an embodiment, a WTRU (e.g. Anchor WTRU) may distribute and/or send at least a subset of the positioning configurations to a group comprising of one or more collaborative, or member UEs, and report the aggregated positioning measurements performed by the WTRUs in a group to network (e.g. to gNB and/or LMF). The positioning configurations may include assistance information and/or resources for performing measurements of PRS received from one or more TRPs via Uu link and/or measurements of sidelink PRS (SL-PRS) received from one or more WTRUs via SL interface. The WTRU (e.g. Anchor WTRU) may select the one or more member WTRUs for distributing the positioning configurations (e.g. PRS configurations and/or SL-PRS configurations) based on the inter-WTRU distance. Inter-WTRU distance may be for example, the distance between the anchor WTRU and a member WTRU. The WTRU (e.g.

Anchor WTRU) may report to a network (e.g. gNB and/or LMF) the positioning measurements performed by anchor WTRU and/or the measurements received from the member WTRUs, for example. The WTRU may also report to network the inter-WTRU distances (e.g. SL distance between anchor WTRU and selected member UE) and/or the associated measurements performed over sidelink for determining inter-WTRU distances, for example.

In an example, the WTRU (e.g. Anchor WTRU) may receive from the network (e.g. gNB and/or LMF), a set comprising of one or more positioning configurations intended to be used by the anchor WTRU and/or one or more member WTRUs for performing measurements of PRS. The WTRU may receive from the network one or more distance threshold values (e.g. upper and/or lower bounds) associated with the distance between anchor WTRU and member WTRU, for example. The WTRU may also receive association information between the positioning configurations and the distance threshold values. For example, the association information may indicate to send a first PRS configuration to a member WTRU when the distance between the anchor WTRU and a member WTRU is within a first distance threshold value or distance range (e.g. greater than a lower bound threshold value and/or less than an upper bound threshold value) and/or send a second PRS configuration to the member WTRU when the distance is within a second distance threshold value or distance range.

The positioning configurations received by WTRU (e.g. Anchor WTRU) from the network may also include any configuration information, resources and/or assistance information associated with SL positioning, for example. For example, the SL positioning configurations may be used for determining the distance and/or range between the anchor WTRU and one or more member UEs based on any of the approaches discussed herein.

For example, the SL-PRS may be transmitted by the anchor WTRU using the positioning configuration associated with SL positioning (e.g. SL-PRS resources). The SL-PRS may be received and/or measured by a member WTRU. In an example, the measurements of SL-PRS may be reported by the member WTRU to the anchor WTRU, based on which the distance/range between anchor WTRU and member WTRU may be determined by the anchor WTRU. In another example, the measurements of SL-PRS may be used by the member WTRU for determining the distance between anchor WTRU and member WTRU, and reporting the determined distance/range to the anchor WTRU.

The SL-PRS may be transmitted by a member WTRU using the positioning configuration associated with SL positioning (e.g. SL-PRS resources), where the positioning configurations may possibly be provided by the anchor WTRU or network (e.g. gNB and/or LMF) to the member WTRU. The SL-PRS transmitted by member WTRU may be received and/or measured by the anchor WTRU. In an example, the measurements of SL-PRS may be used by the anchor WTRU for determining the distance between an anchor WTRU and a member WTRU.

Upon determining the distances between an anchor WTRU and one or more member WTRUs, the WTRU (e.g. Anchor WTRU) may select a set of member WTRUs for distributing the positioning configurations (e.g. PRS configurations) based on the determined distances between the anchor WTRU and respective member WTRUs, and the distance threshold values. The WTRU may determine the positioning configuration (e.g. PRS configurations) for the selected member WTRUs based on the association information and distance threshold values received from network, for example. The WTRU may then transmit the determined positioning configurations to the selected member WTRUs, for example. Such transmission of the positioning configurations may be performed by an anchor WTRU to the selected member WTRU via SL interface using unicast, multicast or broadcast transmission mode, for example. For example, the transmission over SL to the selected member WTRU may be performed using any of PC5-RRC, SL MAC CE, SCI, and PSSCH (e.g. data channel, SL LPP message). Also, for example, the transmission over SL to the selected member WTRU may include information associated with an identifier of member WTRU (e.g. WTRU SL or layer-2 ID, unicast/multicast link ID, service ID, C-RNTI, WTRU ID within group/aggregation ID) and/or information corresponding to the positioning configurations (e.g. PRS configuration IDs, assistance info, PRS resources). In an example, the anchor WTRU may transmit timing threshold or deadline information to the selected member WTRUs, indicating the minimum time duration for performing measurements and/or the maximum time duration available for performing measurements and/or sending the measurement report to the anchor WTRU.

The WTRU (e.g. anchor WTRU and/or member WTRU) may then perform PRS measurements using the associated positioning configurations. For example, the selected member WTRU may perform measurements of PRS using the positioning configurations received from the anchor WTRU.

Upon performing measurements, the WTRU (e.g. anchor WTRU) may receive a measurement report from the selected member WTRUs via a SL interface. The measurement report may be received by the anchor WTRU via unicast, multicast, or broadcast transmission, for example. The measurement report may be received by the anchor WTRU from a member WTRU via any of PC5-RRC, SL MAC CE, SCI, and PSSCH (e.g. data channel, SL LPP message), may include information identifier of member WTRU and/or the information corresponding to the measurement report (e.g. report IDs, PRS configuration IDs, timestamps indicating when the measurements were started and finished), for example.

The WTRU (e.g. anchor WTRU) may transmit to network (e.g. gNB and/or LMF) the measurement reports (e.g. PRS measurements), including the measurement reports received from one or more member WTRU and/or the PRS measurements made by the anchor WTRU. The anchor WTRU may transmit to network information/identifiers of the positioning configurations used by the anchor WTRU and member WTRU for measurements (e.g. PRS configuration IDs), distance information indicating the distance between the anchor WTRU and selected member WTRU, and timestamps indicating when the measurements where started/stopped by anchor WTRU and/or member WTRUs, for example. In another example, the anchor WTRU may transmit to network the anchor WTRU and/or member WTRU identifiers (e.g. WTRU IDs, WTRU SL IDs, L2 IDs) and/or the associated distance information of the member WTRUs not selected by the anchor WTRU for performing PRS measurements.

In an example, upon receiving the measurement reports from one or more selected member WTRUs, the anchor WTRU may determine whether to drop at least a subset of the received measurement reports or send all of the received measurements reports based on a configured criteria. For example, the anchor WTRU may decide to drop and/or not send to network at least a portion of the measurement report received from a first member WTRU when the measurements are similar or redundant compared to those received from a second member WTRU and/or performed by the anchor WTRU. The amount of redundancy between different measurements reports may be determined by the anchor WTRU based on a similarity threshold value, possibly received from the network (e.g. LMF), for example. Other methods for determining an amount of redundancy are also possible. In another example, the anchor WTRU may decide to drop and/or not send to network when the measurement report received from a first WTRU is delayed and/or not received within a threshold time or deadline. When dropping any of the measurement reports, the anchor WTRU may send an indication to network (e.g. cause indication), indicating the reason (e.g. redundancy, delayed) for not sending the measurements, for example.

Figure 6:
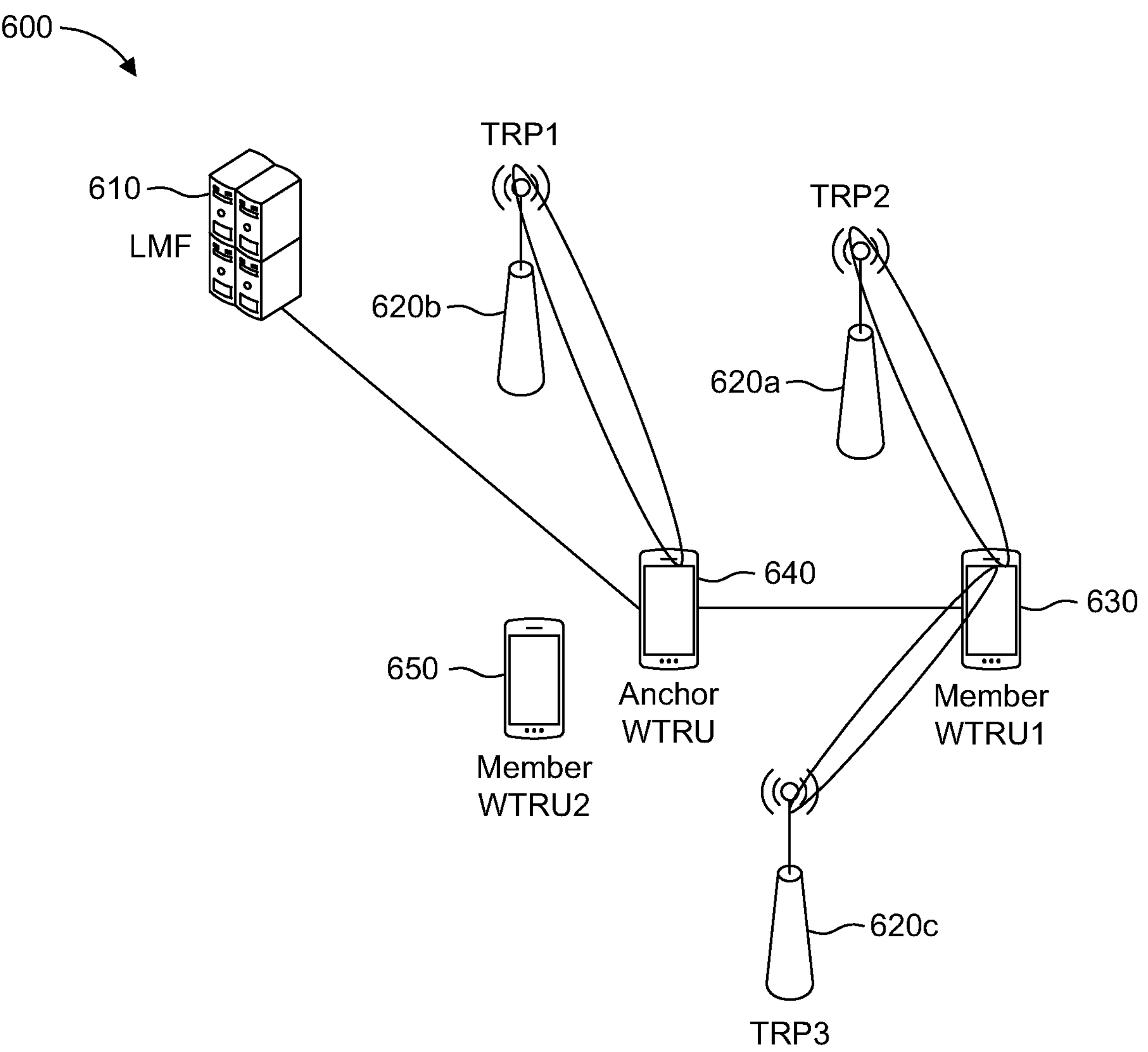
FIG. 6 is a system diagram illustrating signaling among a plurality of WTRU for configuring collaborative positioning.

FIG. 6 shows an example system 600 for configuring WTRUs to perform collaborative measurements. In FIG. 6, an LMF 510 may send PRS configurations information to the anchor WTRU 640. The PRS configuration information may include distance threshold values. The anchor WTRU 640 may select one or more member WTRUs for performing PRS measurements based on a determined distance between each member WTRU 630, 650 an the anchor WTRU 640. The anchor WTRU 640 may compare the determined distances with the distance threshold values. For example if member WTRU 650 is a distance that is less than the distance threshold value from the anchor WTRU 640, the anchor WTRU may select member WTRU 650. Or, for example, if member WTRU 630 is a distance that is greater than the distance threshold value from the anchor WTRU 640, the anchor WTRU may not select member WTRU 650. The anchor WTRU 640 may provide at least part of the PRS configuration information to the selected member WTRUs 630, 650. The PRS configuration information may be used by the WTRUs 630, 640, 650 to perform measurements on PRS of TRPs 620*a*, 620*b*, 620*c*.

Figure 7:
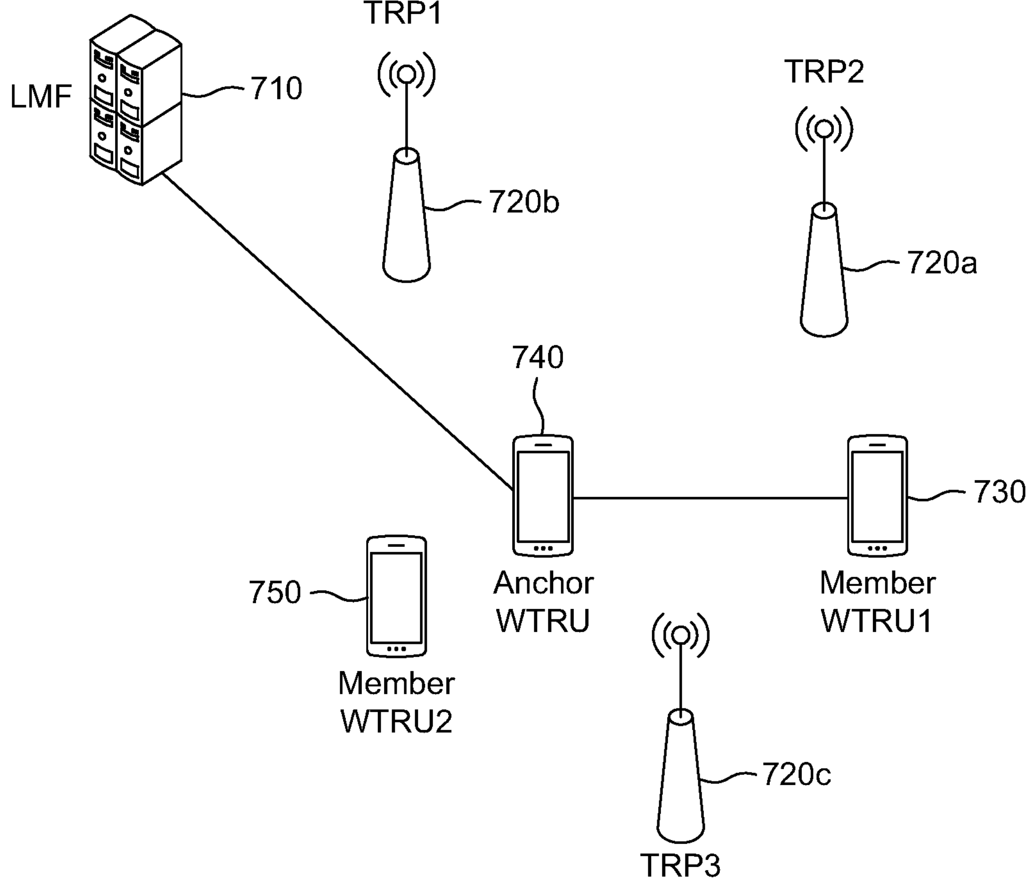
FIG. 7 is a system diagram illustrating signaling among a plurality of WTRU for reporting collaborative positioning.

FIG. 7 shows an example system 700 for reporting PRS measurements and/or other positioning information to the LMF 710. The Anchor WTRU 740 and member WTRUs 730 and 750 may perform measurements on PRSs of TRPs 720*a*, 720*b*, 720*c*. The member WTRUs 730 and 750 may provide measurement reports and/or location information to the anchor WTRU 740. Then the anchor WTRU 740 may provide the received measurement reports to the LMF in a combined report. The combined report may also include information related to the distance between the WTRUs.

Figure 8:
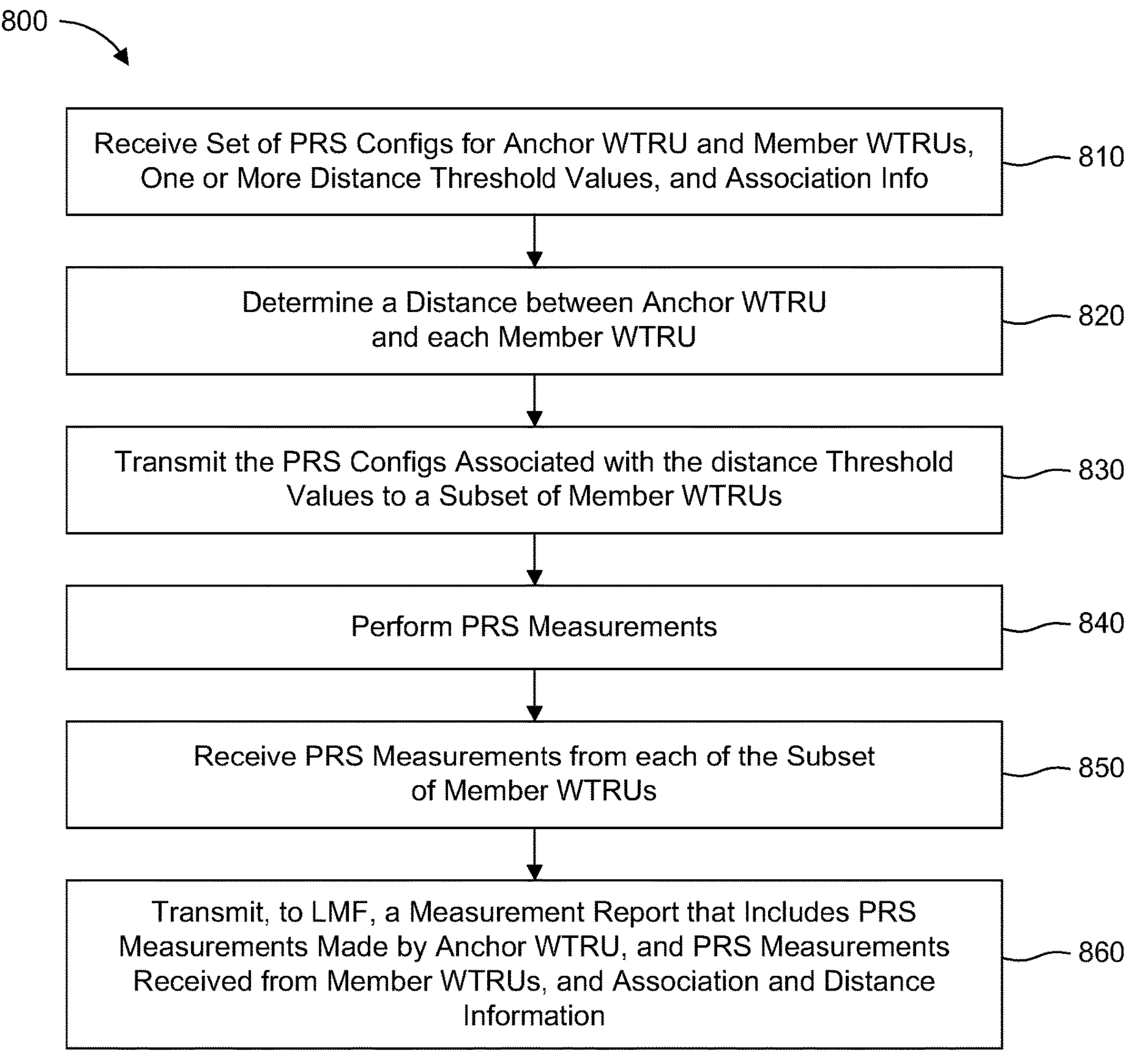
FIG. 8 is a flow diagram illustrating a process for performing collaborative positioning.

FIG. 8 is an example flow chart for a process 800 of performing and reporting collaborative PRS measurements. The process begins when he anchor WTRU receives, from LMF, a set of PRS configurations for the anchor WTRU and member WTRUs, one or more distance threshold values (e.g. distance range), and association info between PRS configurations and distance threshold values, at 810. Next the anchor WTRU determines a distance between the anchor WTRU and each member WTRU, at 820. The anchor WTRU may determined the distance using SL measurements for example. Then the anchor WTRU selects a set of member WTRUs based on the determined distances and distance threshold values (e.g. select members WTRUs that are located at a distances greater than a distance threshold value) and transmits the PRS configs associated with the distance threshold values to the selected member WTRUs via SL, at 830. Then the anchor WTRU and the selected member WTRUs each perform PRS measurements, at 840. Next the selected member WTRUs each send a measurement report to the anchor WTRU, at 850. The measurement reports may be received via SL, from the selected member UEs and the measurement report may contain PRS measurements (e.g. RSRP of PRS) associated to the indicated PRS configuration. Finally the anchor WTRU may transmit, to the LMF, the measurement report including PRS measurements made by the anchor WTRU, PRS measurements received from member WTRUs, at 860. The measurement report may also include IDs of PRS configurations used by anchor WTRU and member WTRUs, and a distance between each selected member WTRU and anchor WTRU.

Method for supporting collaborative UL-based positioning are disclosed herein. A WTRU may determine a SRSp configuration to use for collaborative positioning. In one family of solutions, a WTRU may use the SRSp configuration(s) for collaborative UL-based positioning based on the configurations and/or triggering indications received from network. The SRSp configurations may include one or more SRSp resources applicable for anchor WTRU and/or for one or more collaborating WTRUs, for example. The procedure and signalling related to the SRSp configurations/resources for collaborative positioning described in this section may be applicable to any one of the following SRSp types: periodic SRSp configurations, semi-persistent SRSp configurations, aperiodic SRSp configurations.

The SRSp transmitted by the anchor WTRU and/or collaborative WTRUs may be received by one or more TRPs/gNBs in network for measurements and/or for determining the positioning of the WTRUs in the collaborative group. In an example, the procedures associated with sending request for SRSp configurations, delivery of SRSp configurations from network to one or more WTRUs, determining the SRSp configuration(s) to use and transmission of the SRSp for collaborative positioning may be applicable for both WTRU-assisted and WTRU-based collaborative positioning.

A WTRU (e.g. anchor/collaborative WTRU) may receive the one or more SRSp configuration(s) for collaborative positioning, possibly upon sending a request message to network (e.g. gNB and/or LMF) and/or anchor WTRU. The request message may be intended for requesting one or more new SRSp configurations or updating existing SRSp configurations, for example. In another example, the request message may be sent by the WTRU for requesting to activate/deactivate one or more preconfigured SRSp configurations. The WTRU may send the request message in one or more of the following: RRC signaling, NAS signalling (e.g. LPP message), MAC CE and/or L1 signalling (e.g. UCI).

The triggering conditions/events for sending request message for UL-based collaborative positioning may include Higher layer indication. For example, the WTRU may send a request for assistance info, implicitly or explicitly when sending the indication from LCS client/application (e.g. MO-LR and/or MT-LR) to network for positioning.

The triggering conditions/events for sending request message for UL-based collaborative positioning may include LPP/RRC message transmission. For example, the WTRU may send a request message, via LPP procedure/signalling and/or RRC signalling, implicitly or explicitly, when sending the LPP capability info message and/or LPP request for assistance information message. In an example, the WTRU may indicate support for UL-based collaborative positioning in the capability info and/or request for assistance info for receiving the corresponding assistance info. In another example, the capability info for UL positioning may be sent via RRC signalling to serving base station (e.g. gNB).

The triggering conditions/events for sending request message for UL-based collaborative positioning may include positioning information transmission. For example, the WTRU may send a request message for UL positioning (e.g. SRSp configuration), implicitly or explicitly, when sending the positioning info consisting of measurement report and/or location estimates. In this case, the WTRU may include in the positioning information, a request message for one or more new or updated SRSp configurations for collaborative positioning, for example.

The triggering conditions/events for sending request message for UL-based collaborative positioning may include WTRU radio environment conditions. For example, the WTRU send a request message, when detecting a change in the WTRU radio environment (e.g. blockage of RS and/or data/control signals received via different channels from a TRP resulting in low RSRP, presence of multipath), which may possibly render the existing SRSp configuration at the WTRU unsuitable for transmission and making positioning measurements. In an example, the WTRU may send a request message when the RSRP measured over RS (e.g. PRS, CSI-RS, SSB) received from one or more TRPs is less than or greater than an RSRP threshold value.

The triggering conditions/events for sending request message for UL-based collaborative positioning may include Validity conditions. For example, the WTRU may send a request message, when one or more validity conditions, possibility time/timer and/or area validity, associated with an existing SRSp configuration expires. For example, a WTRU configured with TA timer, possibly associated with a preconfigured SRSp configuration, may send a request message when the timer expires. In another example, the WTRU may send a request message when the timer configured for configured grant expires, which may possibly be associated with the SRSp configuration. In another example, the WTRU may send a request message when the RSRP measured on an RS which may be in spatial/QCL relation with the SRSp is greater than a threshold value.

The triggering conditions/events for sending request message for UL-based collaborative positioning may include a Collaborative WTRU request. For example, a collaborative WTRU may send a request message, possibly to an anchor WTRU (via SL) and/or network (via Uu link), for a new SRSp configuration or for updating an existing SRSp configuration when determining the absence of any SRSp configurations for collaborative positioning, expiry of a validity condition (e.g. time or area), the absence of information on relative positioning (e.g. distance, direction) with respect to an anchor WTRU, detection/discovery of an anchor WTRU, detection of a change in relative location of collaborative WTRU and/or anchor WTRU (e.g. due to movement), etc. for example. In this case, an anchor WTRU which may receive a request message from a collaborative WTRU and/or when the anchor WTRU may not be able to respond with SRSp config to a collaborative WTRU, the anchor WTRU may send/forward the request message to network, for example.

The WTRU may include in the request message for UL-based collaborative positioning, one or more information (e.g. WTRU IDs, relative location of collaborating WTRUs, IDs of LPP sessions), similar to the info indicated when sending capability information, as described in previous section. In an example, where the WTRU may be configured with one or more SRSp configurations for conventional/non-collaborative positioning, may send in the request for assistance info for updating the SRSp configurations for supporting collaborative positioning. In this case, the WTRU may include indexes/IDs of the existing SRSp configurations to be updated, possibly information on whether the existing SRSp configurations may be updated for the use in anchor WTRU or in one or more collaborative WTRUs, for example. The WTRU (anchor WTRU and/or collaborative WTRU) may send the request message to the network (gNB and/or LMF) via the Uu link when in the WTRU operates in RRC CONNECTED, RRC INACTIVE or RRC IDLE states, for example.

In another example, the WTRU may receive one or more SRSp configuration(s) for collaborative positioning from the SIB received from gNB. In this case, the WTRU may directly receive the SRSp configurations to use for anchor WTRU and/or collaborative WTRU based on the assistance info for collaborative positioning accessible from the SIB(s). Alternatively, when at least part of the assistance data (e.g. one or more SRSp configurations) for collaborative positioning is unavailable via SIB, the WTRU may either send an on-demand SI request to a network node to request for the additional SRSp configurations/resources or the WTRU may send a dedicated request to a network node via RRC signalling or LPP signalling (e.g. in LPP request for assistance information), for example.

For example, an anchor WTRU may receive the SRSp configurations to be used by anchor WTRU via SIB and the WTRU may send an on-demand SI request to gNB for requesting the SRSp configurations to be used by the collaborative WTRU(s). The SRSp configurations for collaborative WTRUs may be received via SIB, dedicated RRC signalling or L2/L1 signalling (e.g. MAC CE or DCI). In another example, the WTRU may receive the SRSp configuration to be used by an anchor WTRU via dedicated RRC signalling while the SRSp configurations for a collaborative WTRU may be received via SIB, on-demand SI, or L2/L1 signalling (e.g. MAC CE or DCI).

The SRSp configuration(s) for collaborative positioning (e.g. periodic, semi-persistent, aperiodic) and/or the triggers for initiating the transmission of SRSp using preconfigured SRSp configurations/resources may be received by RRC signalling: For example, the one or more WTRUs in a collaborative group may receive the SRSp configurations, possibly dedicated to the intended WTRU, via RRC signalling message(s). In an example, the anchor WTRU may receive one or more SRSp configurations along with indications indicating the IDs of the WTRUs for which the SRSp configurations may be intended for.

The SRSp configuration(s) for collaborative positioning (e.g. periodic, semi-persistent, aperiodic) and/or the triggers for initiating the transmission of SRSp using preconfigured SRSp configurations/resources may be received by system Information: For example, the WTRUs may receive via SIB, the SRSp configuration(s) and possibly additional assistance information on using the SRSp configurations in a collaborative group (e.g. criteria/rules for distributing the SRSp configurations/resources among anchor WTRU and collaborative WTRU).

The SRSp configuration(s) for collaborative positioning (e.g. periodic, semi-persistent, aperiodic) and/or the triggers for initiating the transmission of SRSp using preconfigured SRSp configurations/resources may be received by L1/L2 signaling on Uu interface: For example, the WTRU may receive the SRSp configuration(s) and/or indication for activating/deactivating one or more preconfigured SRSp configurations via L1/L2 signalling including MAC CE or DCI, for example. The SRSp configurations may be preconfigured via RRC signalling, LPP signalling or L1/L2 signalling including MAC CE or DCI, for example. In an example, the WTRU may receive in MAC CE an indication for activating transmission of periodic or semi-persistent SRSp using preconfigured periodic/semi-persistent SRS configuration in anchor WTRU and/or collaborative WTRU. In another example, the WTRU may receive in DCI an indication for activating transmission of aperiodic SRSp using preconfigured aperiodic SRSp configuration in anchor WTRU and/or collaborative WTRU.

The SRSp configuration(s) for collaborative positioning (e.g. periodic, semi-persistent, aperiodic) and/or the triggers for initiating the transmission of SRSp using preconfigured SRSp configurations/resources may be received by NAS message: For example, the LPP messages from LMF containing the one or more SRSp configurations, which may be dedicated for different WTRUs or common to multiple WTRUs in a collaborative group, may be received in NAS message(s) via SRBs (e.g. SRB1, SRB2, SRB3) or DRBs.

The SRSp configuration(s) for collaborative positioning (e.g. periodic, semi-persistent, aperiodic) and/or the triggers for initiating the transmission of SRSp using preconfigured SRSp configurations/resources may be received by SL signalling/data radio bearers: For example, the collaborative WTRU(s) may receive SRSp configurations/resources from the anchor WTRU via the sidelink interface/channels including via SL data radio bearers and/or sidelink signalling radio bearers (e.g. PC5 RRC or SL SRBs), for example. In another example, the collaborative WTRU may receive the SRSp configuration(s) via sidelink LPP messages, possibly LPP messages from network relayed by the anchor WTRU and/or generated in a sidelink LPP session.

The SRSp configuration(s) for collaborative positioning (e.g. periodic, semi-persistent, aperiodic) and/or the triggers for initiating the transmission of SRSp using preconfigured SRSp configurations/resources may be received by L1/L2 signaling on SL interface: For example, the collaborative WTRU(s) may receive the SRSp configuration(s) and/or indication for activating/deactivating one or more SRSp configurations (periodic, semi-persistent or aperiodic) via sidelink L1/L2 signalling including SL MAC CE or SCI, possibly preconfigured via LPP and/or RRC signalling on Uu interface and/or SL data/signalling interface (e.g. PC5-RRC), for example.

A WTRU may determine SRSp configuration for collaborative WTRUs from the received configuration information. In one solution, a WTRU may determine the SRSp configuration for one or more collaborative WTRUs based on the configuration information received from network. The WTRU which may determine the SRSp configuration may be an anchor WTRU or another collaborative WTRU, for example.

For example, the WTRU may receive one or more SRSp configurations to be used by the anchor WTRU and/or one or more collaborative WTRUs. The WTRU may receive the SRSp configurations along with a mapping relation which may indicate the mapping between the SRSp configurations and the WTRUs (e.g. IDs) for which the SRSp configurations are intended for or allowed to be used, for example. An anchor WTRU which may receive the SRSp configurations for the collaborating group may retain and use the SRSp configuration intended for itself and/or send the SRSp configurations or subset of the SRSp configurations/resources intended to one or more other collaborative WTRUs via SL based on the received mapping between the SRS configurations and associated WTRU IDs, for example.

The mapping relation between the SRSp configurations and intended/allowed WTRUs, which may be received/configured in WTRU, may be either 1-to-1 or 1-to-M or N-to-M. In the case when 1-to-1 mapping is configured, the mapping may be between one SRSp configuration (e.g. SRSp config ID) to one WTRU (e.g. WTRU ID) or between one SRSp configuration to one WTRU group (e.g. group ID) consisting of one or more collaborative WTRUs, possibly in a collaborative WTRU group, for example. In the case when 1-to-M or N-to-M mapping is configured, the mapping may be between one or N SRSp configurations (e.g. 1 or N SRSp config IDs) to M WTRUs (e.g. M WTRU IDs) or between one or N SRSp configurations to M sub-groups of WTRUs (e.g. sub-group ID) where each subgroup may consists of one or more WTRUs within a collaborative WTRU group, for example. In the case when the 1-to-M or N-to-M mapping is configured, the WTRU may also receive the conditions/rules for using the one or more SRSp configurations per WTRU, possibly in the collaborative WTRU group. For example, the decision for selecting an SRSp configuration, including periodic, semi-persistent or aperiodic SRSp, for one or more collaborative WTRUs from a set of candidate SRSp configurations may be made by an anchor WTRU based on the configured criteria/rules.

The criteria/rules for selecting an SRSp configuration may include of one or more of the following: relative distance and/or orientation of the collaborative WTRU(s): For example, a first SRSp configuration may be used two WTRUs in a collaborating group when the distance between the WTRUs is below or equal to a distance threshold value. Then, a second SRSp configuration may be used by the two WTRUs in the group when the distance between the WTRUs is above the threshold value, for example. In this case, an anchor WTRU, may determine and select whether to use a first or a second SRSp configuration to use along with a collaborative WTRU based on the determined distance between the two WTRUs, for example.

The criterial or rules for selecting an SRSp configuration may include of one or more of the following: Measurement quality of the measurements made by the WTRUs: For example, a collaborative WTRU configured to use a first SRSp configuration may continue using the first SRSp configuration so long as the RSRP measured on a RS or other signals (e.g. data/control) is above a threshold. When the RSRP measured on RS or other signals is below a threshold and remains below the threshold for a certain duration, the collaborative WTRU may use or may be indicated by the anchor WTRU to use a second SRSp configuration, for example.

The criteria or rules for selecting an SRSp configuration may include of one or more of the following: RRC state of the WTRU: For example, a collaborative WTRU may be triggered to use a first SRSp configuration for periodic SRSp transmission when operating in RRC CONNECTED mode. The collaborative WTRU may then be triggered to use a second SRSp configuration for semi-persistent or aperiodic SRSp configuration when operating in RRC INACTIVE state, for example. The anchor WTRU may trigger the collaborative WTRU to use the first or second SRSp configuration by sending a SL indication (e.g. SL MAC CE) based on information of the RRC state transition of collaborative WTRU.

A WTRU may determines SRSp configurations for collaborative WTRUs by splitting or combining the SRSp configurations/resources.

In one solution, a WTRU may determine the SRSp configurations for one or more collaborative WTRUs by splitting the SRSp configurations/resources received from network. In an example, the WTRU may receive one or more SRSp configurations/resources to be used by the WTRUs in the collaborating group. In this case, the anchor WTRU which may receive the SRSp configurations, may split the SRSp resources and distribute the resources to one or more collaborative WTRUs, for example. In an example, the anchor WTRU may split an SRSp configuration into different subsets of SRSp configurations and distribute the split configurations (e.g. over sidelink) such that different WTRUs in the collaborating group may perform SRSp transmissions using the subsets of SRSp configurations. In an example, an SRSp configuration consisting of one or more resources, resource sets and/or beams may be split into different subsets of SRSp configurations, where each split SRSp configuration may consist of a subset of the resources, resource sets and/or beams.

In another example, the WTRU may receive one or more SRS configurations which may be combined or merged when using the configurations in the collaborating group. The different SRSp configurations may include different resources, resource sets and/or beams, which may be combined for realizing a more comprehensive SRSp configuration, possibly for realizing higher positioning accuracy, for example.

In an example, an anchor WTRU may receive the different SRSp configurations for combining from the network, including in a dedicated RRC message, LPP message and/or via SIB, for example. In another example, an anchor WTRU may receive the different SRSp configurations for combining from one or more collaborating WTRUs, which may have been received individually from the network in a dedicated RRC or LPP message, for example. In addition to the SRSp configurations, the WTRU may also receive criteria/rules for combining the different SRSp configurations to be used in the collaborative group.

When determining the split or combined SRSp configurations for the collaborating WTRU, the anchor WTRU or collaborative WTRU may send an indication to network (e.g. gNB and/or LMF). The WTRU may send the indication after, before or during determining the split or combined SRSp configurations. The WTRU may send the indication on split SRSp configurations in RRC message, NAS message or L2/L1 message (MAC CE, UCI). The indication sent by the WTRU may contain one or more of the following: request for splitting/combining the SRSp configuration for the collaborative WTRUs, assistance information for splitting/combining the SRSp configuration (e.g. information on distance between anchor WTRU and collaborating WTRU) and information on split/combined SRSp configuration/ resources (e.g. beam/resource set/resource ID, associated between determined split/combined SRSp resources and WTRU IDs).

The anchor WTRU may split or combine the SRSp configuration by taking into account of information associated with one or more collaborative WTRUs. For assisting with the splitting/combining of SRSp configuration, the anchor WTRU may use additional criteria/rules, possibly received from network in assistance information and/or another configuration (e.g. RRC configuration or LPP configuration). For example, the resources/beams associated with the SRSp configurations may be split/combined by the anchor WTRU by using certain criteria/rules.

The criteria or rules by which the resources or beams associated with the SRSp configurations may be split or combined may be based on a relative distance and/or orientation of the collaborative WTRU(s).

For example, the anchor WTRU may split the SRSp configuration consisting of different resource sets/beams and provide the split SRSp configurations to a collaborative WTRU located at a distance such that the diversity in the transmissions by the WTRUs in the collaborating group, and possibly the positioning accuracy achieved when performing measurements at network is maximized.

In an example, split SRSp configurations consisting of different resource sets which may be furthest apart in terms of temporal domain, frequency domains (e.g. difference in time slots/frequency resources is greater than or less than a threshold value) and/or spatial domain (e.g. difference in beam direction is greater than or less than an angular threshold value) may be provided to collaborative WTRUs whose relative distance may be below/above a distance threshold.

In another example, the anchor WTRU may combine SRSp configurations and provide the combined configuration to a collaborating WTRU such that the SRSp transmissions may enable to compensates for poor quality/unsuitable transmissions by the anchor WTRU. In an example, a combined (first) SRSp configuration consisting of higher number of resource sets/beams than the (second) SRSp configuration used by the anchor WTRU (e.g. the difference in the number of resources/beams between the first and second SRSp configurations is above a threshold) may be provided to collaborative WTRUs whose relative distance may be greater than or less than a distance threshold.

The criteria or rules by which the resources or beams associated with the SRSp configurations may be split or combined may be based on Measurement quality of the measurements made by the WTRUs. For example, the anchor WTRU may determine and provide the split/combined SRSp configurations to collaborative WTRUs based on the quality of measurement made by the WTRUs. In an example, the anchor WTRU may provide one and/or more of the split/combined SRSp configurations to a collaborative WTRU after receiving the measurement report containing information of measurements made on RS or other signals (data/control) received from TRPs/gNBs.

In another example, the anchor WTRU may be preconfigured with one or more combinations of split SRSp configurations allowed to be used in the collaborating group. The anchor WTRU may select a split SRSp configuration, from the pre-configurations, containing low number/density of resources (e.g. number/density of SRSp resources below a threshold) or aperiodic SRSp for a collaborative WTRU that indicates high quality RSRP measurements (e.g. RSRP above a threshold). Likewise, the anchor WTRU may select a split SRSp configuration containing high number of resources (e.g. number of SRSp resources below a threshold) or semi-persistent SRSp with high periodicity for a collaborative WTRU that indicates low quality RSRP measurements (e.g. RSRP less than a threshold).

The criteria or rules by which the resources or beams associated with the SRSp configurations may be split or combined may be based on reception of DL-PRS by the WTRUs. For example, the anchor WTRU may split/combine the SRSp configuration on the basis of the DL-PRS/ beams receivable from a TRP/gNB. The anchor WTRU may provide the split/combined SRSp configurations to the different collaborative WTRUs based on whether the collaborative WTRU is able to receive the DL-PRS/beam with a certain channel quality (e.g.

RSRP of PRS/beam is above a threshold) from the TRP/ gNB associated with the split/combined SRSp configuration, for example.

The criteria or rules by which the resources or beams associated with the SRSp configurations may be split or combined may be based on LOS/NLOS condition of the RS with spatial relation with SRSp received by the WTRUs. For example, the anchor WTRU may split/combine and provide the split/combined SRSp configuration to a collaborative WTRU such that the probability of receiving SRSp associated with the split/combined SRSp configuration at TRPs/gNBs via a LOS path is maximized and/or the probability of receiving at TRPs/gNBs via a NLOS path is minimized, based on measurement quality of an RS with spatial relation with SRSp (e.g. PRS, CSI-RS, TRS).

The criteria or rules by which the resources or beams associated with the SRSp configurations may be split or combined may be based on Tx TEG (timing error group). For example, the anchor WTRU may determine to split SRSp configuration based on Tx TEG ID of collaborative WTRUs. The anchor WTRU may receive a configuration which contain Tx TEG IDs of collaborative WTRUs from the network (e.g., gNB, LMF), associating TX TEG ID with WTRU IDs, for example. SRSp resources within the same Tx TEG share same or similar timing error, allowing the network to apply differential timing processing to eliminate unknown timing offset or estimate the unknown time offset in the measurements obtained by the network. For example, if the anchor WTRUs may determine to split SRSp configurations for the collaborative WTRUs who share the same Tx TEG ID as the anchor WTRU such that the network receives SRSp with the same/similar timing offset from anchor and collaborative WTRUs. In another example, the anchor WTRU may determine to split SRSp configurations according to Tx TEG IDs of the collaborative WTRUs. For example, the anchor WTRU may determine to allocate SRSp resources with a spatial direction (e.g., SRSp transmission direction aligned with PRS resource #1) to a group of collaborative WTRUs with the same Tx TEG ID (e.g., Tx TEG ID #1). The anchor WTRU may determine to allocate SRSp resources with a different spatial directions (e.g., SRSp transmission direction aligned with PRS resource #2) to a different group of collaborative WTRUs who share the same Tx TEG ID (e.g., Tx TEG ID #2). By allocating SRSp resources according to collaborative WTRUs Tx TEG ID, the network can receive SRSp with similar timing error characteristics, separated according to SRSp parameters (e.g., spatial relationship).

The criteria or rules by which the resources or beams associated with the SRSp configurations may be split or combined may be based on RRC state and/or DRX configuration of the WTRUs. For example, the anchor WTRU may split/combine and provide the split/combined SRSp configuration to a collaborative WTRU by considering the RRC state in which the collaborative WTRU may be operating. In an example, the anchor WTRU may provide to a collaborating WTRU in INACTIVE/IDLE state a split configuration that contains minimal SRSp resources (e.g. below a threshold value) such that the duration of transmission and amount bandwidth used for transmissions by the collaborative WTRU may be minimal and/or corresponds to the low power RRC state.

In another example, the anchor WTRU may split/combine the SRSp configuration by taking into account of the DRX/C-DRX configuration used by a collaborative WTRU over the Uu interface and/or SL interface, possibly indicated to the anchor WTRU via sidelink. In this case, the SRSp configuration may be split/combined such that the time/frequency resources in the configuration for SRSp transmission aligns with the ON durations of the DRX/C-DRX configuration of the collaborating WTRU over the Uu/SL interface, for example.

When indicating the one or more SRSp configurations to a collaborating WTRU, including the split SRSp configurations, and/or combined SRSp configurations, the anchor WTRU may include one or more of the following information SRSp configuration information as described below or priority of SRSp configuration as described below.

SRSp configuration information may include one or more resources, resource sets, frequency layers, beams and/or TRPs/gNBs associated with the indicated SRSp configuration. SRSp configuration information may include and ID of indicated SRSp configuration/subset of SRSp configuration. SRSp configuration information may include type of SRSp configuration, including aperiodic, semi-persistent, periodic. SRSp configuration information may include timing info associated with the different indicated SRSp configuration type such as start time/slot, periodicity and stop time/slot.

Priority of SRSp configuration may include and assigned priority value. The one or more indicated SRSp configurations may be assigned with a priority value. In an example, a standalone SRSp configuration, possibly comprising of non-overlapping SRSp resources (i.e. resources/beams are different), may be assigned with a higher priority value. A non-standalone SRSp configuration, possibly comprising of partially/fully overlapping SRSp resources, may be assigned with a lower priority value, for example. In this case, the priority value assigned to the different SRSp configurations may depend on the degree of overlap, for example.

In another example, the anchor WTRU and/or collaborative WTRU may use an SRSp configuration for SRSp transmission according to the order priority, where the SRSp configuration with the highest priority is used first for SRSp transmission when multiple SRSp configurations are configured/available. The anchor/collaborative WTRU may drop an SRSp transmission with lowest priority when insufficient resources are available (e.g. for meeting positioning accuracy requirements) and/or when colliding with other data/control signal transmissions, for example.

A WTRU may perform SRSp transmissions for collaborative positioning based on triggering conditions or events. one solution, the WTRU (e.g. anchor WTRU and/or collaborative WTRU) may perform SRSp transmission using the one or more SRSp configurations, possibly for collaborative positioning, based on detection of triggering conditions/events and/or reception of positioning initiation indication for triggering/initiating the SRSp transmission. The procedures associated with detection of triggering conditions/events and/or receiving an indication for triggering SRSp transmission at the anchor/collaborative WTRU may similar and applicable for both WTRU-assisted and WTRU-based collaborative positioning.

Upon receiving the new SRSp configuration from the network, the WTRU may perform SRSp transmission associated with collaborative positioning based on reception/detection of one or more positioning initiation indications. The positioning initiation indications, indicating when to use a new SRSp configuration for collaborative positioning and/or when to stop using an existing SRSp configuration (when previously configured), may be received by WTRU either from network (i.e. gNB or LMF) or via SL from another WTRU (e.g. anchor WTRU or collaborative WTRU). The positioning initiation indication may include the index/ID of the SRSp configuration (e.g. periodic, semi-persistent, aperiodic), possibly along with a flag indicating whether to start/stop using a SRSp configuration for collaborative positioning, for example.

The (collaborative) WTRU may initiate or trigger a SRSp transmission when detecting one or more of the following triggers/conditions: reception of triggering indication from the network, reception of activation/deactivation indication from anchor WTRU(s), based on a timer or expiration of some period of time, or detection of some other condition at the WTRU.

For example, a WTRU (anchor/collaborative WTRU) may initiate SRSp transmission upon receiving an indication from network (gNB and/or LMF), where the indication may be received in RRC signaling, LPP message (e.g LPP request location information), L2/L1 signaling (e.g. MAC CE, DCI). For an anchor WTRU and/or a collaborative WTRU with an established Uu link (e.g. RRC connection) with gNB and/or LPP session with LMF, the indication from network may include the identifier of the request type and/or LPP session ID (e.g. dedicated LPP session ID and/or group LPP session ID), for example.

For example, a collaborative WTRU may initiate SRSp transmission upon receiving SRSp configuration and/or an activation indication from anchor WTRU, where the indication may be received via sidelink PC5-RRC message, L2/L1 signaling (e.g. SL MAC CE, SCI) or LPP message (e.g. LPP request location information). The activation indication may contain the identifier of the SRSp configuration, for example. The collaborative WTRU may stop/suspend SRSp transmission when receiving a deactivation indication from anchor WTRU, for example.

For example, a WTRU (anchor/collaborative WTRU) may initiate SRSp transmission at the start of a configured time period, or expiry of a time period (e.g. prohibit time period). In an example, the collaborative WTRU may be configured to start a timer upon receiving an SRSp configuration from network and/or anchor WTRU. Upon expiry of the timer running over a configured time duration, the collaborative WTRU may initiate the SRSp transmission, for example.

For example, a WTRU (e.g. anchor/collaborative WTRU) may initiate SRSp transmission upon detecting one or more conditions associated with change in radio conditions, change in relative distance/direction with respect to another WTRU (e.g. anchor WTRU) and change in mobility/movement of WTRU in a collaborating group. In an example, a WTRU may be configured with the one or more conditions, possibly in assistance information, when receiving the SRSp configurations.

The WTRU may also be configured, by network and/or anchor WTRU, with a mapping rule for mapping from a detected condition to one or more SRSp configurations to apply when initiating the SRSp transmission. For example, when detecting certain radio conditions (e.g. number of multi-paths are greater than a threshold, RSRP of RS/beam received from a TRP/gNB is greater than/less than a threshold), the WTRU may trigger SRSp transmission using a SRSp configuration, possibly indicated in the mapping rule. For example, when detecting a change in the relative distance from an anchor WTRU by a certain threshold (e.g. inter-UE distance is greater than/less than a distance threshold), the collaborative WTRU may trigger the SRSp transmission using an indicated SRSp configuration. In an example related to timing-based positioning methods (e.g. TDoA) for collaborative positioning, the anchor WTRU may trigger measurements and/or local reconfiguration (e.g. providing updated SRSp configuration), when the relative distance and/or direction with respect to a collaborative WTRU changes by certain distance/angle threshold. The local reconfiguration may be performed to ensure that the timing measurements (e.g. RSTD) made by TRPs/gNB due to SRSp transmissions made by the anchor WTRU and/or collaborative WTRU(s) may properly take into account of the relative distance and/or direction between the anchor WTRU and collaborative WTRU(s).

The local reconfiguration may be performed by triggering transmission of sidelink RS from anchor WTRU and measurement at collaborative WTRU. For example, the anchor WTRU may perform corrections to the timings of SRSp transmissions by collaborative WTRU based on the measurement report sent by the collaborative WTRU, containing the timing measurements made on the sidelink RS measurements for relative positioning.

The local reconfiguration may be performed by triggering transmission of sidelink RS from collaborative WTRU and measurement at anchor WTRU. For example, the anchor WTRU may perform corrections to the timings of SRSp transmissions by collaborative WTRU based on the measurements made by anchor WTRU for relative positioning based on the sidelink RS received from collaborative WTRU.

In an example related to angle-based positioning methods (e.g. UL-AoA) for collaborative positioning, the anchor WTRU may trigger SRSp transmission and/or local reconfiguration, when the relative distance and/or direction with respect to a collaborative WTRU changes by certain distance/angle threshold. In this case, similar to timing-based positioning, the anchor WTRU may perform changes to the SRSp configuration (e.g. antenna panel to use, number of Tx beams to use, size/width of Tx beams to use, Tx beam directions to apply, Tx power to apply) used by collaborative WTRU based on the updated information on the distance/angle between the WTRUs and/or measured AoD of beams received by anchor/collaborative WTRU from one or more TRPs/gNBs. The anchor WTRU may send an indication to network when performing changes to the SRSp configurations used by anchor/collaborative WTRU for indicating the changes made.

In an example, an anchor WTRU may send an on-demand request to a collaborative WTRU for triggering SRSp transmission using an SRSp configuration and/or subset of resources/beams associated with an SRSp configuration. For example, the anchor WTRU may send assistance information to a collaborative WTRU, containing one or more SRSp configurations. The different SRSp configurations may be associated with configuration ID, and/or identifiers identifying the different resources/resource sets/beams associated with the one or more SRSp configurations, for example.

In an example, the anchor WTRU may determine the first and second SRSp configurations to be used by the anchor WTRU and a collaborative WTRU. In this case, the first SRSp configuration may consist of resources/beams to be transmitted to a first TRP set, comprising of one or more TRPs, and the second SRSp configuration may consist of resources/beams to be transmitted a second TRP set, for example. The anchor WTRU may initially send both the first and second SRSp configurations to the collaborative WTRU. The anchor WTRU may send an indication, possibly along with the SRSp configurations or in a separate message in sidelink, to the collaborative WTRU to trigger using the second SRSp configuration for SRSp transmission to the second TRP set, for example. The anchor WTRU may use the first SRSp configuration for performing SRSp transmission to the first TRP set, for example. When detecting one or more conditions at the anchor WTRU, which may possibly interrupt/block the SRSp transmission to the first TRP set, the anchor WTRU may send an indication to the collaborative WTRU to use the first SRSp configuration for first SRSp transmission.

The conditions detected by the anchor WTRU for sending the indication to the collaborative WTRU to initiate SRSp transmission may include the RSRP of the measurements made by anchor WTRU on the RS resources/beams (e.g. PRS, CSI-RS, SSB)) received from the first TRP set is below a threshold value and/or remains below the threshold value for a configured time duration (e.g. due to presence of blockage/obstruction), for example. Another condition detected by anchor WTRU may include the RSTD of the measurements made by anchor WTRU on the PRS received from the first TRP set is higher than a threshold and/or remains above threshold for configured duration, for example. Another condition monitored by anchor WTRU may include detection of multipath when receiving RS or other data/control signals (e.g. in spatial/QCL relation with SRSp) from the first TRP set, where the number of paths detected is higher than a threshold value, for example. Upon triggering the SRSp transmission at collaborative WTRU, the measurements made at the first TRP may compensate for the measurement interruption due to the SRSp transmitted by the anchor WTRU, for example.

A WTRU may perform SRSp transmission for collaborative positioning when operating in INACTIVE/IDLE state. In a solution, the WTRU (e.g. anchor WTRU or collaborative WTRU) may perform SRSp transmissions when operating in RRC INACTIVE/IDLE state based on detection of one or more events, possibly associated with collaborative positioning, MT-LR and/or deferred MT-LR positioning service. The deferred MT-LR positioning service may refer to a procedure where the higher layers/application (e.g. LCS client), possibly located in the network, may instigate and/or send one or more indications to establish and/or configure a location service session (e.g. LPP session) between LMF, base stations (e.g. serving and/or non-serving gNBs/TRPs), and WTRUs in a collaborating group, for example.

Regarding operation in collaborating group, a subset of one or more of the WTRUs may operate in INACTIVE/IDLE state when performing SRSp transmission.

Upon receiving MT-LR or deferred MT-LR service request from network (e.g. LMF and/or base station/gNB) the WTRU may receive, from network, one or more SRSp configurations (e.g. periodic, semi-persistent, aperiodic) for performing UL SRSp transmissions for UL-based collaborative positioning, for example. The WTRU may also receive the configuration information comprising of one or more triggering events, possibly associated with deferred MT-LR, for the WTRU to monitor and perform SRSp transmission when detecting at least one of the configured triggering events, for example. In the case of collaborative positioning, the anchor WTRU which may receive configuration information comprising of the triggering events, may forward the configuration information to one or more collaborative WTRUs. In an example, the anchor WTRU may determine the triggering events to be forwarded based on the capability of the collaborative WTRUs. This may enable any of the WTRUs in the collaborating group to transmit SRSp when detecting one or more of the triggering events.

For example the triggering events for triggering SRSp transmissions may include one or more of time events, area events, or mobility events. For example, periodic time events where the WTRU may transmit SRSp periodically based on the periodicity configured when configuring time events (e.g. triggering events). Area events: For example, area events may consist of one or more cells (e.g. Cell IDs) where the WTRU (anchor WTRU and/or collaborative WTRU) may transmit SRSp when detecting a cell (e.g. cell ID) associated with a configured area event. Mobility events: For example, mobility event may be related to mobility attributes of the WTRUs (e.g. WTRU speed, distance between the WTRUs in collaborating group, direction of WTRU movement, WTRU trajectory/path) where the WTRU may transmit SRSp when detecting a change in one or more mobility attributes (e.g. WTRU speed is above/below a threshold, WTRU trajectory changes by a threshold).

The WTRU may perform the SRSp transmission until a stopping event/condition, described in the following, associated with stopping/suspending the SRSp transmission may be detected by the WTRU, for example. The SRSp transmitted by any of the WTRU in collaborating group may be measured by the TRPs/gNBs and the measurements may be reported to LMF which may then determine the WTRU location estimate based on the measurements. The LMF may then send the determined location estimate to the application/LCS-client, for example.

In an example, the deferred MT-LR procedure may be supported while being agnostic to whether the one or more WTRUs in the collaborative group may operate in RRC CONNECTED, RRC INACTIVE or RRC IDLE state, for example. In this case, the SRSp configurations received by WTRU for supporting UL-based positioning may be used by WTRU irrespective of whether the WTRU operates in any of the RRC state. Likewise, the triggering events for initiating the SRSp transmission and/or the stopping events for stopping/terminating the transmission may also be used by the WTRU irrespective of RRC state. In another example, the deferred MT-LR procedure may be supported with the awareness of the RRC state in which the WTRU operates. In this case, it may be possible that the WTRU may receive and/or use a different SRSp configuration depending on the WTRU's RRC state. Likewise, the triggering events for initiating the SRSp transmission and/or the stopping events for stopping/terminating the SRSp transmissions may be dependent and/or associated with the RRC state in which the WTRU may operate, for example.

In an example, the WTRU (e.g. anchor WTRU and/or collaborative WTRU) may receive the one or more SRSp configurations (e.g. in RRC messages, MAC CE, DCI) when operating in RRC CONNECTED state. The WTRU may store the SRSp configurations in WTRU context and use for SRSp transmissions when operating in INACTIVE state, possibly after detecting one or more triggering events (e.g. time events, area events). In another example, the WTRU may receive the one or more SRSp configurations when operating in RRC INACTIVE state. In this case the WTRU may receive the SRSp configurations in RRC message (e.g. RRC Release message with suspend config indication or in DL-SDT message) when transitioning from CONNECTED to INACTIVE state or when in INACTIVE state, for example. In another example, the WTRU may receive the SRSp configuration in INACTIVE/IDLE state via SIB (e.g. positioning SIB) or paging message.

In the case when the WTRU may detect one or more triggering events, possibly when operating INACTIVE state, the WTRU may send an indication to network (e.g. LMF and/or gNB), anchor WTRU and/or collaborative WTRU for indicating an event indication/report on the detection of a triggering event. When sending the indication to network the WTRU may send the indication in small data transmission (SDT) using resources associated with SDT (e.g. random access SDT or configured grant SDT), for example. When sending the indication to anchor WTRU and/or collaborative WTRU, the WTRU may send the indication via SL.

The WTRU may also send an indication when requesting for SRSp configuration, requesting for activation of a preconfigured SRSp configuration (e.g. periodic, semi-persistent, aperiodic), when determining that the preconfigured SRSp configurations are determined to be not valid (e.g. with respect to one or more validity conditions described herein) and/or when requesting for updating validity conditions. The WTRU may send the event indication/report and the request for SRSp configuration/activation of SRSp configuration in one or more indications. The WTRU may send the one or more indication with SDT (e.g. using SDT resources) when operating in INACTIVE state, for example.

In an example, a first indication sent by WTRU may include the event indication/report and/or request for SRSp configuration and a second indication may include the request for SRSp configuration and/or activation of an SRSp configuration. In another example, the WTRU may send in the first indication the event indication and/or request for SRSp configuration and a second indication for indicating event report, where the second indication may be sent after performing UL SRSp transmission using the received SRSp configuration, for example.

The one or more indications may be sent by the WTRU explicitly in an LPP message to LMF and/or in AS layer message (e.g. RRC message, MAC CE, UCI) to gNB, for example. The explicit indication(s) may be sent by WTRU with SDT (e.g. using SDT-SRB2 and/or SDT resources) when in INACTIVE state. In another example, the WTRU may send the indication (e.g. event indication, request for SRSp configuration/activation) implicitly to network. For example, the WTRU may be preconfigured with one or more SRSp configurations and/or parameters associated with SRSp configuration (e.g. periodicity, time/frequency resource sets, frequency layers, etc.) and a mapping between different indications and the SRSp configurations and/or parameters. In this case, the WTRU may send a first indication (e.g. event indication) using a first SRSp configuration/parameter, possibly when detecting a triggering event, and a second indication (e.g. requesting for activating an SRSp configuration) using a second SRSp configuration/parameter, for example.

After sending the event indication/report in the indication the WTRU may receive the SRSp configuration from network, for example. For example, a collaborative WTRU with a Uu link may receive SRSp configuration from network after the anchor WTRU sends the event indication/report to network, possibly containing the ID of the collaborative WTRU and/or event ID. The WTRU may also receive an activation indication (e.g. in MAC CE, DCI) for activating one or more preconfigured SRSp configurations, after sending the indication to network, for example. For example, the collaborative WTRU may receive an activation indication for activating transmission of semi-persistent SRSp, where the configuration for the semi-persistent SRSp may be preconfigured in the WTRU and/or received by WTRU in the activation indication from network, for example. The WTRU may also receive a similar activation indication (e.g. in DCI) for activating transmission of aperiodic SRSp, for example.

The WTRU (e.g. anchor WTRU or collaborative WTRU) may stop/suspend the SRSp transmission in INACTIVE based on one or more stopping events/conditions as follows: Reception of an indication from the network; or expiry of validity conditions.

For example, the WTRU may stop/suspend the SRSp transmission when receiving a one or more indications indicating deactivation, suspension, termination and/or release of the SRSp configuration available at WTRU. In an example, a WTRU performing transmission of periodic SRSp (using an SRSp configuration for periodic SRSp), may stop/suspend the SRSp transmission when receiving the stop/suspension indication from network. The WTRU may receive the indication in INACTIVE via LPP messages or access stratum (AS) layer messages (e.g. RRC message(s), MAC CE, DCI), for example.

For example, the WTRU may stop/suspend the SRSp transmission when determining that the SRSp configuration used for SRSp transmission is invalid with respect to the associated one or more validity conditions. In an example where the SRSp configuration is associated with a TA timer as a validity condition for performing SRSp transmission in INACTIVE state, the WTRU may stop/suspend the SRSp transmission and/or release the SRSp configuration when TA timer expires, for example.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor.

Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method performed by a wireless transmit receive unit (WTRU) that is serving as an anchor user equipment (UE), the method comprising:

receiving, from a collaborative WTRU via sidelink, a measurement report that includes an reference signal received power (RSRP) measurement made on a synchronization signal block (SSB) of a transmit reception point (TRP);

determining, based on the RSRP measurement, whether the RSRP satisfies a preconfigured RSRP threshold;

in response to determining that the RSRP satisfies the preconfigured RSRP threshold, selecting, from a preconfigured set of measurement gaps (MGs), an MG for the collaborative WTRU, wherein the selected MG is for enabling the collaborative WTRU to perform positioning reference signal (PRS) measurements;

transmitting, to the collaborative WTRU, information regarding activation of the selected MG;

transmitting, to a network node, an indication the selected MG;

receiving, from the collaborative WTRU, a first PRS measurement report including a first PRS measurement performed during the selected MG;

performing, by the WTRU, measurements of a PRS during the selected MG to determine a second PRS measurement; and transmitting, to the network node, an aggregated measurement report that includes an indication of the first PRS measurement and an indication of the second PRS measurement, wherein the aggregated measurement report is associated with the selected MG and is configured to enable the network node to perform positioning of at least one of the WTRU or the collaborative WTRU.

2. The method of claim 1, further comprising: receiving, from the network node, information that includes at least one PRS configuration that includes at least one PRS configuration that comprises: one or more PRS sub-configurations, wherein the selected MG is associated with at the at least one PRS configuration.

3. The method of claim 2, wherein the first PRS measurement and second PRS measurement are performed using a same PRS sub-configuration during the selected MG.

4. The method of claim 2, wherein selection of the PRS sub-configuration is based on the RSRP measurement.

5. The method of claim 1, further comprising: receiving from the network node, information that includes an indication of the preconfigured set of MGss that are preconfigured at the collaborative UE.

6. The method of claim 1, further comprising: receiving from the network node the preconfigured RSRP threshold.

7. The method of claim 1, wherein the aggregated measurement report further includes: an ID of the collaborative WTRU, an ID of a PRS sub-configuration applied by the collaborative WTRU, and an ID of a PRS sub-configuration applied by the WTRU.

8. The method of claim 2, wherein each of the one or more PRS sub-configurations includes PRS resources associated with different TRPs.

9. A wireless transmit receive unit (WTRU) configured to serve as an Anchor user equipment (UE), the WTRU comprising:

a transceiver in communication with a processor;

wherein the transceiver and processor are configured to:

receive from a collaborative WTRU via sidelink, a measurement report that includes an reference signal received power (RSRP) measurement made on an synchronization signal block (SSB) of a transmit reception point (TRP);

determine, based on the RSRP measurement, whether the RSRP satisfies a preconfigured RSRP threshold;

in response to determining that the RSRP satisfies the preconfigured RSRP threshold, select, from a preconfigured set of measurement gaps (MGs), an MG for the collaborative WTRU, wherein the selected MG is for enabling the collaborative WTRU to perform positioning reference signal (PRS) measurements;

transmit information regarding activation of a measurement gap (MG) that is selected from a preconfigured set of MGs for the collaborative WTRU;

transmit, to a network node, an indication the selected MG;

receive, from the collaborative WTRU, a first PRS measurement report including a first PRS measurement performed during the selected MG;

perform, by the WTRU, measurements of a PRS during the selected MG to determine a second PRS measurement; and transmit, to the network node, an aggregated measurement report that includes an indication of the first PRS measurement and an indication of the second PRS measurement, wherein the aggregated measurement report is associated with the selected MG and is configured to enable the network node to perform positioning of at least one of the WTRU or the collaborative WTRU.

10. The WTRU of claim 9, wherein the processor and transceiver are further configured to receive, from the network node, information that includes at least one PRS configuration that includes at least one PRS configuration that comprises: one or more PRS sub-configurations, wherein the selected MG is associated with at the at least one PRS configuration.

11. The WTRU of claim 9, wherein the first PRS measurement and second PRS measurement are performed using a same PRS sub-configuration during the selected MG.

12. The WTRU of claim 11, wherein selection of the PRS sub-configuration is based on the RSRP measurement.

13. The WTRU of claim 9, wherein the processor and transceiver are further configured to receive from the network node information that includes an indication of a set of MGs that are preconfigured at the collaborative UE.

14. The WTRU of claim 9, wherein the processor and transceiver are further configured to receive from the network node the preconfigured RSRP threshold.

15. The WTRU of claim 9, wherein the aggregated measurement report further includes: an ID of the collaborative WTRU, an ID of a PRS sub-configuration applied by the collaborative WTRU, and an ID of a PRS sub-configuration applied by the WTRU.

* * * * *